(12) United States Patent
Lassen et al.

(10) Patent No.: US 10,518,864 B2
(45) Date of Patent: Dec. 31, 2019

(54) WING FOLD CONTROLLER

(71) Applicant: The Boeing Company, Chicago, IL (US)

(72) Inventors: Matthew August Lassen, Seattle, WA (US); Mark Steven Good, Seattle, WA (US)

(73) Assignee: The Boeing Company, Chicago, IL (US)

(*) Notice: Subject to any disclaimer, the term of this patent is extended or adjusted under 35 U.S.C. 154(b) by 443 days.

(21) Appl. No.: 15/248,641

(22) Filed: Aug. 26, 2016

(65) Prior Publication Data

US 2016/0362171 A1 Dec. 15, 2016

Related U.S. Application Data

(60) Division of application No. 14/335,625, filed on Jul. 18, 2014, now Pat. No. 9,499,252, which is a
(Continued)

(51) Int. Cl.
*B64C 3/56* (2006.01)

(52) U.S. Cl.
CPC .................. *B64C 3/56* (2013.01); *Y02T 50/14* (2013.01); *Y02T 50/54* (2013.01)

(58) Field of Classification Search
CPC .... B64C 3/38; B64C 3/56; B64C 3/54; B64C 3/546; B64C 2003/543
(Continued)

(56) References Cited

U.S. PATENT DOCUMENTS 1,718,617 A 6/1929 Wagner
1,723,962 A 8/1929 Weymouth
(Continued)

FOREIGN PATENT DOCUMENTS

EP 1375342 A1 1/2004
EP 0988225 B1 10/2006
(Continued)

OTHER PUBLICATIONS

Canadian Intellectual Property Office Examination Search Report, dated Sep. 27, 2017, regarding Application No. 2,828,726, 4 pages.
(Continued)

*Primary Examiner* — Marc Burgess
(74) *Attorney, Agent, or Firm* — Yee & Associates, P.C.

(57) ABSTRACT

Illustrative embodiments may provide for an apparatus and method of controlling the folding of a wing. The apparatus may include a sensor, an actuator, and a wing fold controller. The method may include receiving a status of at least one of an aircraft and a wing fold system of the aircraft by the wing fold controller of the wing fold system. The method may also include receiving an automated command by the wing fold controller in response to receiving the status. The method may also include operating the wing fold system by the wing fold controller based on the automated command and the status. The method may also include transitioning a wingtip of a wing of the aircraft to one of a flight position and an on-ground position by an actuator of the wing fold system in response to commands from the wing fold controller.

27 Claims, 21 Drawing Sheets

Related U.S. Application Data continuation-in-part of application No. 14/022,622, filed on Sep. 10, 2013, now Pat. No. 9,290,260, which is a continuation-in-part of application No. 13/664,416, filed on Oct. 30, 2012, which is a continuation-in-part of application No. 13/251,216, filed on Oct. 1, 2011, now Pat. No. 9,908,612.

(60) Provisional application No. 61/720,338, filed on Oct. 30, 2012.

(58) Field of Classification Search
USPC .......................................................... 244/49
See application file for complete search history.

(56) References Cited

U.S. PATENT DOCUMENTS

| | | | |
|---|---|---|---|
| 2,021,324 | A | 11/1935 | Osborn |
| 2,056,188 | A * | 10/1936 | Hayden ............... B64C 3/54 244/218 |
| 2,166,564 | A | 7/1939 | Atwood et al. |
| 2,280,809 | A | 4/1942 | Evans |
| 2,289,224 | A | 7/1942 | Swanson et al. |
| 2,290,850 | A | 7/1942 | Umschweif |
| 2,375,423 | A | 5/1945 | Odilon |
| 2,392,506 | A | 1/1946 | Rosmann |
| 2,444,332 | A | 6/1948 | Briggs et al. |
| 2,468,425 | A | 4/1949 | Carpenter et al. |
| 2,533,429 | A | 12/1950 | Carpenter |
| 2,674,422 | A | 4/1954 | Pellarini |
| 2,712,421 | A | 7/1955 | Naumann |
| 2,719,682 | A | 10/1955 | Handel |
| 2,876,677 | A | 3/1959 | Clark et al. |
| 3,081,053 | A | 3/1963 | Jarrell |
| 3,556,439 | A | 1/1971 | Autry et al. |
| 4,039,163 | A | 8/1977 | Shorey |
| 4,249,765 | A | 2/1981 | Janssen |
| 4,302,745 | A * | 11/1981 | Johnston ............... G05D 1/0066 244/17.13 |
| 4,336,914 | A | 6/1982 | Thomson |
| 4,457,479 | A | 7/1984 | Daude |
| 4,824,053 | A | 4/1989 | Sarh |
| 4,858,857 | A | 8/1989 | Lange et al. |
| 5,002,521 | A * | 3/1991 | Schwarz ............... B64C 13/42 310/82 |
| 5,042,855 | A | 8/1991 | Bennett et al. |
| 5,192,037 | A | 3/1993 | Moorefield |
| 5,201,479 | A | 4/1993 | Renzelmann |
| 5,310,138 | A | 5/1994 | Fitzgibbon |
| 5,350,135 | A | 9/1994 | Renzelmann et al. |
| 5,372,336 | A | 12/1994 | Peaz |
| 5,379,969 | A | 1/1995 | Marx et al. |
| 5,381,986 | A | 1/1995 | Smith et al. |
| 5,427,329 | A | 6/1995 | Renzelmann et al. |
| 5,452,643 | A | 9/1995 | Smith et al. |
| 5,492,288 | A | 2/1996 | Bordelon |
| 5,495,999 | A | 3/1996 | Cymara |
| 5,558,299 | A | 9/1996 | Veile |
| 5,593,113 | A | 1/1997 | Cox |
| 5,671,899 | A | 9/1997 | Nicholas et al. |
| 5,743,490 | A | 4/1998 | Gillingham et al. |
| 5,988,563 | A | 11/1999 | Allen |
| 6,032,418 | A | 3/2000 | Larson |
| 6,076,766 | A | 6/2000 | Gruensfelder |
| 6,089,502 | A | 7/2000 | Herrick et al. |
| 6,168,113 | B1 | 1/2001 | Hann et al. |
| 6,260,799 | B1 | 7/2001 | Russ |
| 6,273,369 | B1 | 8/2001 | Nishimura |
| 6,446,906 | B1 | 9/2002 | Voigt et al. |
| 6,834,835 | B1 | 12/2004 | Knowles et al. |
| 6,922,991 | B2 * | 8/2005 | Polcuch ............... B64C 13/40 60/468 |
| 7,275,722 | B2 | 10/2007 | Irving et al. |
| 7,445,180 | B2 | 11/2008 | Plude et al. |
| 7,637,454 | B2 | 12/2009 | Pitt |
| 7,744,038 | B2 | 6/2010 | Sankrithi et al. |
| 8,089,034 | B2 | 1/2012 | Harnmerquist |
| 8,157,206 | B2 | 4/2012 | Gionta et al. |
| 8,262,030 | B2 * | 9/2012 | Phillips ............... B64C 3/52 244/203 |
| 8,336,830 | B2 | 12/2012 | Eberhardt |
| 8,342,447 | B2 | 1/2013 | Etling |
| 8,733,692 | B2 | 5/2014 | Kordel et al. |
| 9,211,946 | B2 | 12/2015 | Good et al. |
| 9,290,260 | B2 | 3/2016 | Lassen et al. |
| 9,296,469 | B2 | 3/2016 | Santini et al. |
| 9,469,391 | B1 | 10/2016 | Dong |
| 9,499,252 | B2 * | 11/2016 | Lassen ............... B64C 3/56 |
| 2002/0066825 | A1 | 6/2002 | Miralles |
| 2006/0284427 | A1 | 12/2006 | Borycki |
| 2007/0057120 | A1 | 3/2007 | McConnell |
| 2009/0045288 | A1 | 2/2009 | Nakamura et al. |
| 2009/0302151 | A1 | 12/2009 | Holmes |
| 2010/0084516 | A1 | 4/2010 | Eberhardt |
| 2011/0001016 | A1 | 1/2011 | Skillen et al. |
| 2011/0180657 | A1 | 7/2011 | Gionta et al. |
| 2012/0032023 | A1 | 2/2012 | Bousfield et al. |
| 2012/0085858 | A1 | 4/2012 | Seifert |
| 2012/0228424 | A1 | 9/2012 | Parker |
| 2013/0099060 | A1 | 4/2013 | Dees et al. |
| 2013/0146716 | A1 | 6/2013 | Gettinger |
| 2013/0292508 | A1 | 11/2013 | Fox |
| 2013/0313356 | A1 | 11/2013 | Santini et al. |
| 2013/0327883 | A1 | 12/2013 | Kordel et al. |
| 2014/0014768 | A1 | 1/2014 | Lassen et al. |
| 2014/0061371 | A1 | 3/2014 | Good et al. |
| 2014/0117150 | A1 | 5/2014 | Good et al. |
| 2014/0117151 | A1 | 5/2014 | Fox et al. |
| 2015/0014478 | A1 | 1/2015 | Lassen et al. |
| 2015/0076283 | A1 * | 3/2015 | Schievelbusch ........ B64C 13/28 244/99.3 |
| 2015/0298793 | A1 | 10/2015 | Fox et al. |
| 2016/0083074 | A1 | 3/2016 | Santini et al. |

FOREIGN PATENT DOCUMENTS

| | | |
|---|---|---|
| EP | 2650212 A1 | 10/2013 |
| GB | 491050 A | 3/1938 |
| GB | 651436 A | 4/1951 |
| GB | 773739 A | 5/1957 |

OTHER PUBLICATIONS

European Patent Office Examination Search Report, dated Nov. 30, 2017, regarding Application No. 13189783.7, 10 pages.

Extended European Search Report, dated Sep. 18, 2018, regarding Application No. 18184756.7, 6 pages.

Final Office Action, dated Oct. 12, 2018, regarding U.S Appl. No. 15/057,123, 21 pages.

Extended European Search Report, dated Jul. 21, 2015, regarding Application No. EP13190093.8, 6 pages.

Extended European Search Report, dated Jul. 24, 2015, regarding Application No. EP13189910.6, 6 pages.

Extended European Search Report, dated Jul. 24, 2015, regarding Application No. EP13190099.5, 5 pages.

Extended European Search Report, dated Jul. 27, 2015, regarding Application No. EP13189962.7, 7 pages.

Canadian Intellectual Property Office Examination Search Report, dated Aug. 3, 2015, regarding Application No. 2,825,073, 4 pages.

Canadian Intellectual Property Office Examination Search Report, dated Aug. 13, 2015, regarding Application No. 2,824,727, 4 pages.

"Folding wing," Wikipedia Foundation, Inc., dated Jun. 2, 2013, 5 pages. Accessed Jul. 29, 2013, http://en.wikipedia.org/wiki/Folding_wing.

Young et al., "Aircraft Excrescence Drag," North Atlantic Treaty Organization Advisory Group for Aerospace Research and Development AGARD-AG-264, Jul. 1981, 172 pages.

Office Action, dated Mar. 24, 2015, regarding U.S Appl. No. 13/962,952 , 24 pages.

Final Office Action, dated Aug. 21, 2015, regarding U.S Appl. No. 13/962,952 , 12 pages.

(56) References Cited

OTHER PUBLICATIONS

Office Action, dated Dec. 31, 2015, regarding U.S Appl. No. 13/962,952, 30 pages.
Notice of Allowance, dated Apr. 7, 2016, regarding U.S Appl. No. 13/962,952, 12 pages.
Office Action, dated Jul. 20, 2015, regarding U.S Appl. No. 14/022,622, 23 pages.
Notice of Allowance, dated Nov. 12, 2015, regarding U.S Appl. No. 14/022,622, 15 pages.
Notice of Allowance, dated Aug. 6, 2015, regarding U.S Appl. No. 14/049,425, 20 pages.
Notice of Allowance, dated Jul. 24, 2015, regarding U.S Appl. No. 13/964,072, 17 pages.
Office Action, dated Sep. 23, 2015, regarding U.S Appl. No. 13/966,754, 16 pages.
Final Office Action, dated Feb. 10, 2016, regarding U.S Appl. No. 13/966,754, 35 pages.
Office Action, dated Feb. 8, 2016, regarding U.S Appl. No. 14/335,625, 38 pages.
Notice of Allowance, dated Jun. 8, 2016, regarding U.S Appl. No. 13/966,754, 19 pages.
Notice of Allowance, dated Jul. 19, 2016, regarding U.S Appl. No. 14/335,625, 20 pages.
Canadian Intellectual Property Office Examination Search Report, dated Nov. 30, 2016, regarding Application No. 2,828,726, 5 pages.
European Patent Office Examination Report, dated May 15, 2017, regarding Application No. EP13189962.7, 4 pages.
Notice of Allowance, dated Jan. 3, 2019, regarding U.S Appl. No. 15/057,123, 7 pages.
Notice of Allowance, dated Mar. 6, 2019, regarding U.S Appl. No. 15/265,258, 47 pages.

\* cited by examiner

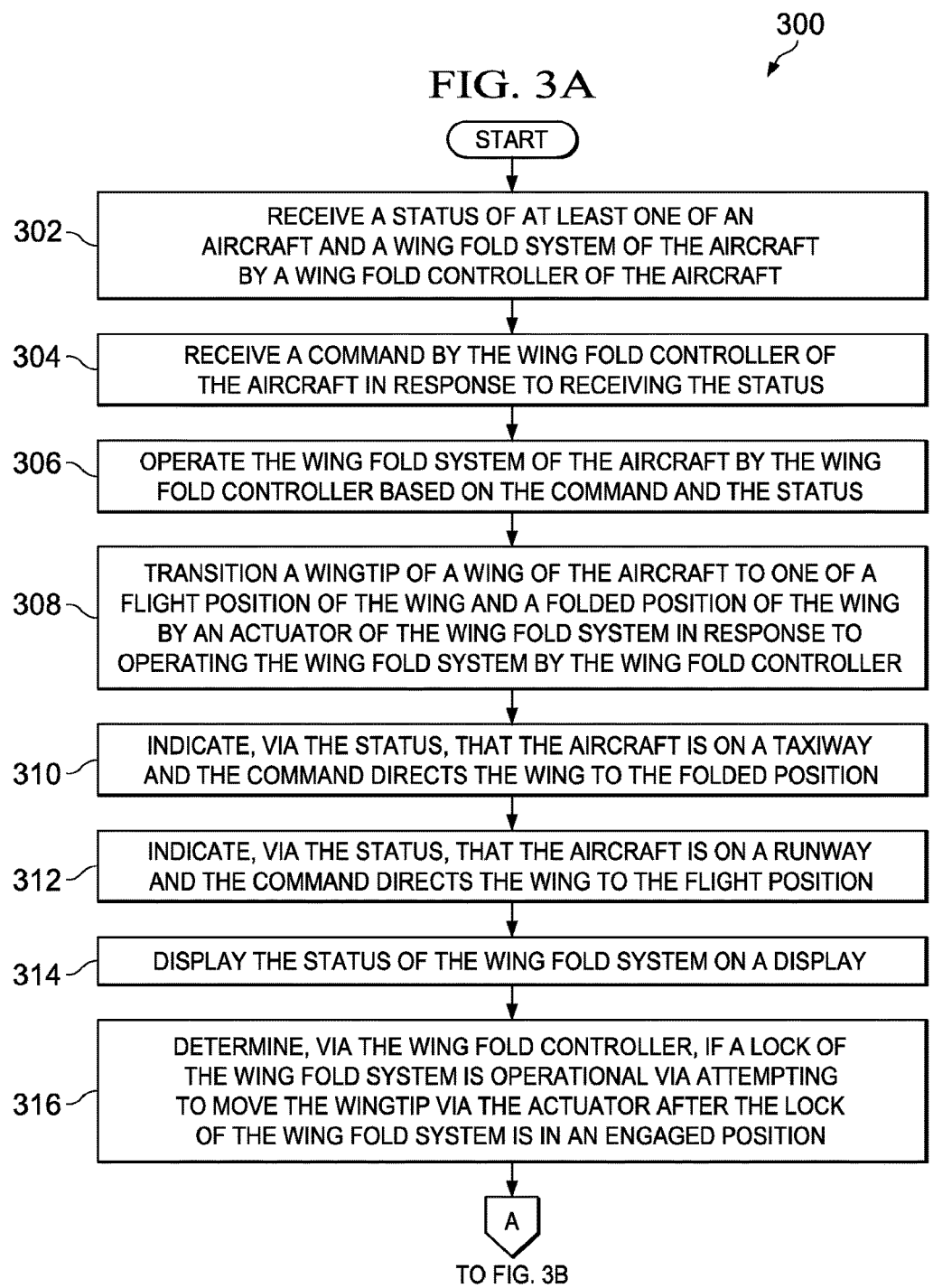

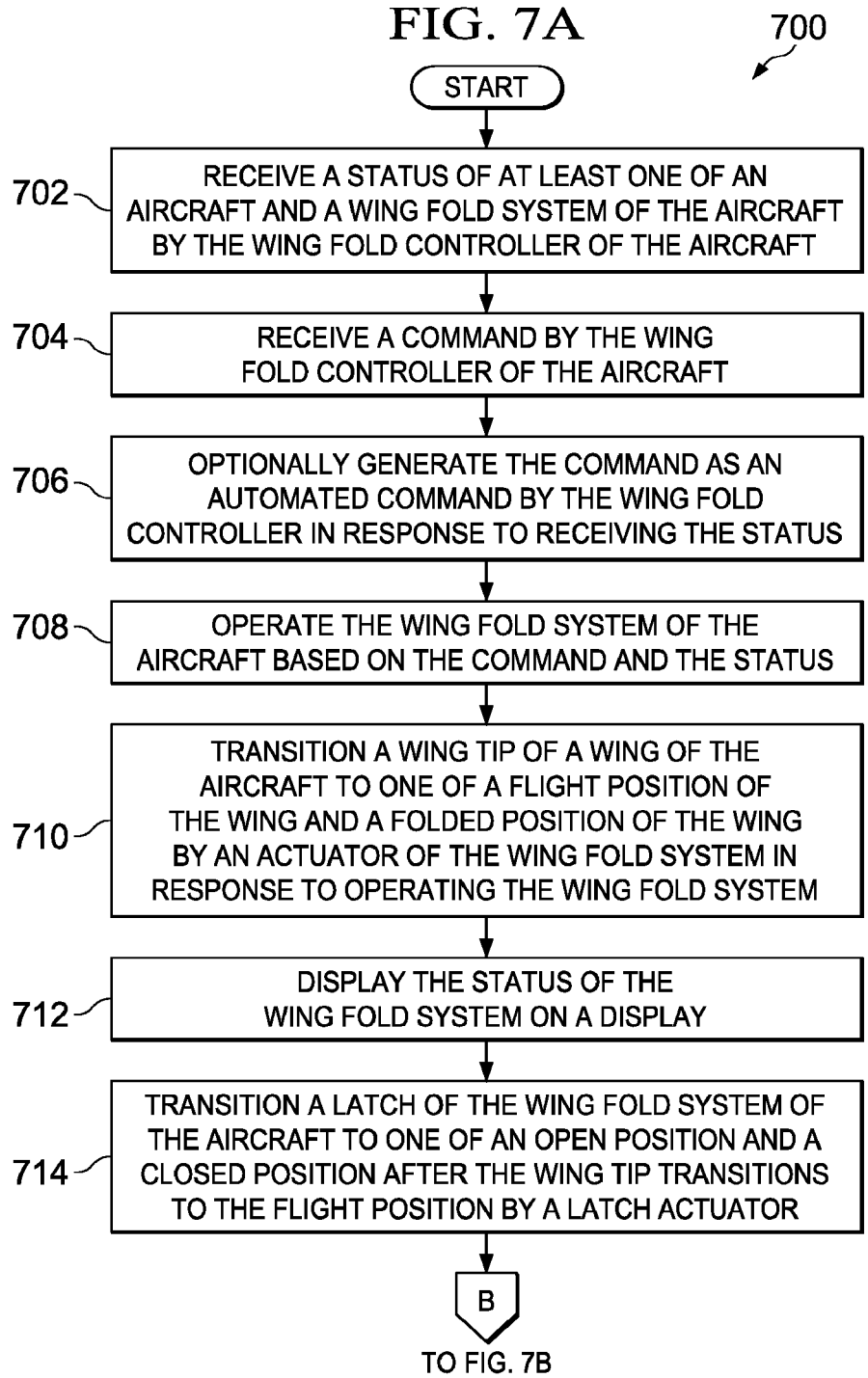

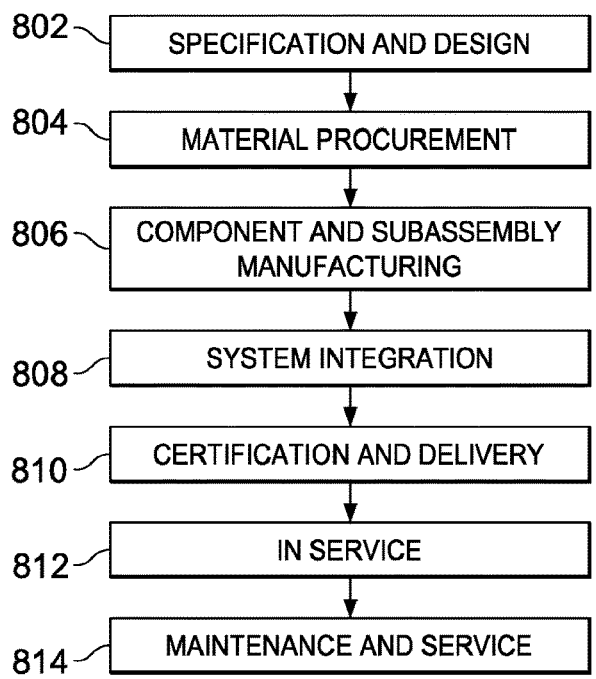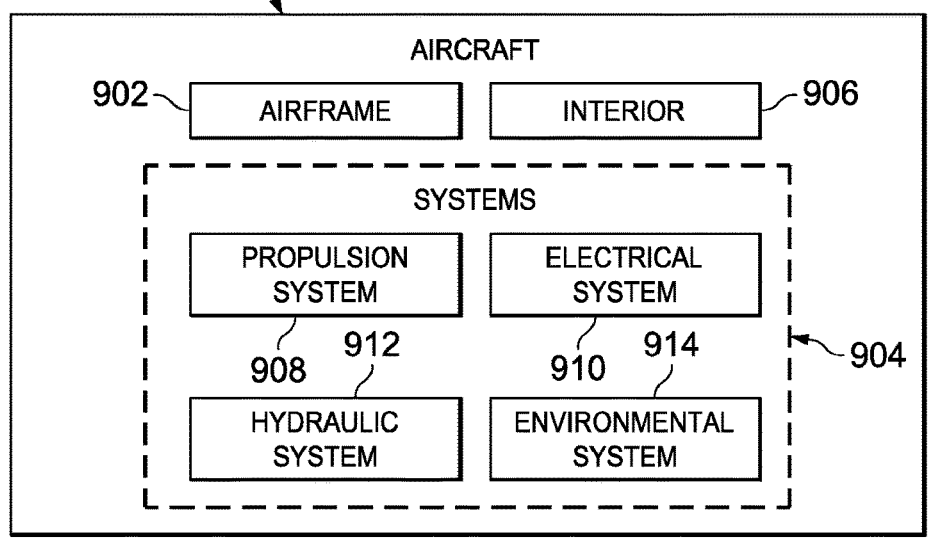

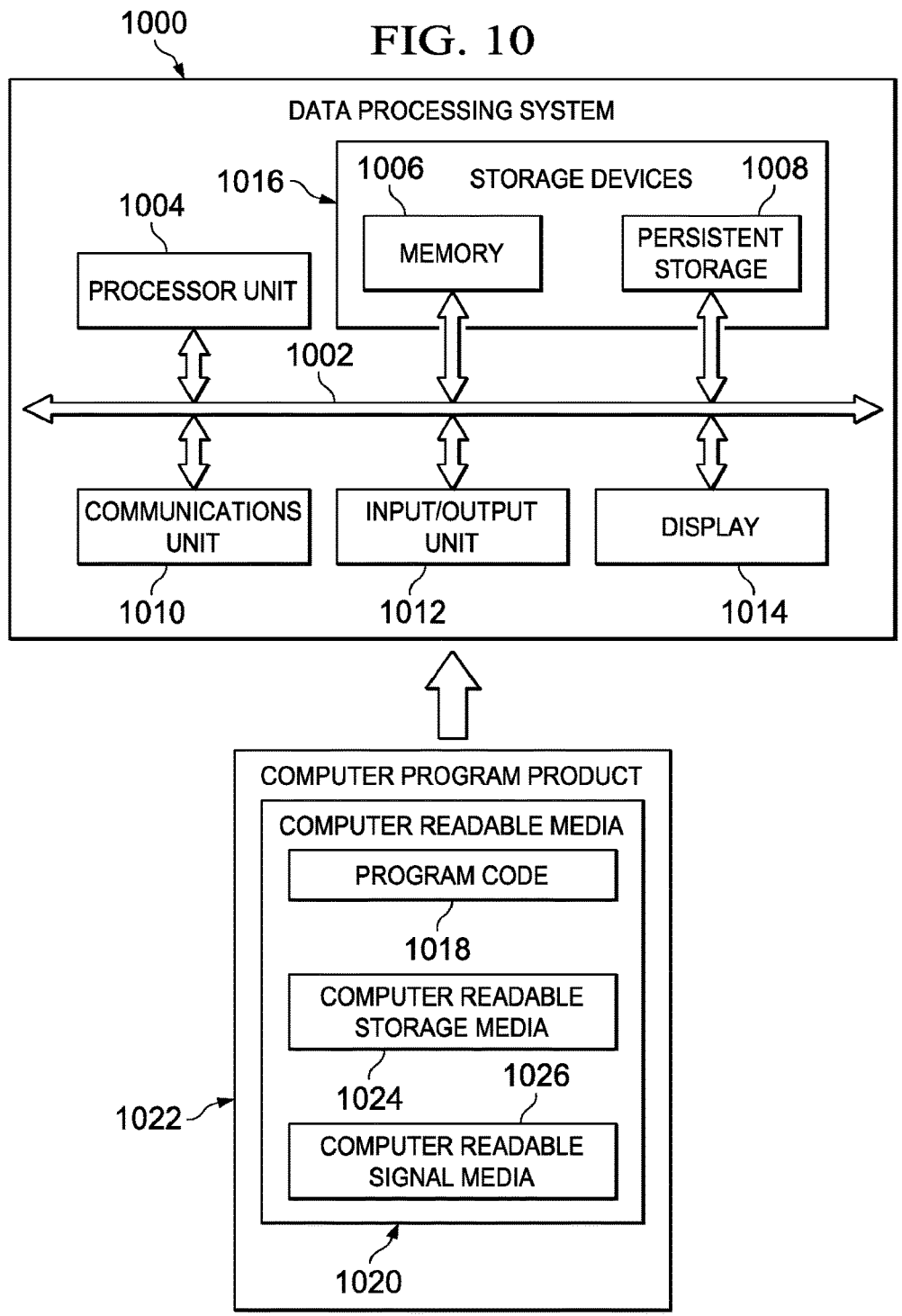

WING FOLD CONTROLLER

CROSS REFERENCE AND PRIORITY

This application is a divisional application of U.S. patent application Ser. No. 14/335,625, filed Jul. 18, 2014 and issued as U.S. Pat. No. 9,499,252 on Nov. 22, 2016, which is a continuation-in-part of U.S. patent application Ser. No. 14/022,622, filed Sep. 10, 2013, issued as U.S. Pat. No. 9,290,260 on Mar. 22, 2016, which claims the benefit of Provisional U.S. Patent Application No. 61/720,338, filed Oct. 30, 2012; and is also a continuation-in-part of U.S. patent application Ser. No. 13/664,416, filed Oct. 30, 2012, which is a continuation-in-part of U.S. patent application Ser. No. 13/251,216 filed Oct. 1, 2011, issued as U.S. Pat. No. 9,908,612 on Mar. 6, 2018; the entire disclosures of each of the above noted applications are incorporated by reference herein.

FIELD OF THE DISCLOSURE

This disclosure relates to systems and methods for controlling wings, and more specifically, to systems and methods for controlling wingtips to enhance aircraft performance and fuel efficiency.

BACKGROUND OF THE DISCLOSURE

In the commercial air transport industry, it is desirable to design aircraft configurations that yield reduced fuel burn per seat-mile, as fuel burn per seat-mile is a measure of fuel efficiency. Efficient aircraft configurations are ever more important as fuel costs continue to increase. Aircraft aerodynamic drag and fuel burn are generally reduced as the aspect ratio of the aircraft wing increases. Similarly, operating larger aircraft which carry more passengers and payload is generally more efficient between two destinations than flying several trips with smaller aircraft. Thus, larger aircraft and aircraft with longer wingspans tend to be more efficient. However, taxiway spacing and gate locations for most airports were established without providing adequate spacing for aircraft with the longer wingspans that may be produced with today's technology.

Some attempts have been made to improve aircraft wing efficiency without adding wingspan. Winglets extending vertically from the wingtips have improved aircraft fuel efficiency without significantly increasing wingspan. However, the efficiency added by winglets may not be as beneficial as that provided by extending the wingspan.

Therefore, it would be desirable to have a method and apparatus that takes into account at least sonic of the issues discussed above, as well as other possible issues.

SUMMARY

The illustrative embodiments may provide a method of controlling folding a wing. The method may include: receiving a status of at least one of an aircraft, and controlling, via a wing fold system of the aircraft, folding the wing. The method also may include receiving an automated command by the wing fold controller of the aircraft in response to receiving the status. The method also may include operating the wing fold system of the aircraft by the wing fold controller based on the automated command and the status. The method also may include transitioning a wingtip of a wing of the aircraft to one of a flight position of the wing and a folded position of the wing by an actuator of the wing fold system in response to operating the wing fold system by the wing fold controller.

The illustrative embodiments may also provide for an apparatus to control a wing fold system of a wing of an aircraft. The apparatus may include a wing fold controller configured to receive a status of at least one of the aircraft or the wing fold system of the aircraft. The apparatus also may include the wing fold controller configured to receive an automated command based on receiving the status. The apparatus also may include the wing fold controller configured to operate the wing fold system of the aircraft based on the command and the status. The apparatus also may include an actuator configured to transition a wingtip of a wing of the aircraft to one of a flight position of the wing and a folded position of the wing in response to operating the wing fold system by the wing fold controller.

The illustrative embodiments may also provide for an aircraft. The aircraft may include a fuselage configured for flight and a computer. The computer may include a bus, a processor connected to the bus, and a memory connected to the bus, the memory storing a program code which, when executed by the processor, performs a computer-implemented method. The program code may include program code for receiving a status of at least one of an aircraft and a wing fold system of the aircraft by the wing fold controller of the aircraft. The program code also may include program code for receiving an automated command by the wing fold controller of the aircraft in response to receiving the status. The program code also may include program code for performing, using the processor, operating the wing fold system of the aircraft by the wing fold controller based on the command and the status. The program code also may include program code for performing, using the processor, transitioning a wingtip of a wing of the aircraft to one of a flight position of the wing and a folded position of the wing by an actuator of the wing fold system in response to operating the wing fold system by the wing fold controller.

The features, functions, and benefits may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIGS. 3A and 3B are a flowchart of a method of folding a wing via a wing fold controller in accordance with an illustrative embodiment;

FIGS. 7A and 7B are a flowchart of a method of a wing fold controller in accordance with an illustrative embodiment;

FIG. 8 is a flowchart of a method of manufacturing a commercial aircraft;

FIG. 9 is a block diagram of a commercial aircraft; and

FIG. 10 is an illustration of a data processing system, in accordance with an illustrative embodiment;

FIG. 12A is a cross-sectional plan view diagram of a latch in a closed position with a lock in a disengaged position and respective centerlines of fixed lugs, unfixed lug, and a lock, substantially aligned in accordance with an illustrative embodiment; FIG. 12B is a cross-sectional plan view diagram of a lock unable to engage with misaligned lugs of a latch in accordance with an illustrative embodiment; FIG. 12C is a cross-sectional plan view diagram of a lock in a disengaged position when a centerline axis of an unfixed lug may not align with a centerline axis of fixed lugs and a centerline axis of a lock in accordance with an illustrative embodiment; FIG. 12D is a plan view diagram of a lock in an engaged position in a closed latch in accordance with an illustrative embodiment.

FIG. 14A is a diagram for a hydraulic control system for a wing fold system with a motor driven by variable differential hydraulic power, in accordance with an illustrative embodiment; FIG. 14B is a diagram for a hydraulic control system for a wing fold system with a motor driven by fixed differential hydraulic power, in accordance with an illustrative embodiment.

DETAILED DESCRIPTION

Figure 1:
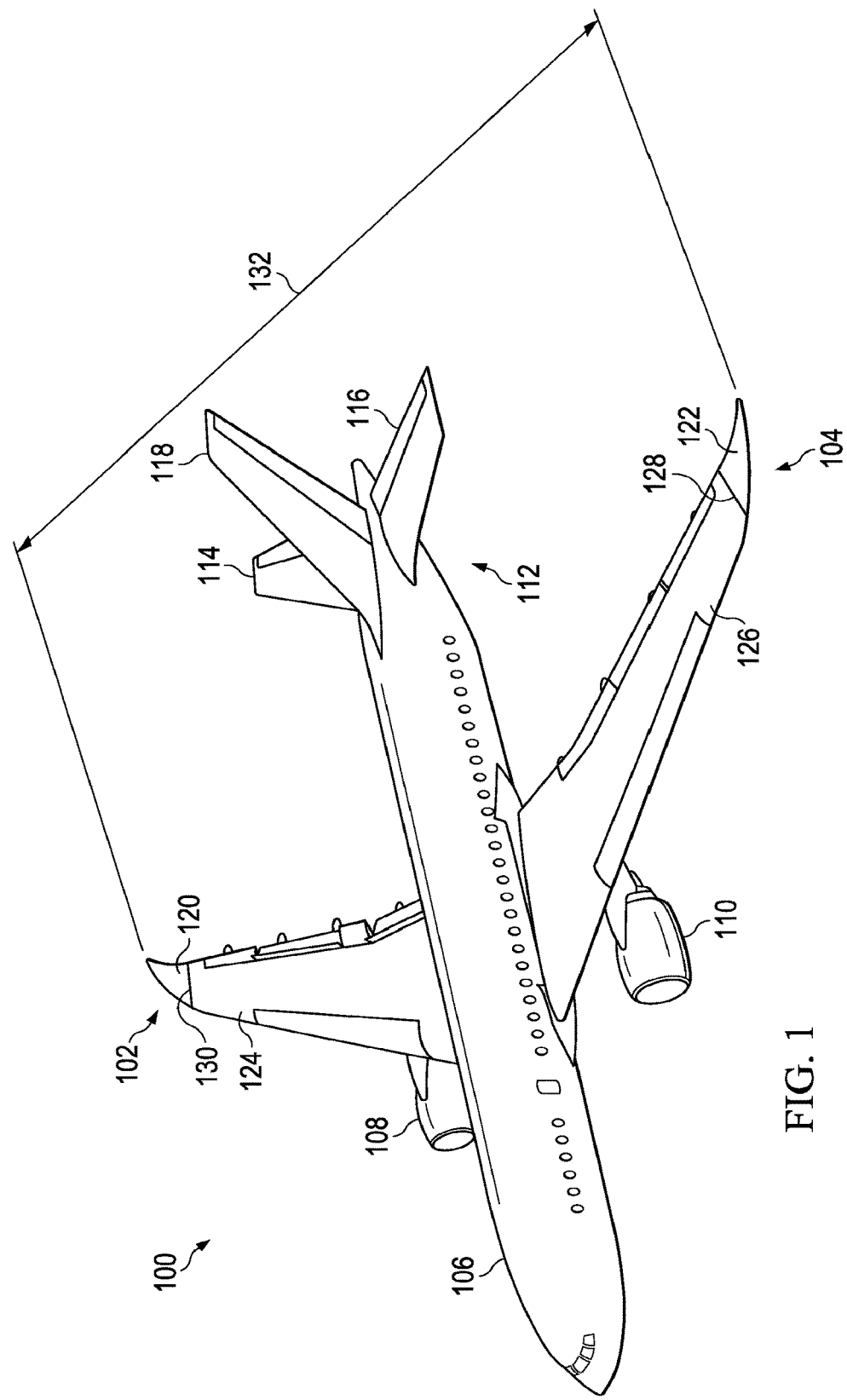
FIG. 1 is a diagram of an aircraft embodying a wing fold controller in accordance with an illustrative embodiment.

Illustrative embodiments may recognize and take into account one or more different considerations. For example, having an aircraft that may benefit from a long wingspan in flight, while being able to reduce the wingspan when operating at an airport such as but not limited to International Civil Aviation Organization "code E" or Federal Aviation Administration "code V" airports, may be desirable with respect to increasing the flexibility of where an aircraft may operate. In particular, by being able to reduce the wingspan while on the ground, an aircraft may be able to operate at more airports than if the aircraft could not reduce its wingspan while on the ground. With the longer wingspan during flight, benefits may include fuel efficiency.

Thus, control of the wingspan of an aircraft may be advantageously achieved through the use of a wing fold controller and wing fold system. The wing fold controller receives status of the aircraft and wing fold system and also receives commands to control the state of the wing fold system. Based on the status and the commands, the wing fold controller transitions the wing fold system between a folded position and a flight position, therein controlling the wingspan of the aircraft.

The illustrative embodiments may allow for folding and extending of wingtips that may be based on, without limitation, information about aircraft status and/or the environment around the aircraft. Folding and extending of wingtips may be automated.

Aircraft status may include, without limitation, a configuration of the aircraft, or a condition of any aircraft status that may affect any component or feature of a wing fold system. The environment around the aircraft may include, without limitation, aircraft location during preparation for takeoff or after landing, and/or structures, obstacles, or vehicles and/or weather phenomenon around the aircraft.

Architecture provided herein includes an electronic wingtip folding system that may allow for higher availability based in part on addition of redundant system components. Such components may include controllers, analog to digital converters, control lanes, control channels, and/or sensors. The system may be more adaptive to automated operation than any existing wing fold system.

The illustrative embodiments may promote more ease in modification to wingtip folding functionality. Such functionality may include modification of software code as opposed to altering mechanical hardware and kinematic interfaces. Diagnostic capability of the wingtip system may include earlier detection of vulnerable components which may reduce time of exposure to latent vulnerabilities.

The system may be less subject to dynamic mechanical feedback. The illustrative embodiments may promote greater ease in verifying functionality of the system, allowing for checks of the system for possible latent problems via automated, periodic system tests. For example, the system may verify that a moveable wingtip may be latched or locked to a fixed wingtip. The system may automatically attempt to fold the wingtip after sensing the wingtip may be in a latched and locked configuration. If the attempt is not successful in moving the wingtip system, the aircraft may be verified to be in a flightworthy condition (with regard to the wingtips). If the system is able to move the wingtip or critical parts of the system, then a crew-alerting system may annunciate that the aircraft is in a non-flightworthy condition.

The illustrative embodiments may promote a reduced workload on crew. Minimal or no crew actions may be required to configure wingtips for flight or ground operations including taxiway and gate operations. Location-based alerting may also be promoted. Prior to takeoff, the system may verify that the aircraft may be in flightworthy configuration before engine thrust may be applied. After landing touchdown, the system may verify that the aircraft may be in a correct configuration for operation around the airport where reduced wingspan is required such as, without limitation, taxiway, other runway, gate, ramp, apron, and/or maintenance facility operations.

The illustrative embodiments may provide improvements over previous wing control arrangements that may require large spatial integration volume. Such previous requirements may result in increased wing loft that may cause excess drag and greater weight. Previous arrangements also may not be readily modified or optimized once their designs are finalized.

By contrast, the illustrative embodiments may provide a more electrical and optical control which may reduce component volume and allow for optimization and modification via software updates. Further, the illustrative embodiments may alleviate concerns over lightning strikes and electromagnetic effects when considering optical signal transmission. A more electric architecture may allow for easier build and maintainability of aircraft through installation of replaceable components as opposed to mechanical components that may require individual shimming and rigging.

Unless otherwise noted and where appropriate, similarly named features and elements of an embodiment of one figure of the disclosure correspond to and embody similarly named features and elements of embodiments of the other figures of the disclosure.

Figure 2:
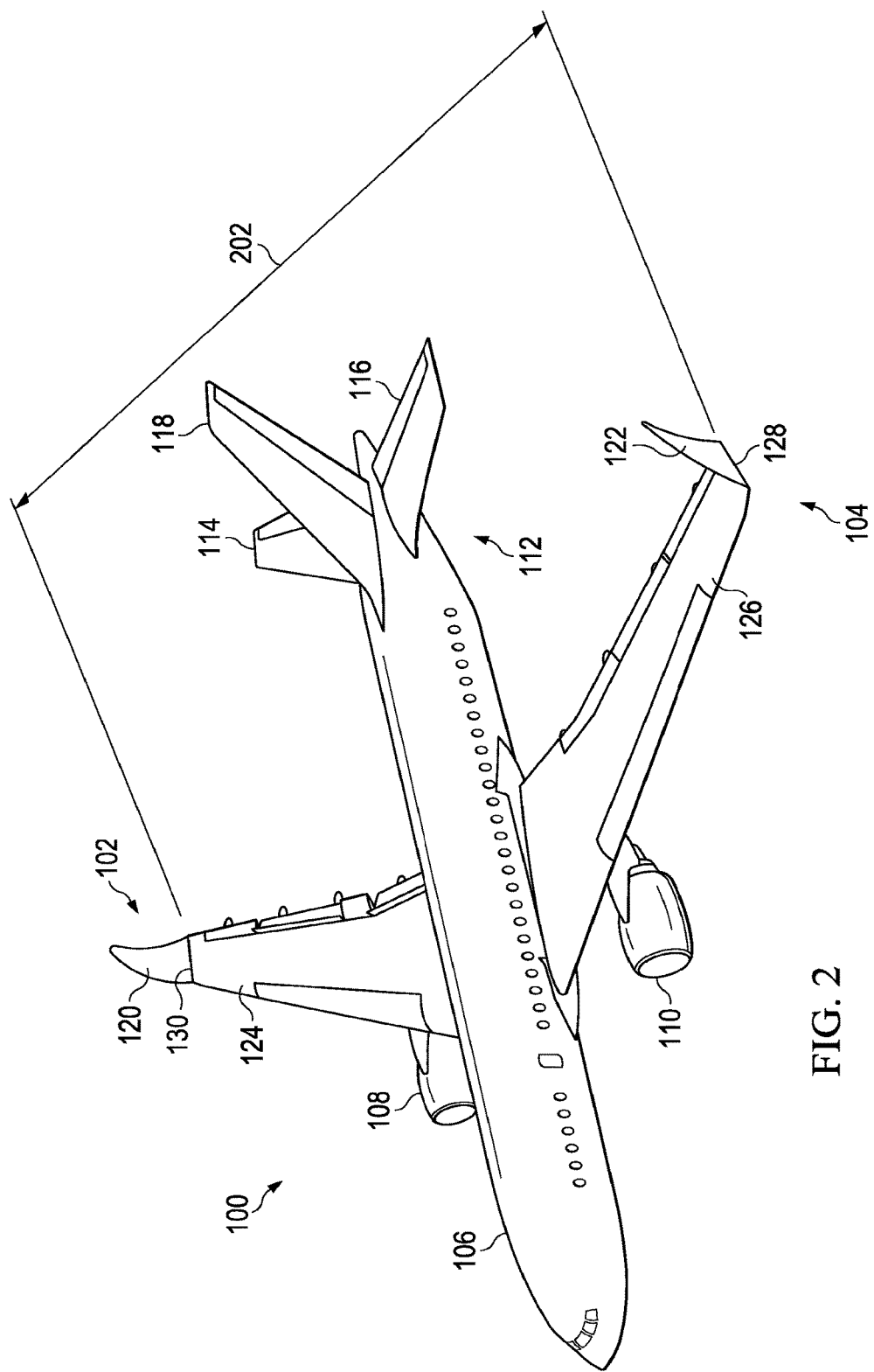
FIG. 2 is a diagram of an aircraft embodying a wing fold controller in accordance with an illustrative embodiment.

Attention is turned to the figures. FIG. 1 is a diagram of an aircraft embodying a wing fold controller in accordance with an illustrative embodiment. FIG. 2 is a diagram of an aircraft embodying a wing fold controller in accordance with an illustrative embodiment. Reference numerals used in FIG. 1 are also used in FIG. 2.

Aircraft 100 may be an example of an aircraft in which a wing fold system may be implemented in accordance with an illustrative embodiment. In an illustrative embodiment, aircraft 100 may include wing 102 and wing 104 attached to body 106; engine 108 attached to wing 102; engine 110 attached to wing 104. FIG. 1 depicts wings 102 and 104 of aircraft 100 in a flight position, with wingspan 132. FIG. 2 depicts wings 102 and 104 aircraft 100 in a folded position, with wingspan 202. Wingspan 202 may be less than wingspan 132.

Wing 102 may include fixed portion 124 and unfixed portion 120. Fixed portion 124 may be an inboard portion of wing 102, which may be fixed to body 106. Similarly, wing 104 may include fixed portion 126 and unfixed portion 122. Wing 102 may include wing fold system 130 to move unfixed portion 120 with respect to fixed portion 124. Wing 104 may include wing fold system 128 to move unfixed portion 122 with respect to fixed portion 126.

Body 106 has tail section 112. Horizontal stabilizer 114, horizontal stabilizer 116, and vertical stabilizer 118 are attached to tail section 112 of body 106. Wing fold system 128 and wing fold system 130 each include a latch assembly (not depicted in FIG. 1 or FIG. 2) in accordance with an illustrative embodiment.

Figure 3B:
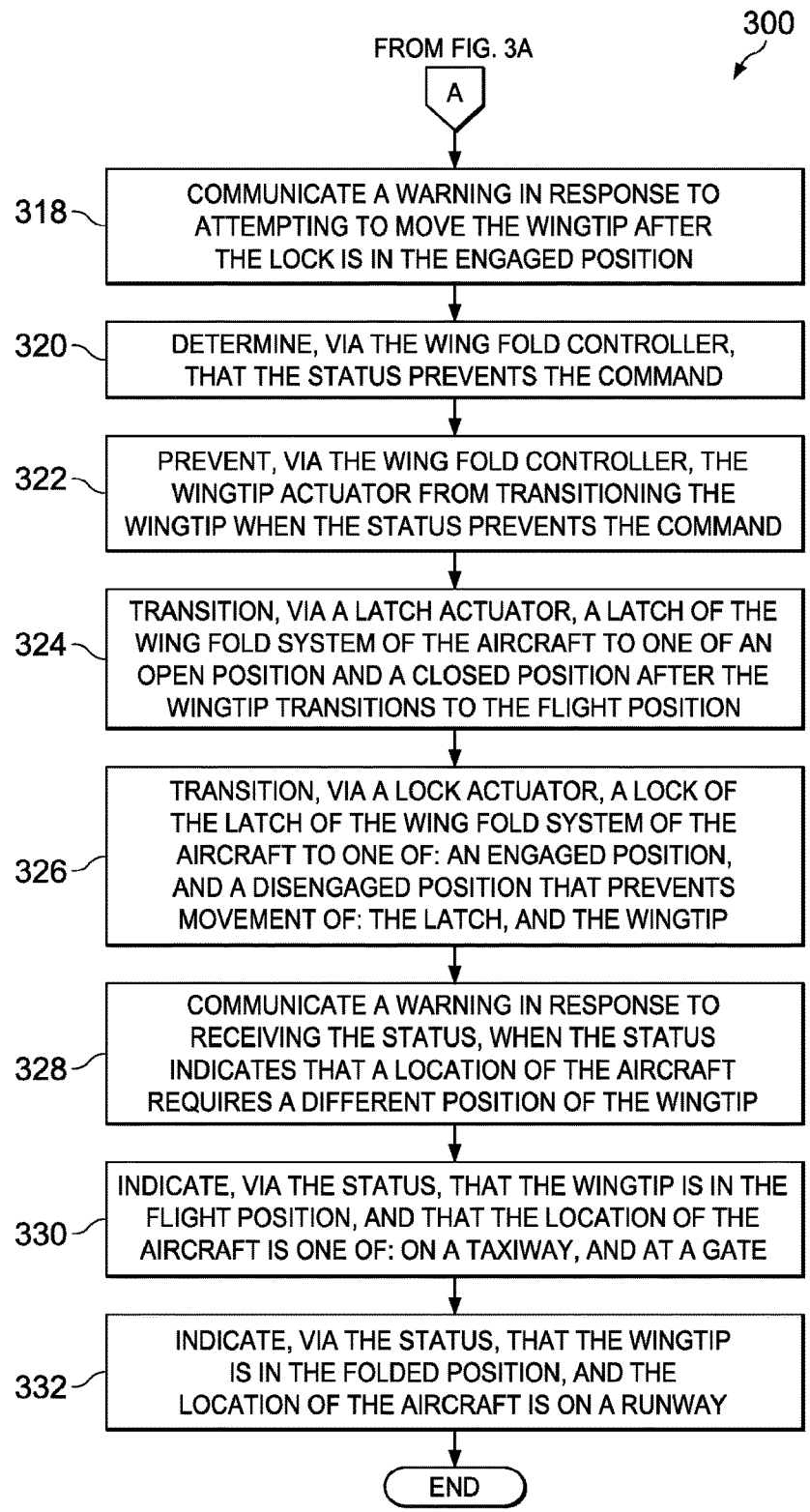

FIGS. 3A and 3B are a flowchart of a method 300 of folding a wing via a wing fold controller in accordance with an illustrative embodiment. Method 300 shown in FIG. 3 may be implemented using aircraft 100 of FIG. 1 and FIG. 2. The method shown in FIG. 3 may be implemented by a processor, such as processor unit 1004 of FIG. 10. The method shown in FIG. 3 may be a variation of the processes shown in FIG. 1 and FIG. 2 and FIG. 4 through FIG. 10. Although the operations presented in FIG. 3 are described as being performed by a "method," the operations are being performed by at least one tangible processor or using one or more physical devices, as described elsewhere herein. The term "method" also may include computer instructions stored on a non-transitory computer readable storage medium.

Method 300 may begin as the method may receive a status of at least one of an aircraft and a wing fold system of the aircraft by the wing fold controller of the aircraft (operation 302). The status may be displayed on a display.

Next, the method may receive a command by the wing fold controller of the aircraft in response to receiving the status (operation 304). The command may be an automated command.

Next, the method may operate the wing fold system of the aircraft by the wing fold controller based on the command and the status (operation 306). Next, the method may transition a wingtip of a wing of the aircraft to one of a flight position of the wing and a folded position of the wing by an actuator of the wing fold system in response to operating the wing fold system by the wing fold controller (operation 308).

Next, the method may indicate, via the status, that the aircraft may be on a taxiway and the command directs the wing to the folded position (operation 310). Alternatively, the method may indicate, via the status, that the aircraft may be rolling toward a taxiway and the command directs the wing to the folded position.

Next, the method may indicate, via the status, that the aircraft may be on a runway and the command directs the wing to the flight position (operation 312). Alternatively, the method may indicate, via the status, that the aircraft may be rolling toward a runway and the command directs the wing to the flight position. Next, the method may display the status of the wing fold system on a display (operation 314).

Next, the method may determine, via the wing fold controller, if a lock of the wing fold system may be operational via attempting to move the wingtip via the actuator after the lock of the wing fold system may be in an engaged position (operation 316). Operation 316 may also be a test of the operation of a latch of the wing fold system.

Next, the method may communicate a warning in response to attempting to move the wingtip after the lock may be in the engaged position (operation 318). Next, the method may determine, via the wing fold controller, that the status prevents the command (operation 320).

Next, the method may prevent, via the wing fold controller, the wingtip actuator from transitioning the wingtip when the status prevents the command (operation 322). Next, the method may transition, via a latch actuator, a latch of the wing fold system of the aircraft to one of an open position and a closed position after the wingtip transitions to the flight position (operation 324). Next, the method may transition, via a lock actuator, a lock of the latch of the wing fold system of the aircraft to one of: an engaged position, and a disengaged position that prevents movement of: the latch, and the wingtip (operation 326).

Next, the method may communicate a warning in response to receiving the status, when the status indicates that a location of the aircraft requires a different position of the wingtip (operation 328). Next, the method may indicate, via the status, that the wingtip may be in the flight position, and that the location of the aircraft may be one of: on a taxiway, and at a gate (operation 330). Alternatively, the aircraft location may be inside a building or in proximity to a vehicle or obstacle that the wing fold controller may predict may contact the wingtip. Further, the aircraft may be rolling toward a taxiway, a gate, a building, a vehicle or obstacle that the wing fold controller may predict may contact the wingtip.

Next, the method may indicate, via the status, that the wingtip may be in the folded position, and the location of the aircraft may be on a runway (operation 332). Alternatively, the aircraft location may be rolling toward a runway.

Figure 4:
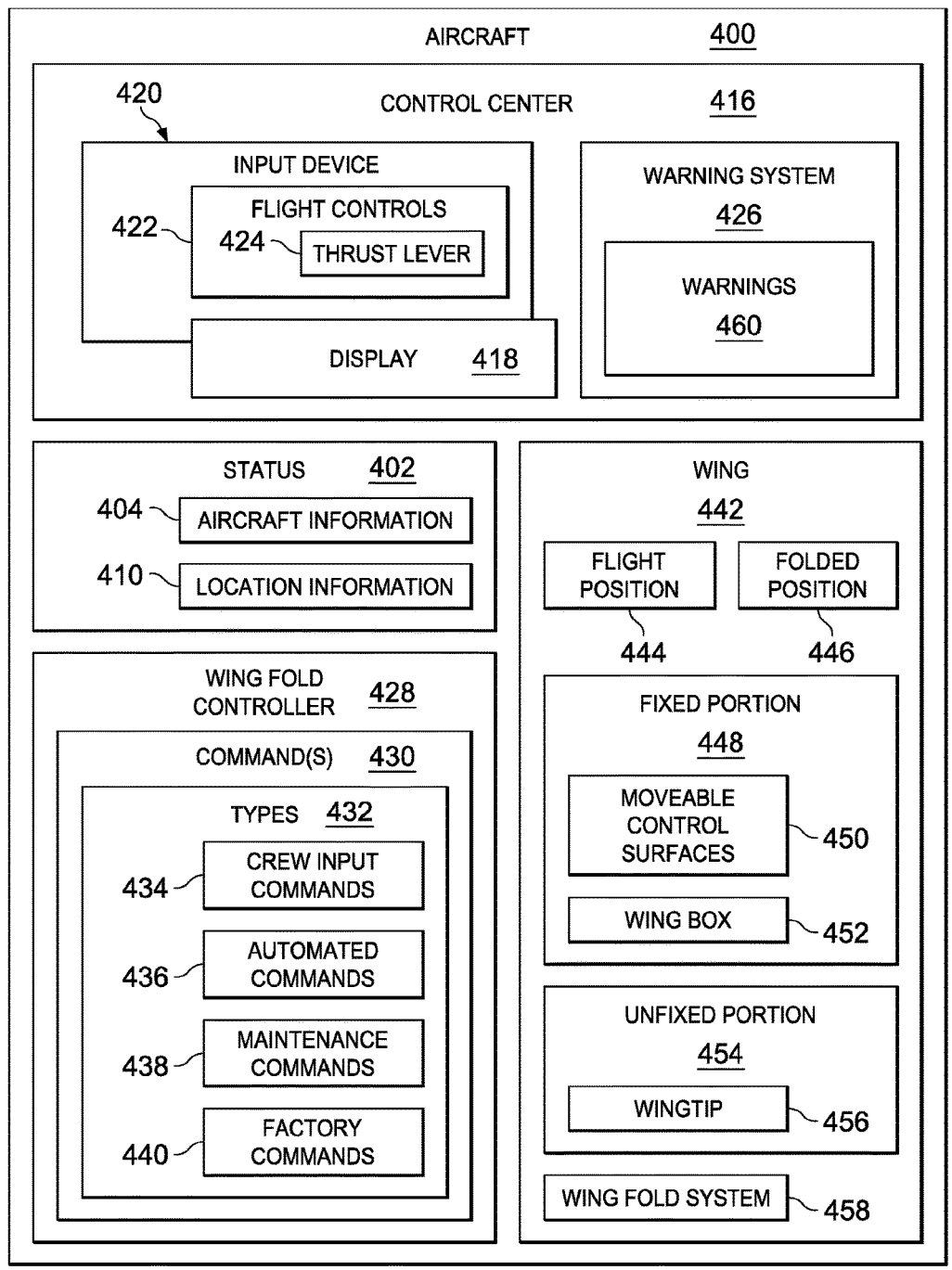
FIG. 4 is a block diagram of an aircraft embodying a wing fold controller in accordance with an illustrative embodiment.

FIG. 4 is a block diagram of an aircraft embodying a wing fold controller in accordance with an illustrative embodiment. Aircraft 400 may be an illustrative embodiment of aircraft 100 depicted in FIG. 1 and FIG. 2. Aircraft 400 may include several features, elements, and components, including: status 402, control center 416, wing fold controller 428, and wing 442.

Status 402 may include aircraft information 404 and location information 410. Aircraft information 404 may include information related to aircraft 400 that may be used by wing fold controller 428 to control wing fold system 458. Aircraft information 404 may indicate a status including, without limitation, one or more of: whether aircraft 400 may be in-flight, whether aircraft 400 may be standing, whether aircraft 400 may be taxiing, whether aircraft 400 may be performing a takeoff, whether aircraft 400 may be performing an initial climb, whether aircraft 400 may be en route, whether aircraft 400 may be maneuvering, whether aircraft 400 may be performing an approach, whether aircraft 400 may be landing, a speed of aircraft 400, a wind speed of air surrounding aircraft 400, a status of an aircraft system, and/or whether aircraft 400 may be in a flightworthy configuration. An aircraft that may be standing may be aircraft 400 that may be on the ground, but the location information 410 of aircraft 400 may not be changing. An aircraft system that may be used by wing fold controller may include, without limitation, a hydraulic system, an electrical system, wiring, an actuator, and a controller.

Location information 410 may include information related to a position of aircraft 400 relative to its surroundings that may be used by wing fold controller 428 to control wing fold system 458. Surroundings related to aircraft 400 may include, without limitation: a taxiway, an apron, a de-icing station, a run-up pad, a runway, a gate, a maintenance facility, any obstacle, and/or any vehicle. Information on relative surroundings may be provided by, without limitation, an onboard database, datalinked information, Global Positioning System (GPS) derived information, radar, and/or Automatic Dependent Surveillance-Broadcast (ADS-B) derived information. Location information 410 may indicate and may be used to determine if wing 442 may be required to be in folded position 446, such as when aircraft 400 may be at a point on an airport, such as on a taxiway or at a gate, that may require a limited wingspan.

Control center 416 may be a cockpit in aircraft 100. Alternatively, control center 416 may be outside aircraft 100 and connected via data link to aircraft 100. Without limitation, control center 416 may include a maintenance facility or computer system. Control center 416 may contain input device 420, display 418, and warning system 426. Input device 420 may be used to control and operate aircraft 100. Without limitation, input device 420 may be include a switch, screen or device in a cockpit, a controller or other processor in or linked to aircraft 400, or by an aircraft operator in control center 416. An aircraft operator may be a crew member in a cockpit, or another operator, which may be a processor in control center 416.

Display 418 may display any portion of status 402 to aircraft 400. Display 418 may be viewed by an operator of aircraft 400. Display 418 may be one of several displays in control center 416 that are of any type, size, or shape to display information to crew members. Display 418 may be a touch sensitive display to allow for inputs from a crew member to control aircraft 400 via display 418.

Input device 420 may control operation of aircraft 400 and allow command(s) 430 to be sent to wing fold controller 428. Input device 420 may include any number of flight controls 422 that control flight of aircraft 400. Flight controls 422 may include thrust lever 424 that controls thrust of aircraft 400. Input device 420 may include display 418 when display 418 allows for inputs.

Warning system 426 of aircraft 400 may issue warnings 460 to control center 416 or to associated facilities. Without limitation, associated facilities may include: air traffic control facilities, airline dispatch facilities, or airline or manufacturer maintenance facilities. Warnings 460 may include transmissions to an airport control tower, to nearby aircraft, to a dispatcher for aircraft 400, to a maintenance monitor for aircraft 400, and/or to other systems outside aircraft 400 that monitor aircraft 400. Warnings 460 may indicate when wingtip 456 of wing 442 may be not in a proper position based on status 402 of aircraft 400. Warnings 460 may also indicate when wing fold system 458 may be not properly functioning. Warnings 460 may be communicated visually, mechanically, electronically, and/or audibly. Warnings 460 may be displayed via display 418. Warnings 460 may be integrated into existing takeoff or landing configuration warning systems. Warnings 460 may be a single warning or a plurality of warnings. The single warning or the plurality of warnings may be sent to a single recipient or to multiple recipients.

When thrust lever 424 of aircraft 400 may be moved to a position that may be inappropriate for a position of wingtip 456, command 430 of thrust lever 424 may be prevented. If thrust lever 424 may be moved to a takeoff position, but wingtip 456 may be in a position that may not be allowed for takeoff, such as folded position 446, warnings 460 may be issued. Further, command(s) 430 to increase thrust may be prevented until wingtip 456 may be in an appropriate position. Alternatively, or additionally, wing fold controller 428 may command 430 wingtip 456 to flight position 444. Command 430 may be an automated command.

Warning system 426 may send warnings 460 based on a location of aircraft 400. Warnings 460 may include aircraft location data. Warnings 460 may include a recommended action to mitigate warnings 460. Location-based warnings 460 may be used before takeoff to verify aircraft 400 may be in a correct configuration for takeoff when aircraft 400 approaches the takeoff end of a runway. The correct configuration may be based on aircraft information 404. Aircraft information 404 may include a position of wingtip 456. Thus, warning system 426 may issue warnings 460 if wingtip 456 was not extended in flight position 444 before takeoff.

Warnings 460 based on location information 410 of aircraft 400 may be used after landing to verify aircraft 400 may be in a correct configuration for airport compatibility. The correct configuration for airport compatibility may include having wingtip 456 in folded position 446 before aircraft 400 operates on designated airport areas. Designated airport areas may include a taxiway, an apron, a de-icing station, a run-up pad, a runway, a gate, and/or even certain runways. For example, an airport may limit taxiway use to certain aircraft wing-span lengths. If aircraft 400 wingspan exceeds a particular taxiway wingspan limit with wingtip 456 in flight position 444, but aircraft 400 may be within the limit when wingtip 456 may be in folded position 446, warnings 460 could be issued before aircraft 400 enters the particular taxiway with wingtip 456 in flight position 444. As another example, warning system 426 may issue a warning if aircraft 400 was approaching a gate with a wingtip configuration exceeding a wingspan limit of the gate.

Wing fold controller 428 may include any grouping of one more processors and programs of aircraft 400 that operate aircraft 400. Wing fold controller 428 may be a component of a computer inside control center 416, a component of a computer outside control center 416, a component of a computer or controller of wing fold system 458 in wing 442, or any combination thereof.

Wing fold controller 428 may receive status 402 related to aircraft 400 and to wing fold system 458. Wing fold controller 428 may receive commands 430 via at least crew input commands 434. Wing fold controller 428 may operate wing fold system 458 based on command(s) 430 received.

Wing fold controller 428 may determine that a lock of wing fold system 458 may be operational. If the lock may be operational, then wingtip 456 should not be able to move when wingtip 456 may be in flight position and the lock may be engaged. To make the determination, wing fold controller 428 may attempt to move wingtip 456 after a lock of wing fold system 458 may be in an engaged position with respect to a latch of wing fold system 458 that may be in a closed position. Wing fold controller 428 may attempt to move wingtip 456 by attempting to move unfixed portion 454. Wing fold controller 428 communicates warnings 460 via warning system 426 in response to attempting to move wingtip 456 when wingtip 456 moves even though the lock may be in the engaged position and the latch may be in the closed position.

Wing fold controller 428 may be a single microcontroller or microprocessor, or may be one in a group of processors of aircraft 400. Wing fold controller 428 may receive input data, status data, and configuration data. Wing fold controller 428 may send command data and alert data based on input data, status data, and configuration data.

Wing fold controller 428 may be implemented in software, hardware, or a combination of software and hardware. When software may be used, the operations performed by wing fold controller 428 may be implemented in program code configured to run on a processor unit. The processor unit may, for example, be one or more central processor units in a computer system that may be a general purpose computer. General purpose computers are described with respect to FIG. 10.

When hardware may be employed, the hardware may include circuits that operate to perform the operations in wing fold controller 428. In the illustrative examples, the hardware may take the form of a circuit system, an integrated circuit, an application specific integrated circuit (ASIC), a programmable logic device, some other suitable type of hardware configured to perform a number of operations, or a combination thereof. With a programmable logic device, the device may be configured to perform the number of operations. The programmable logic device may be reconfigured at a later time or may be permanently configured to perform the number of operations.

Examples of programmable logic devices may include, for example, a programmable logic array, programmable array logic, a field programmable logic array, a field programmable gate array, and other suitable hardware devices. Additionally, the processes may be implemented in organic components integrated with inorganic components and/or may be included entirely of organic components excluding a human being. For example, the processes may be implemented as circuits in organic semiconductors.

Command(s) 430 may be received by wing fold controller 428. Command(s) 430 may be received from input device 420. Types 432 of command(s) 430 include crew input commands 434, automated commands 436, maintenance commands 438, and factory commands 440. Command(s) 430 may be any one of or a combination of crew input commands 434, automated commands 436, maintenance commands 438, and factory commands 440. Command(s) 430 may be used to control wing fold system 458.

Wing 442 may be an illustrative embodiment of wing 102 and/or wing 104 in FIG. 1 and FIG. 2. Wing 442 may include flight position 444, folded position 446, fixed portion 448, unfixed portion 454, and wing fold system 458. The folding of wing 442 may allow for aircraft 400 to be flown with a wingspan that may be longer than that allowed for ground operations at an airport from which aircraft 400 may take off and land. Wing 442 may provide lift for aircraft 100 in FIG. 1.

Flight position 444 may be a state of wing 442. When wing 442 of aircraft 400 may be in flight position 444, aircraft 400 may be ready for flight. For example, wing 102 and wing 104 of FIG. 1 are shown in flight position 444.

Folded position 446 may be a state of wing 442. When wing 442 of aircraft 400 may be in folded position 446, aircraft 400 may not be ready for flight, but a wingspan of aircraft 400 may be smaller than the wingspan of aircraft 400 with wing 442 in flight position 444 and allow use of aircraft 400 at airports that may require smaller wingspans.

Fixed portion 448 may be an illustrative embodiment of fixed portion 124 of wing 102 and may be an embodiment of fixed portion 126 of wing 104 of FIG. 1 and FIG. 2. Fixed portion 448 of wing 442 may include wing box 452 and moveable control surfaces 450. Wing box 452 may be a structural component from which wing 442 extends. Moveable control surfaces 450 may include flaps that may allow for controlling flight of aircraft 400.

Unfixed portion 454 may be an embodiment of unfixed portion 120 of wing 102 and may be an embodiment of unfixed portion 122 of wing 104 of FIG. 1 and FIG. 2. Unfixed portion 454 may rotate with respect to fixed portion 448 of wing 442 between flight position 444 of wing 442 and folded position 446 of wing 442. Unfixed portion 454 of wing 442 may include wingtip 456. Wingtip 456 may not include moveable control surfaces 450.

Figure 5:
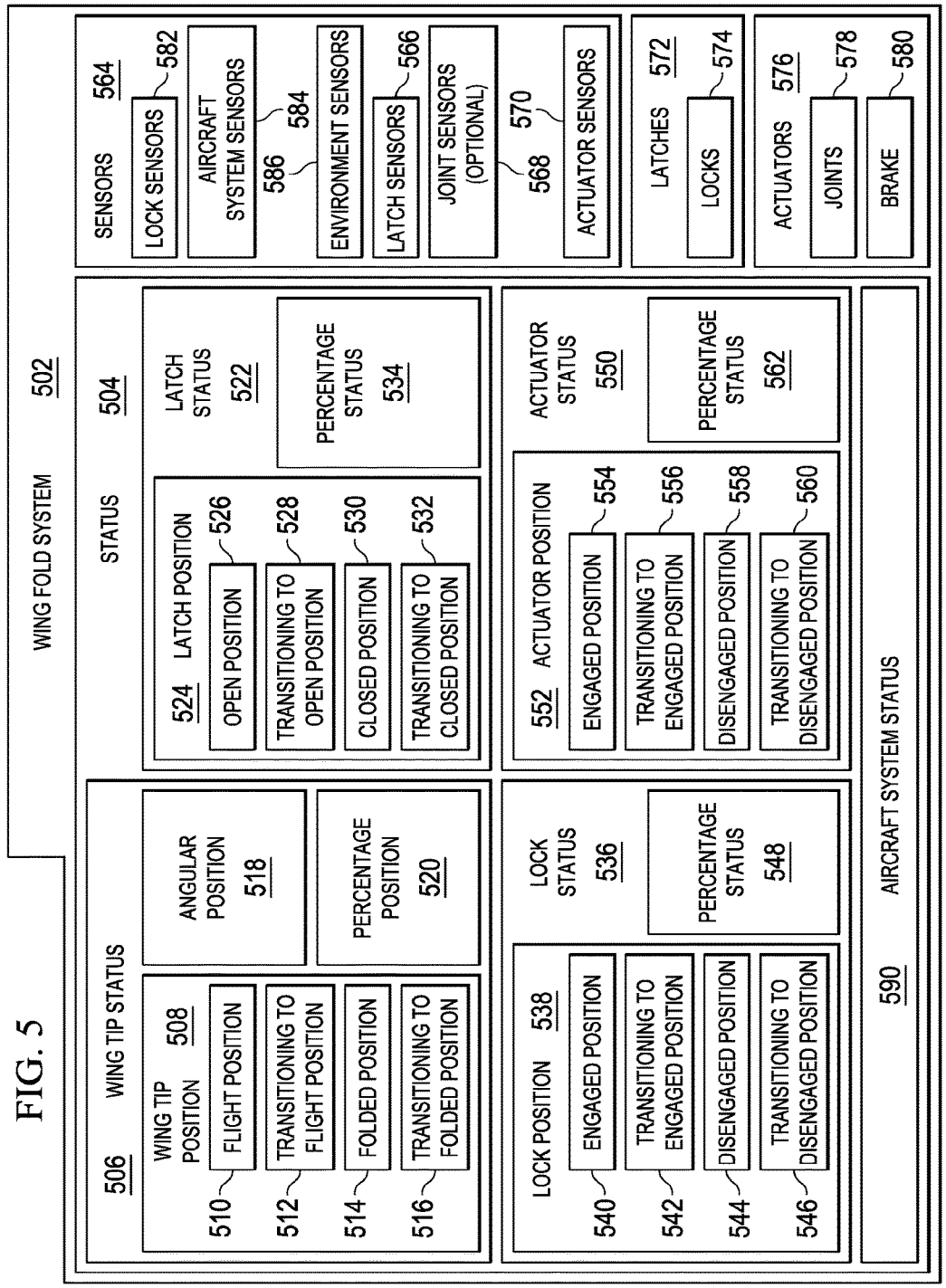
FIG. 5 is a block diagram of a wing fold system in accordance with an illustrative embodiment.

FIG. 5 is a block diagram of a wing fold system 502 in accordance with an illustrative embodiment. Wing fold system 502 may be an illustrative embodiment of wing fold system 128 and wing fold system 130 of aircraft 100 of FIG. 1 and FIG. 2 and wing fold system 458 of aircraft 400 of FIG. 4. Wing fold system 502 may move wingtip 456 of wing 442 of an aircraft between flight position 510 and folded position 514. Wing fold system 502 may be controlled by a wing fold controller 428 of aircraft 400.

Wing fold system 502 may include several features, elements, and components, including: status 504, sensors 564, latches 572, actuators 576, and joints 578. Wing fold system 458 may move wingtip 456 between flight position 444 and folded position 446. Wing fold system 458 may be controlled by wing fold controller 428.

Status 504 may include wingtip status 506, latch status 522, lock status 536, actuator status 550, and aircraft system status 590. Status 504 of wing fold system 502 may include information related to wing fold system 458 of FIG. 4.

Wingtip status 506 may indicate a status of wingtip 456 and may include wingtip position 508, angular position 518, and percentage position 520. Wingtip position 508 may indicate a state of wingtip 456 and may include flight position 510, transitioning to flight position 512, folded position 514, and transitioning to folded position 516. Angular position 518 may indicate an angle of wingtip 456 with respect to wing 442. Percentage position 520 may indicate a percentage related to a completion amount of a transition between flight position 444 and folded position 446.

Flight position 510 may indicate that wingtip 456 may be ready for flight. Transitioning to flight position 512 may indicate that wingtip 456 may be being moved to flight position 510. Folded position 514 may indicate that wingtip 456 may be fully folded so as to reduce an overall wingspan of an aircraft. Transitioning to folded position 516 may indicate that wingtip 456 may be being moved to folded position 514.

Latch status 522 may indicate a status of each latch of latches 572 or of any group of latches 572. Latch status 522 may indicate a status of latches 572 of wing fold system 502 and may include latch position 524 and percentage status 534. Without limitation, latch status 522 may also indicate a status for any actuator, wiring, hydraulic power, electric power, or sensor associated with the particular latch among latches 572.

Latch position 524 may indicate a position of a particular latch among latches 572 of wing fold system 502 and may include open position 526, transitioning to open position 528, closed position 530, and transitioning to closed position 532. Percentage status 534 may indicate a percentage related to a completion amount of a transition between open position 526 and closed position 530 of the particular latch among latches 572.

Open position 526 may indicate that a particular latch among latches 572 may be open and wingtip 456 may be not secured. Transitioning to open position 528 may indicate that the particular latch may be being moved to open position 526 to release wingtip 456 so that it may be folded. Closed position 530 may indicate that the particular latch may be closed and wingtip 456 may be secured. Transitioning to closed position 532 may indicate that the particular latch may be being moved to closed position 530 to secure wingtip 456.

Lock status 536 may indicate a status of each lock of a particular latch among latches 572 or of any group of locks 574 of latches 572. Lock status 536 may indicate a status of locks 574 of latches 572 of wing fold system 502 and may include lock position 538 and percentage status 548. Without limitation, lock status 536 may also indicate a status for any actuator, wiring, hydraulic power, electric power, or sensor associated with a particular latch among locks 574.

Lock position 538 may indicate a position of a lock of wing fold system 502 and may include engaged position 540, transitioning to engaged position 542, disengaged position 544, and transitioning to disengaged position 546. Percentage status 548 may indicate a percentage related to a completion amount of a transition between engaged position 540 and disengaged position 544.

Engaged position 540 may indicate that a lock may be engaged with a latch and may indicate that the latch may be secured. Engaged position 540 may be associated with wingtip 456 being in flight position 510. Transitioning to engaged position 542 may indicate that locks 574 may be transitioning to engaged position 540 to secure latches 572. Disengaged position 544 may indicate that a lock 574 may be not engaged with latches 572 and may indicate that latches 572 may be not secured. Disengaged position 544 may be associated with wingtip 456 being in folded position 514. Transitioning to disengaged position 546 may indicate that locks 574 may be transitioning to disengaged position 544 to release latches 572 so that wingtip 456 may fold.

Actuator status 550 may indicate a status of each actuator of wing fold system 502 or of any group of actuators 576. Actuator status 550 may include actuator position 552 and percentage status 562. Without limitation, actuator status 550 may also indicate a status for any controller, wiring, hydraulic power, electric power, or sensor associated with a particular actuator among actuators 576.

Actuator position 552 may indicate a position of an actuator of wing fold system 502 and may include engaged position 554, transitioning to engaged position 556, disengaged position 558, and transitioning to disengaged position 560. Percentage status 562 may indicate a percentage related to a completion amount of a transition between engaged position 554 and disengaged position 558.

Engaged position 554 may indicate that an actuator of wing fold system 502 may be engaged with a lock, latch, or wingtip 456. Transitioning to engaged position 556 may indicate that an actuator may be transitioning to engaged position 554 to actuate a lock, latch, or wingtip 456. Disengaged position 558 may indicate that an actuator may be not engaged with a lock, latch, or wingtip 456 and may be not providing any force thereto. Transitioning to disengaged position 560 may indicate that an actuator may be transitioning to disengaged position 558 to release a latch so that wingtip 456 may fold.

Aircraft system status 590 may include a status of any aircraft system that may affect wing fold system 502. Without limitation, aircraft hydraulic system, electrical system, wiring, controllers, and motors may affect wing fold system 502. Without limitation, a failure of electrical or hydraulic power to a component of wing fold system 502 may affect performance of a component of wing fold system 502.

Sensors 564 may sense positions and/or loads of components of wing fold system 502. Sensors 564 may include: latch sensors 566 that may sense one or more of status and position of a latch; joint sensors 568 that may sense one or more of status, position, and load of a joint; actuator sensors 570 that may sense one or more of status, position, and load of an actuator; and lock sensors 582 that may sense one or more of status and position of a lock.

Sensors 564 may also include aircraft system sensors 584, and environment sensors 586. Aircraft system sensors 584 may sense one or more of a status or functionality of various aircraft systems that may include, a hydraulic system, an electrical system, wiring, a flight control system, wing fold controller 428, and/or control center 416. Without limitation, aircraft system sensors 584 may include a pitot or static system, a navigation system receiver, a thrust lever position, hydraulic pressure, hydraulic quantity, electrical voltage or current, and solenoid and/or a valve position. Without limitation, aircraft system sensors 584 may provide information to determine wind speed, and/or aircraft airspeed or ground speed.

Environment sensors 586 may include sensors that detect conditions present around and/or approaching aircraft 400. Conditions present around and/or approaching aircraft 400 may include, a physical location of aircraft 400, weather, a building, an airport structure, and any obstacle or vehicle around and/or approaching aircraft. Without limitation, environment sensors may include radar, an aircraft air-ground sensor, a Global Positioning System receiver, and/or an Automatic Dependent Surveillance-Broadcast (ADS-B) receiver.

Latches 572 may latch and secure wingtip 456 in flight position 510. Latches 572 may include locks 574 that may lock latches 572 in closed position 530 to secure latches 572 and wingtip 456 in flight position 510.

Actuators 576 may actuate various components of wing fold system 502. Actuators 576 may include a wingtip actuator that may transition wingtip 456 between flight position 510 and folded position 514. The wingtip actuator may move wingtip 456 by moving unfixed portion 454.

The wingtip actuator may include brake 580. Brake 580 may be any type of brake as may be known in the art for inhibiting motion of wingtip 456. Without limitation, brake 580 may be a pressure-off brake that may be spring biased and inhibit motion of wingtip actuator unless hydraulic pressure may be present on the brake. Thus, hydraulic power may be withheld from the wingtip actuator, and the brake may inhibit movement of the wingtip actuator while hydraulic pressure may be removed from components of wing fold system 502 such as but not limited to the wingtip actuator.

Brake 580 may provide redundancy to ensure that when wingtip position 508 may be in flight position 510 or in folded position 514, that actuator will not attempt to move wingtip 456 without a command. Brake 580 may provide redundancy to ensure that hydraulic fluid is not in a hydraulic actuator except when actuation of the actuator is commanded. Brake 580 may also be activated by wing fold controller 428 based on another status 504.

Actuators 576 may also include a latch actuator that may transition latches 572 between open position 526 and closed position 530. Actuators 576 may also include a lock actuator that may transition locks 574 of latches 572 between engaged position 540 and disengaged position 544.

Joints 578 may allow movement of wingtip 456 of a wing with respect to wing 442. Wingtip 456 of wing 442 may move, rotate, or fold with respect to wing 442 via joints 578. Joints 578 may be located on fixed portion 448 and/or unfixed portion 454 and may connect fixed portion 448 and unfixed portion 454.

Figure 6:
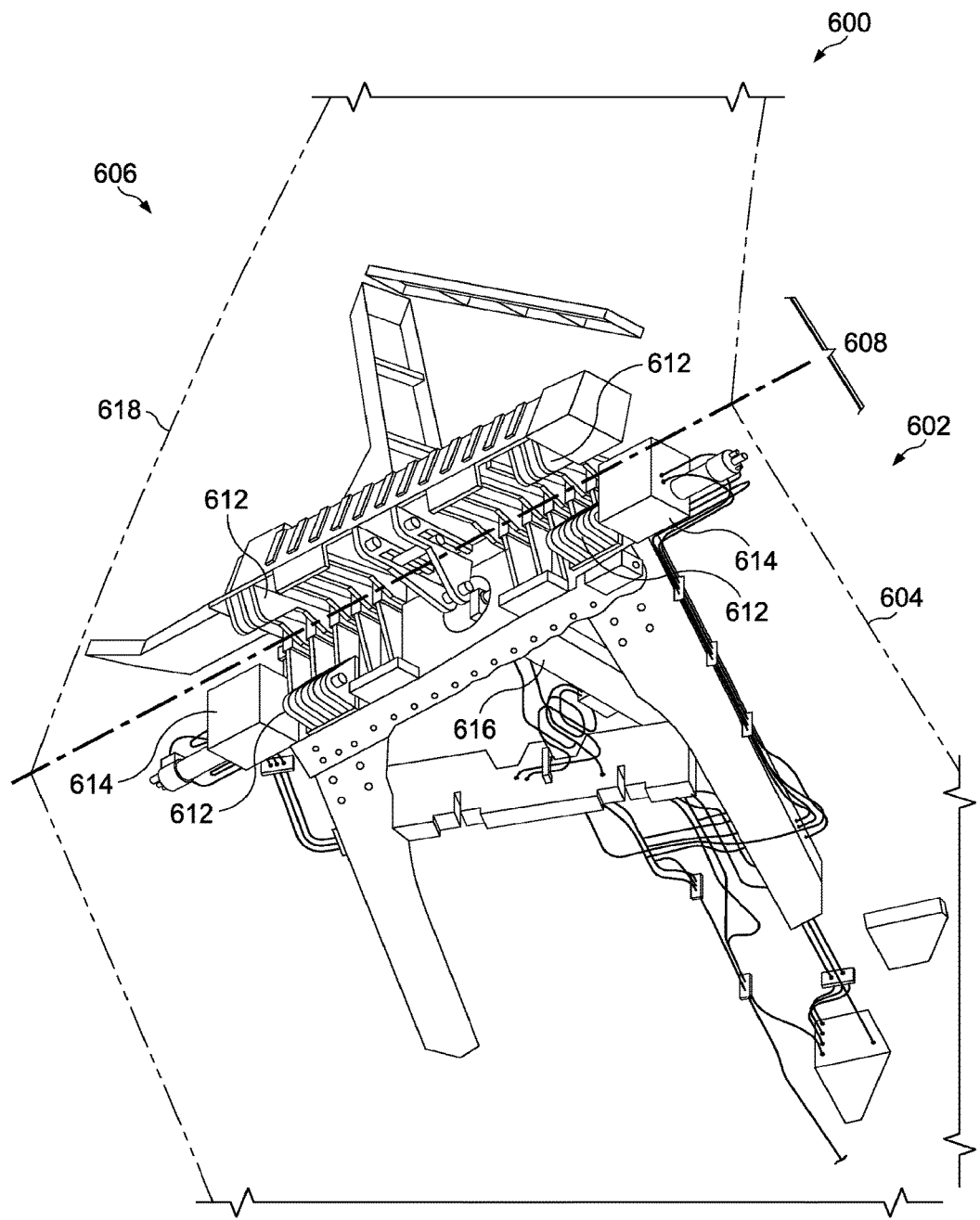
FIG. 6 is a diagram of a wing embodying a wing fold system in accordance with an illustrative embodiment.

FIG. 6 is a diagram of a wing embodying a wing fold system in accordance with an illustrative embodiment. FIG. 6 depicts a wing embodying a wing fold system controlled by a wing fold controller. Wing 602 may be an illustrative embodiment of wing 442 of aircraft 400 of FIG. 4 and wing 102/104 of aircraft 100 of FIG. 1. FIG. 6 depicts an underside of wing 602 in a folded position. Wing 602 may include fixed portion 604, unfixed portion 606, and wing fold system 608.

Fixed portion 604 may be an embodiment of fixed portion 124 of wing 102 and fixed portion 126 of wing 104 of FIG. 1 and FIG. 2. Fixed portion 604 may be an embodiment of fixed portion 448 of wing 442 of FIG. 4. Fixed portion 604 of wing 602 may include a wing box and moveable control surfaces (not shown).

Unfixed portion 606 may be an embodiment of unfixed portion 120 of wing 102, unfixed portion 122 of wing 104 of FIG. 1, and unfixed portion 454 of wing 442 of FIG. 4. Unfixed portion 606 may rotate with respect to fixed portion 604 of wing 602 between a flight position and a folded position. Unfixed portion 606 of wing 602 may include wingtip 618. Wingtip 618 may not include moveable control surfaces. In alternative embodiments, a control surface may be included in wingtip 618.

Wing fold system 608 may be an embodiment of a wing fold system of a wing of an aircraft, such as wing 102 and wing 104 of aircraft 100 of FIG. 1 and FIG. 2. Wing fold system 608 may be an embodiment of wing fold system 458 of wing 442 of aircraft 400 of FIG. 4. Wing fold system 608 may be an embodiment of wing fold system 502 of FIG. 5. Wing fold system 608 may move unfixed portion 606 with respect to fixed portion 604 in response to a wing fold controller, such as wing fold controller 428 of FIG. 4. Wing fold system 608 may include latches 612, locks 614, and actuator 616.

Latches 612 may latch and secure wingtip 618 in a flight position. Locks 614 may engage latches 612 when latches 612 may be in a closed position to prevent latches 612 from opening while wingtip 618 may be in flight position. Wingtip actuator 616 may actuate wingtip 618 to transition wingtip 618 between the flight position and a folded position.

Figure 7B:
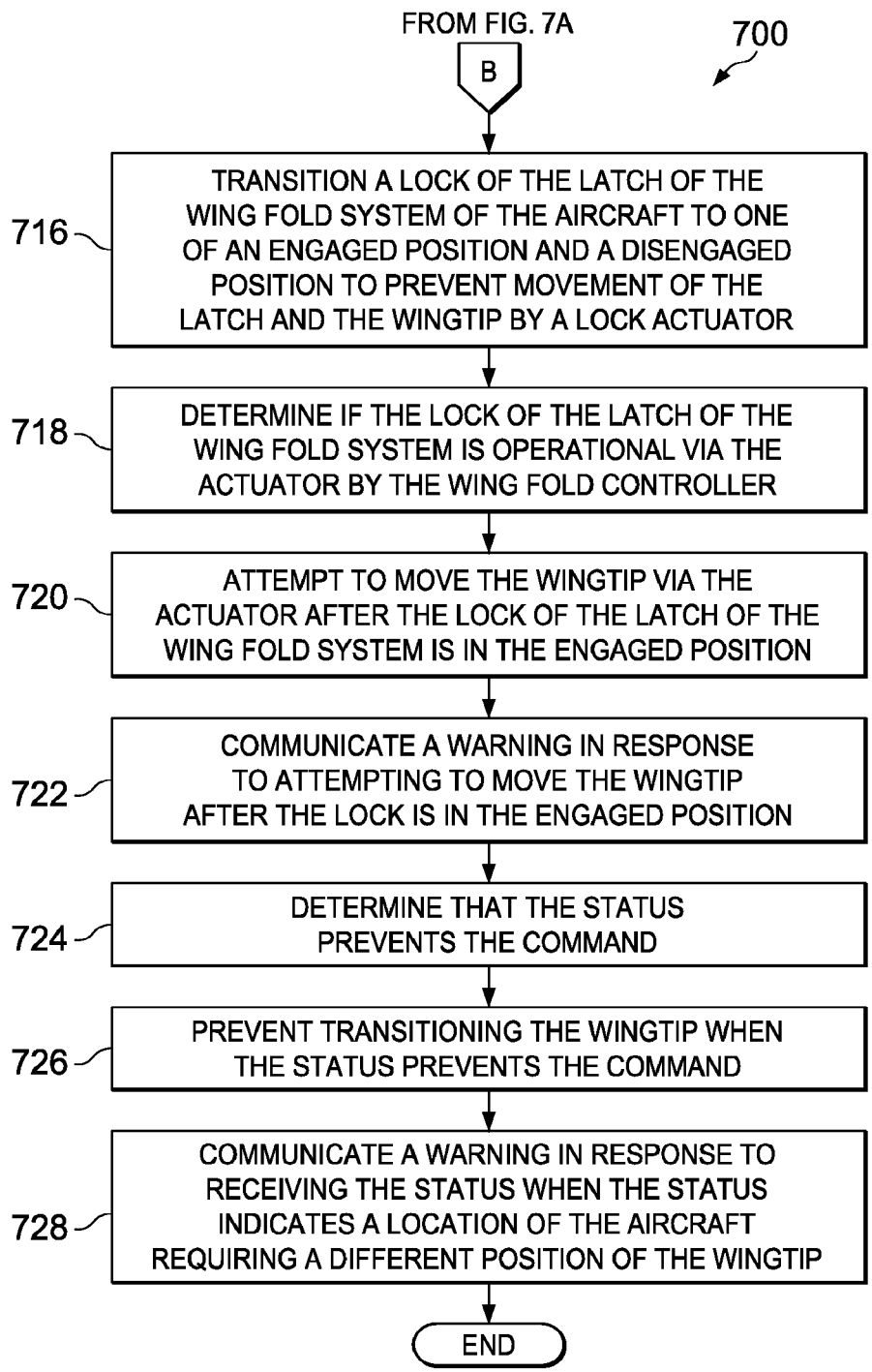

FIG. 7a and FIG. 7b are a flowchart of a method 700 of a wing fold controller in accordance with an illustrative embodiment. Method 700 shown in FIG. 7a and FIG. 7b may be implemented using aircraft 100 of FIG. 1 and FIG. 2. The method shown in FIG. 7A and FIG. 7B may be implemented by a processor, such as processor unit 1004 of FIG. 10. The method shown in FIG. 7A and FIG. 7B may be a variation of the processes shown in FIG. 1 through FIG. 6 and FIG. 8 through FIG. 10. Although the operations presented in FIG. 7A and FIG. 7B are described as being performed by a "process," the operations are being performed by at least one tangible processor or using one or more physical devices, as described elsewhere herein. The term "process" also may include computer instructions stored on a non-transitory computer readable storage medium.

Method 700 may begin as the method may receive a status of at least one of an aircraft and a wing fold system of the aircraft by the wing fold controller of the aircraft (operation 702). Next, the method may receive a command by the wing fold controller of the aircraft (operation 704). Next, the method may optionally generate the command as an automated command by the wing fold controller in response to receiving the status (operation 706).

A wing controller may generate an automated command to set a wing to a folded position when the status indicates the aircraft may be on or approaching a taxiway. A wing controller may generate an automated command to set the wing to the flight position when the status indicates the aircraft may be on a runway, such as without limitation after touchdown, or when using a runway to taxi the aircraft.

Based on an aircraft's location relative to a taxiway and/or a runway, a warning may be provided to the crew to change a position of a wingtip. Typically, the wingtip position may be changed while the aircraft may be on the ground. In a non-limiting example, an aircraft may have its wingtips in a folded position while at the gate, and in a flight position when approaching a runway for takeoff. A command to move the wingtip to the flight position may be automatically generated. The command to move the wingtip to the flight position may be based on the aircraft's position relative to the taxiway and/or the runway.

After aircraft 400 touchdown on landing, wingtip 456 may be folded. Command 430 to fold wingtip 456 may change the position of wingtip 456 based on the aircraft's position relative to the taxiway or the runway. Command 430 to fold wingtip 456 may be automatically generated.

Next, the method may operate the wing fold system of the aircraft based on the command and the status (operation 708). A wing fold controller may operate the wing fold system of the aircraft based on the command received in operation 704 and the status received in operation 702. Operation of the wing fold system by the wing fold controller may be via electrical, optical, mechanical, pneumatic, or hydraulic connections between the wing fold controller and the wing fold system and its various components.

Next, the method may transition a wingtip of a wing of the aircraft to one of a flight position of the wing and a folded position of the wing by an actuator of the wing fold system in response to operating the wing fold system (operation 710). Transitioning of the wingtip may take place by rotating or folding the wingtip at a joint shared by the wingtip and a fixed portion of the wing via the actuator. The actuator may be mechanically connected directly to the wingtip, or through a series of links and joints to establish the mechanical connection.

Next, the method may display the status of the wing fold system on a display (operation 712). The display may show any combination of the status received in operation 702, the command received in operation 704, and any other status related to a wing fold system.

Next, the method may transition a latch of the wing fold system of the aircraft to one of an open position and a closed position after the wingtip transitions to the flight position by a latch actuator (operation 714). The latch may secure the wingtip in the flight position so as to prevent movement of the wingtip during flight of the aircraft.

Next, the method may transition a lock of the latch of the wing fold system of the aircraft to one of an engaged position and a disengaged position to prevent movement of the latch and the wingtip by a lock actuator (operation 716). Next, the method may determine if the lock of the latch of the wing fold system may be operational via the actuator by the wing fold controller (operation 718). In so doing, the wing fold controller may cross check the functionality of components of a wing fold system.

Next, the method may attempt to move the wingtip via the actuator after the lock of the latch of the wing fold system may be in the engaged position (operation 720). If the lock and latch are working properly, the wingtip may not move. If either one or both of the lock and the latch are not working properly, the wingtip may move. Being able to move the wingtip after the lock and the latch are engaged indicates that the wing fold system may not be working properly.

Next, the method may communicate a warning in response to attempting to move the wingtip after the lock may be in the engaged position (operation 722). The warning may indicate that the aircraft may not be ready for flight and may be in need of maintenance.

Next, the method may determine that the status prevents the command (operation 724). When an aircraft may be in flight, the wing controller may determine that a command to fold a wingtip may be prevented by the aircraft's status of being in flight.

Next, the method may prevent transitioning the wingtip when the status prevents the command (operation 726). When an aircraft may be in flight, the wing controller may prevent executing a command to fold the wingtip since the aircraft may be in flight. Additionally, when the status would prevent the command, an indication of such may be given to a crew member on a display of the aircraft.

Next, the method may communicate a warning in response to receiving the status when the status indicates a location of the aircraft requiring a different position of the wingtip (operation 728). The warning may be communicated when the status indicates the wingtip may be in the flight position and the location indicates that the aircraft may be situated on or approaching a taxiway, a gate, or any location that may require the wingspan to be reduced. The warning may be communicated when the status indicates the wingtip may be in the folded position and the location indicates that the aircraft may be on a runway. Method 700 may terminate thereafter.

FIG. 8 is a flowchart of a method of manufacturing a commercial aircraft. Illustrative embodiments of the disclosure may be described in the context of aircraft manufacturing and service method 800 as depicted in FIG. 8 and aircraft 900 as shown in FIG. 9. Turning first to FIG. 8, an illustration of an aircraft manufacturing and service method is depicted in accordance with an illustrative embodiment. During pre-production, aircraft manufacturing and service method 800 may include specification and design 802 of aircraft 900 in FIG. 9 and material procurement 804.

During production, component and subassembly manufacturing 806 and system integration 808 of aircraft 900 in FIG. 9 takes place. Thereafter, aircraft 900 in FIG. 9 may go through certification and delivery 810 in order to be placed in service 812. While in service 812 by a customer, aircraft 900 in FIG. 9 may be scheduled for routine maintenance and service 814, which may include modification, reconfiguration, refurbishment, and other maintenance or service.

Each of the processes of aircraft manufacturing and service method 800 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

FIG. 9 is a block diagram of a commercial aircraft. Aircraft 900 may be produced by aircraft manufacturing and service method 800 in FIG. 8 and may include airframe 902 with plurality of systems 904 and interior 906. Examples of systems 904 include one or more of propulsion system 908, electrical system 910, hydraulic system 912, and environmental system 914. Any number of other systems may be included. Although an aerospace example is shown, different illustrative embodiments may be applied to other industries, such as the automotive industry.

Apparatuses and methods embodied herein may be employed during at least one of the stages of aircraft manufacturing or service method 800 in FIG. 8. In one illustrative example, components or subassemblies produced in component and subassembly manufacturing 806 in FIG. 8 may be fabricated or manufactured in a manner similar to components or subassemblies produced while aircraft 900 may be in service 812 in FIG. 8. As yet another example, one or more apparatus embodiments, method embodiments, or a combination thereof may be utilized during production stages, such as component and subassembly manufacturing 806 and system integration 808 in FIG. 8. One or more apparatus embodiments, method embodiments, or a combination thereof may be utilized while aircraft 900 may be in service 812 and/or during maintenance and service 814 in FIG. 8. The use of a number of the different illustrative embodiments may substantially expedite the assembly of and/or reduce the cost of aircraft 900.

FIG. 10 is an illustration of a data processing system, in accordance with an illustrative embodiment. Data processing system 1000 in FIG. 10 may be an example of a data processing system that may be used to implement the illustrative embodiments, such as aircraft 100 of FIG. 1 or FIG. 2, or any other module or system or method disclosed herein. In this illustrative example, data processing system 1000 includes communications fabric 1002, which provides communications between processor unit 1004, memory 1006, persistent storage 1008, communications unit 1010, input/output (I/O) unit 1012, and display 1014.

Processor unit 1004 serves to execute instructions for software that may be loaded into memory 1006. Processor unit 1004 may be a number of processors, a multi-processor core, or some other type of processor, depending on the particular implementation. A number, as used herein with reference to an item, means one or more items. Further, processor unit 1004 may be implemented using a number of heterogeneous processor systems in which a main processor may be present with secondary processors on a single chip. As another illustrative example, processor unit 1004 may be a symmetric multi-processor system containing multiple processors of the same type.

Memory 1006 and persistent storage 1008 may be embodiments of storage devices 1016. A storage device may be any piece of hardware that may be capable of storing information, such as, for example, without limitation, data, program code in functional form, and/or other suitable information either on a temporary basis and/or a permanent basis. Storage devices 1016 may also be referred to as computer readable storage devices in these examples. Memory 1006, in these examples, may be, for example, a random access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008.

Communications unit 1010, in these examples, may provide for communications with other data processing systems or devices. In these examples, communications unit 1010 may be a network interface card. Communications unit 1010 may provide communications through the use of either or both physical and wireless communications links.

Input/output (I/O) unit 1012 may allow for input and output of data with other devices that may be connected to data processing system 1000. Without limitation, input/output (I/O) unit 1012 may provide a connection for user input through a keyboard, a mouse, a processor, lever, or switch that may be in a control center that may be in a cockpit or in a maintenance facility, and/or some other suitable input device. Further, input/output (I/O) unit 1012 may send output to a printer. Display 1014 may provide a mechanism to display information to a user.

Instructions for the operating system, applications, and/or programs may be located in storage devices 1016, which are in communication with processor unit 1004 through communications fabric 1002. In these illustrative examples, the instructions are in a functional form on persistent storage 1008. These instructions may be loaded into memory 1006 for execution by processor unit 1004. The processes of the different embodiments may be performed by processor unit 1004 using computer implemented instructions, which may be located in a memory, such as memory 1006.

These instructions are referred to as program code, computer usable program code, or computer readable program code that may be read and executed by a processor in processor unit 1004. The program code in the different embodiments may be embodied on different physical or computer readable storage media, such as memory 1006 or persistent storage 1008.

Program code 1018 may be located in a functional form on computer readable media 1020 that may be selectively removable and may be loaded onto or transferred to data processing system 1000 for execution by processor unit 1004. Program code 1018 and computer readable media 1020 form computer program product 1022 in these examples. In one example, computer readable media 1020 may be computer readable storage media 1024 or computer readable signal media 1026. Computer readable storage media 1024 may include, for example, an optical or magnetic disk that may be inserted or placed into a drive or other device that may be part of persistent storage 1008 for transfer onto a storage device, such as a hard drive, that may be part of persistent storage 1008. Computer readable storage media 1024 also may take the form of a persistent storage, such as a hard drive, a thumb drive, or a flash memory, that may be connected to data processing system 1000. In some instances, computer readable storage media 1024 may not be removable from data processing system 1000.

Alternatively, program code 1018 may be transferred to data processing system 1000 using computer readable signal media 1026. Computer readable signal media 1026 may be, for example, a propagated data signal containing program code 1018. For example, computer readable signal media 1026 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1018 may be downloaded over a network to persistent storage 1008 from another device or data processing system through computer readable signal media 1026 for use within data processing system 1000. For instance, program code stored in a computer readable storage medium in a server data processing system may be downloaded over a network from the server to data processing system 1000. The data processing system providing program code 1018 may be a server computer, a client computer, or some other device capable of storing and transmitting program code 1018.

The different components illustrated for data processing system 1000 are not meant to provide architectural limitations to the manner in which different embodiments may be implemented. The different illustrative embodiments may be implemented in a data processing system including components in addition to or in place of those illustrated for data processing system 1000. Other components shown in FIG. 10 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1004 may take the form of a hardware unit that has circuits that are manufactured or configured for a particular use. This type of hardware may perform operations without needing program code to be loaded into a memory from a storage device to be configured to perform the operations.

For example, when processor unit 1004 takes the form of a hardware unit, processor unit 1004 may be a circuit system, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 1018 may be omitted because the processes for the different embodiments are implemented in a hardware unit.

In still another illustrative example, processor unit 1004 may be implemented using a combination of processors found in computers and hardware units. Processor unit 1004 may have a number of hardware units and a number of processors that are configured to run program code 1018. With this depicted example, some of the processes may be implemented in the number of hardware units, while other processes may be implemented in the number of processors.

As another example, a storage device in data processing system 1000 may be any hardware apparatus that may store data. Memory 1006, persistent storage 1008, and computer readable media 1020 are examples of storage devices in a tangible form.

In another example, a bus system may be used to implement communications fabric 1002 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1006, or a cache, such as found in an interface and memory controller hub that may be present in communications fabric 1002.

Data processing system 1000 may also include at least one associative memory (not shown in FIG. 10). Associative memory may be in communication with communications fabric 1002. Associative memory may also be in communication with, or in some illustrative embodiments, be considered part of storage devices 1016. The different illustrative embodiments can take the form of an entirely hardware embodiment, an entirely software embodiment, or an embodiment containing both hardware and software elements. Some embodiments are implemented in software, which includes but may be not limited to forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code may be executed on a computer, the execution of this computer readable or usable program code causes the computer to transmit another computer readable or usable program code over a communications link. This communications link may use a medium that may be, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

Thus, illustrative embodiments above may describe a method of controlling folding of a wing. The method may include: receiving a status, of at least one of: an aircraft, and a wing fold system of the aircraft, by a wing fold controller of the aircraft; receiving a command, by the wing fold controller, in response to receiving the status; operating the wing fold system, by the wing fold controller, based on the command and the status. The method may also include transitioning, via a wingtip actuator of the wing fold system, a wingtip of the wing of the aircraft to one of: a flight position of the wing, and a folded position of the wing, in response to operating the wing fold system by the wing fold controller.

The illustrative embodiments for a method of controlling folding of a wing may also include that the status may indicate the aircraft is on a taxiway and the command directs the wing to the folded position; and wherein the status may indicate the aircraft is on a runway and the command directs the wing to the flight position.

Further, the method may include: displaying the status of the wing fold system on a display; or determining, via the wing fold controller, if a lock of the wing fold system is operational via attempting to move the wingtip via the wingtip actuator after the lock of the wing fold system is in an engaged position; and communicating a warning in response to attempting to move the wingtip after the lock is in the engaged position.

The illustrative embodiments for a method of controlling folding of a wing may also include determining, via the wing fold controller, that the status prevents the command; and preventing, via the wing fold controller, the wingtip actuator from transitioning the wingtip when the status prevents the command. The illustrative embodiments for a method of controlling folding of a wing may also include transitioning, via a latch actuator, a latch of the wing fold system of the aircraft to one of an open position and a closed position after the wingtip transitions to the flight position; and transitioning, via a lock actuator, a lock of the latch of the wing fold system of the aircraft to one of: an engaged position, and a disengaged position that may prevent movement of: the latch, and the wingtip.

The illustrative embodiments for a method of controlling folding of a wing may also include communicating a warning in response to receiving the status, when the status may indicate that a location of the aircraft may require a different position of the wingtip, wherein the status may indicate that the wingtip is in the flight position, and that the location of the aircraft is one of: on a taxiway, and at a gate; and wherein the status indicates that the wingtip is in the folded position, and the location of the aircraft is on a runway.

The embodiments above may also describe an apparatus configured to control a wing fold system of a wing of an aircraft. The apparatus may include a wing fold controller configured to: receive a status of at least one of: the aircraft, and the wing fold system of the aircraft; receive a command based on receiving the status; and operate the wing fold system of the aircraft based on the command and the status; and a wingtip actuator configured to transition, in response to the wing fold controller, a wingtip of the wing of the aircraft to one of: a flight position and a folded position. The apparatus may also be configured wherein the status indicates that the aircraft is at least one of: on a taxiway, and rolling toward the taxiway, and the command directs the wing to the folded position; and wherein the status indicates the aircraft is at least one of: on a runway, and rolling toward the runway, and the command directs the wing to the flight position.

The apparatus may also include a display configured to display the status of the wing fold system, and/or the wing fold controller configured to: determine that a lock of the wing fold system is operational via an attempt to move the wingtip, via the wingtip actuator, after the lock of a latch of the wing fold system is in an engaged position, and communicate a warning in response to attempting to move the wingtip after the lock is in the engaged position. The apparatus may also include the wing fold controller configured to: determine that the status prevents the command, and prevent transitioning the wingtip when the status prevents the command.

The apparatus may also include a latch actuator configured to transition a latch of the wing fold system of the aircraft to one of: an open position, and a closed position, after the wingtip transitions to the flight position; and a lock actuator configured to transition a lock of the wing fold system of the aircraft to one of: an engaged position, and a disengaged position, and prevent movement of the latch and the wingtip. The apparatus may also include the wing fold controller configured to communicate, when the status may indicate that a location of the aircraft may require a different position of the wingtip, a warning in response to receiving the status, and the status indicates at least one of: that the wingtip is in the flight position, and that the aircraft is one of: on a taxiway, at a gate, approaching any obstacle or vehicle that the wing fold controller predicts to contact the wingtip, and approaching a taxiway; and that the wingtip is in the folded position and at least one of: on a runway, and rolling toward a runway.

Illustrative embodiments above may also describe an aircraft that includes a computer that includes: a bus, a processor connected to the bus, and a memory connected to the bus, the memory storing a program code. The program code, when executed by the processor, may perform a computer-implemented method. The program code is: configured to receive a status of at least one of: the aircraft, and a wing fold system of the aircraft, by a wing fold controller of the aircraft; configured to receive a command, by the wing fold controller of the aircraft, in response to receiving the status; configured to, using the processor, operate the wing fold system of the aircraft, via the wing fold controller, based on the command and the status; and configured to, using the processor, transition a wingtip of a wing of the aircraft to one of: a flight position and a folded position via a wingtip actuator of the wing fold system.

Illustrative embodiments of the aircraft may also include the status indicating that the aircraft is at least one of: on a taxiway, and rolling toward the taxiway, and the command may direct the wing to the folded position; and wherein the status may indicate the aircraft is at least one of: on a runway, and rolling toward the runway, and the command directs the wing to the flight position. Illustrative embodiments of the may also include the program code configured use the processor to: determine, via the wingtip actuator by the wing fold controller, if a lock of the wing fold system is operational; attempt to move the wingtip via the wingtip actuator after the lock of the wing fold system is in an engaged position; and, communicate a warning, in response to an attempt to move the wingtip after the lock is in the engaged position wherein at least one of status and position of the lock is determined via sensing by at least one lock sensor.

Illustrative embodiments of the aircraft may also include program code configured to use the processor to: determine that the status prevents the command; and prevent transitioning the wingtip when the status prevents the command.

Illustrative embodiments may recognize and take into account that an unfixed portion of a wing is connected to and rotate about a hinge on a fixed portion of the wing. Illustrative embodiments may recognize and take into account that a hinge on the fixed portion of the wing is located at various positions on the fixed portion and on the unfixed portion, such as without limitation, a top side of the wing, a bottom side of the wing, and near a center of a thickness of the wing. Illustrative embodiments may recognize and take into account that locating the hinge near a top side or near a bottom side of the wing may result in the hinge that protrudes beyond the profile of the wing.

A hinge, or components related to the hinge, that may protrude, beyond a profile of the wing without a hinge, may require a fairing to reduce exposure of the hinge to the environment and airstream, and aerodynamic drag produced by the hinge. While a fairing may reduce the drag caused by an exposed hinge, the fairing may increase the weight of the wing and drag produced by the wing as compared to a wing that has no fairing and no exposed hinge. Thus, as shown without limitation in U.S. application Ser. No. 13/664,371, which is hereby fully incorporated herein, it may be desirable to have a hinge located fully within the wing, such that no fairing may be needed to add the hinge to the wing. Similarly, it may be desirable to have components associated with the hinge and activation of folding the wing, such as without limitation an angle gearbox, a torque tube, a torque box, a lug, a bushing, a latch, a lock, and any associated sensor, located fully within the wing, such that no fairing may be needed to add the hinge to the wing.

Alternatively, in place of a rotating motion, a sliding or a telescopic translation may be used to extend an unfixed portion of a wing. In that configuration, motors and devices configured to translate the wing unfixed portion may be used in place of the angle gearbox, the torque tube, and/or the torque box to facilitate translating the unfixed portion of the wing instead of rotating the unfixed portion of the wing.

Further, illustrative embodiments may recognize and take into account that it may be desirable for the hinge and the wingtip actuator that transitions an unfixed portion of a wing between a folded position, or on-ground position, and a flight position, and all components associated therewith, to occupy a minimum amount of space within the wing and add a minimum amount of weight to the wing. Currently, downsizing a motor of a given design typically reduces the power output from the motor. Thus, illustrative embodiments may recognize and take into account that reducing a size of the wingtip actuator may limit an amount of power available from the wingtip actuator. Thus, it may be desirable to increase power available from a wingtip actuator of any given size, or to reduce the amount of power needed to transitions an unfixed portion of a wing between a folded, or on-ground position and a flight position. Thereby, a wing containing wing fold system 1100 may be sized such that no component of wing fold system 1100 may require a fairing that expands a profile of the wing.

Figure 11:
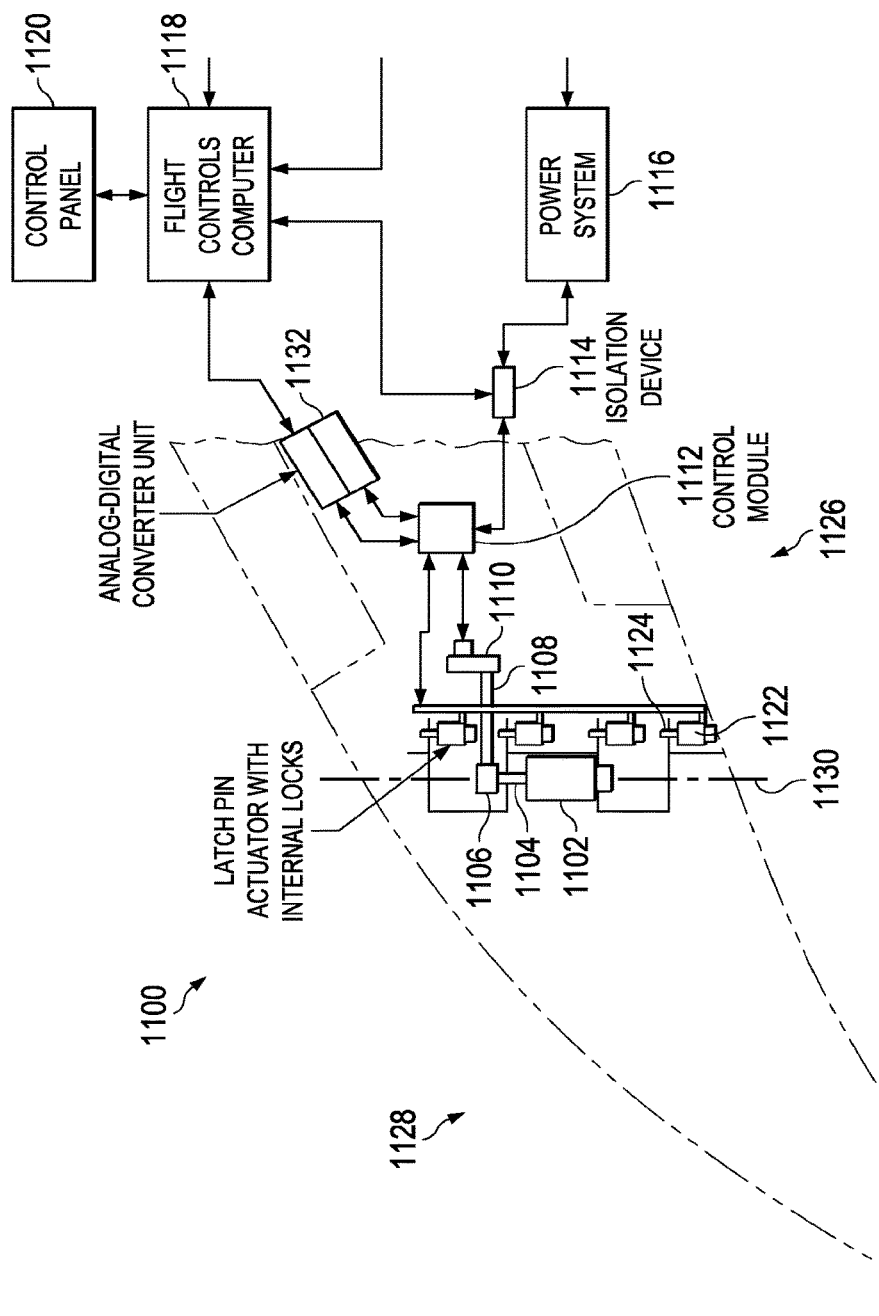
FIG. 11 is a plan view diagram of a wing fold system, in accordance with an illustrative embodiment.

Referring now to FIG. 11, FIG. 11 is a plan view diagram of a wing fold system, in accordance with an illustrative embodiment. More specifically, wing fold system 1100 may include wing fold actuator 1102, torque tube 1104, angle gearbox 1106, torque tube 1108, power drive unit 1110, control module 1112, isolation device 1114, power system 1116, flight controls computer 1118, aircraft control panel 1120, lock actuator 1122, lock 1124, fixed portion 1126, unfixed portion 1128, fold axis 1130, and analog-to-digital converter unit 1132. Wing fold system 1100 may be a schematic view of an illustrative embodiment of wing fold system 502 as shown in FIG. 5. Although wing fold system 1100 shows a single wing, power system 1116 and flight controls computer 1118 may be connected to similar features in another wing as those shown for the wing in wing fold system 1100 of FIG. 11.

Power system 1116 may supply power to power drive unit 1110. Power system 1116 may include an electric, a pneumatic, and/or a hydraulic, power supply or any other source that may drive wing fold actuator 1102. Power drive unit 1110 may convert power from control module into a force that drives wing fold actuator 1102. Without limitation, when wing fold actuator 1102 may be a geared rotary actuator, the force that drives wing fold actuator 1102 may be a torque.

Power drive unit 1110 may include a motor and a brake. Without limitation, the brake may include a configuration that locks out motion of power drive unit 1110. The motor and the brake may be compatible with power system 1116. In other words, without limitation, if power system 1116 may be for an electrical power source, then the motor may be powered by electricity. If power system 1116 may be for a pneumatic source, then the motor may be powered by pneumatics. Without limitation, wing fold actuator 1102 may be a geared rotary actuator or may be configured to drive a sliding or a telescoping configuration for unfixed portion 1128.

Power drive unit 1110 may be controlled by control module 1112. Control module 1112 may regulate power supply from power system 1116 to power drive unit 1110. Control module 1112 may be controlled by flight controls computer 1118. Sensors for status and/or position of components of wing fold system may send information to flight controls computer 1118. Information from components of wing fold system 1100 may be sent to flight controls computer 1118 via analog-digital converter unit 1132.

Analog-digital converter unit 1132 may convert analog signals to digital signals and/or digital signals to analog signals. Thus, analog signals present at control module 1112 may be converted to digital signals at analog-digital converter unit 1132. Transmission of information, present in control module 1112, on status and/or position of components of wing fold system 1100, may be transmitted as digital signals to flight controls computer 1118 via analog-digital converter unit 1132. Hence, use of analog-digital converter unit 1132 may allow for wireless transmission of digital signals between control module 1112 and flight controls computer 1118, and/or transmission of digital signals between control module 1112 and flight controls computer 1118 upon some number of wires, wherein the number may be one. Flight controls computer 1118 can command and communicate with control module control module 1112, and components connected thereto, without the need for wiring bundles connecting control module 1112 and flight controls computer flight controls computer 1118. Thereby the weight added and/or space used by wiring bundles for communication and/or command and control between control module 1112 and flight controls computer 1118 may be eliminated. Hence, inclusion of analog-digital converter unit 1132 may reduce the weight of wing fold system 1100 and/or a size and/or a profile of a wing containing wing fold system 1100. Reduction of the weight of wing fold system 1100 and/or a size and/or a profile of a wing containing wing fold system 1100 may increase a performance and/or a fuel efficiency of the aircraft containing wing fold system 1100. Thereby, a wing containing wing fold system 1100 may be sized such that no component of wing fold system 1100 may require a fairing that expands a profile of the wing.

Inputs may be received in flight controls computer 1118 from control panel 1120. Without limitation, control panel 1120 may be in a cockpit of the aircraft containing wing fold system 1100, or control panel 1120 may be located in another part of the aircraft containing wing fold system 1100, or outside of the aircraft containing wing fold system 1100. Control panel 1120 may be a network of controls located both inside and outside of the aircraft containing wing fold system 1100. Flight controls computer 1118 may also send information and/or alerts regarding without limitation a function, a status, and/or a position of a component of wing fold system 1100, wherein the component may include without limitation unfixed portion 1128, wing fold actuator 1102, and/or lock actuator 1122.

When wing fold actuator 1102 may be a geared rotary actuator, without limitation power drive unit 1110 may convert power from control module 1112 to torque that may drive wing fold actuator 1102 via torque tube, 1108, angle gearbox 1106, and torque tube 1104 being connected to wing fold actuator 1102. Wing fold actuator 1102 may be the torque path between the unfixed portion 1128 and fixed portion fixed portion 1126 of a wing as shown in FIG. 11. When wing fold actuator 1102 may activate unfixed portion 1128 via a sliding or a telescopic motion, wing fold actuator 1102 may direct a translation of unfixed portion 1128 that may not require torque tube, 1108, angle gearbox 1106, and torque tube 1104 being connected to wing fold actuator wing fold actuator 1102.

Wing fold actuator 1102 may be connected to fixed portion 1126 and to unfixed portion 1128 such that wing fold actuator 1102 may be centered about fold axis 1130. Fold axis 1130 may be substantially aligned with a centerline axis of wing fold actuator 1102. Fold axis fold axis 1130 may be an axis about which unfixed portion 1128 may rotate when transitioning between flight position 510 and folded position 514. Alternatively, when unfixed portion 1128 may not rotate, but may telescope or translate into fixed portion 1126, then fold axis 1130 may mark an axis of alignment for unfixed portion 1128 and fixed portion 1126 when unfixed portion 1128 may be in flight position 510.

Wing fold system 1100 may include more than one set of latches, such as without limitation latches 572 as shown in FIG. 5. Thus, three representations, identical to lock actuator 1122, and lock 1124, are shown in fixed portion 1126 of the wing to indicate that more than one lock actuator 1122, and thus more than one lock 1124 may be used to secure unfixed portion 1128 in flight position, such as without limitation flight position 510 as shown in FIG. 5.

Wing fold actuator 1102 may be sufficiently powerful to move unfixed portion 1128 to an on-ground position, flight position 510, and any position between the on-ground position and flight position 510, and hold unfixed portion 1128 in that position while an aircraft unfixed portion 1128 may be connected to may be on the ground. On-ground position for unfixed portion 1128 may include folded position 514 as described above at least for FIG. 5. On-ground position may also include a position for unfixed portion 1128 that may reduce a wing span for an aircraft such as reduced wingspan 202 as shown in FIG. 2 as compared to wingspan 132 as shown in FIG. 1. Alternatively, without limitation, unfixed portion 1128 may be configured to translate and/or telescope out to flight position 510 from within or over fixed portion 1126. In such an illustrative embodiment (not shown) on-ground position would be analogous to folded position 514, but instead of reducing wingspan 132 by folding unfixed portion 1128, wingspan 132 may be reduced to wingspan 202 by retracting unfixed portion 1128 to within or over fixed portion 1126.

Without limitation, on-ground position may refer to a position where unfixed portion 1128 may be secured such that a wingspan of an aircraft may be reduced such that the aircraft wingspan may be short enough to be within restrictions at given airport for aircraft moving the aircraft on-ground at the airport. As such, wing fold actuator 1102 may need to overcome environmental forces acting upon unfixed portion 1128, any lift and drag forces acting on unfixed portion 1128, and forces generated on unfixed portion 1128 by the aircraft moving across the ground. Environmental forces may include without limitation wind. Forces generated on unfixed portion 1128 by the aircraft moving across the ground may include without limitation forces resulting surface imperfections and varying operator techniques.

Control module 1112 may also control a second set of locks and lock actuators that are not show, which function to lock unfixed portion 1128 into latches holding unfixed portion 1128 in the on-ground position as shown in FIG. 5. Thus, the illustrative embodiments above may show a system for preparing an aircraft with a folding wing for takeoff.

For take-off, flight controls computer 1118 may receive a command to extend unfixed portion 1128 by moving wing fold actuator 1102 once an airplane containing wing fold system 1100 may be a position within an airport environment that can accommodate the increased wingspan. Wing fold system 1100 may proceed through a number of steps described below.

When preparing for takeoff, control panel 1120 may generate a command received by flight controls computer 1118 for unfixed portion 1128 to extend to flight position 510, as shown in FIG. 5. The command for unfixed portion 1128 to extend to flight position flight position 510 may be input by an operator or by an automatic system. The automatic system may issue the command based upon a position of the aircraft containing wing fold system 1100. The operator command input may be received at control panel 1120 from an operator inside and/or outside the aircraft containing wing fold system 1100. An indication may be provided using control panel 1120 that unfixed portion 1128 may be "in transit." Isolation device 1114 may then open and power system 1116 may supply power to control module 1112.

Isolation device 1114 may be any device that may isolate power system 1116 from control module 1112 and power drive unit 1110. Without limitation when power system 1116 may be a hydraulic power source or a pneumatic power source, isolation device 1114 may be a valve. Without limitation when power system 1116 may be an electrical source, isolation device 1114 may be without limitation a switch or a circuit breaker.

An on-ground lock actuator (not shown) may retract on-ground lock (not shown) from latches holding unfixed portion 1128 in the on-ground position, as shown in FIG. 5. Wing fold system 1100 will then move unfixed portion 1128 about fold axis 1130 from the on-ground position to flight position 510 as shown in 5. Control module 1112 may control an output device from power drive unit 1110 to move wing fold actuator 1102 such that it will apply a force to hold unfixed portion 1128 in flight position 510 until lock 1124 holding unfixed portion 1128 in flight position 510 may be in engaged position 540 as shown in FIG. 5. A secondary lock actuator (not shown) may be controlled by control module 1112 to engage a secondary lock (not shown) that may provide redundancy to keep unfixed portion 1128 in flight position 510. The secondary lock, and lock 1124 each may be designed to hold unfixed portion 1128 in flight position 510 even if system were to malfunction such that full power available from power drive unit 1110 tried to move wing away from flight position 510 while the secondary lock, and/or lock 1124 may be in their respective engage position, such as without limitation engage position 540 as shown in FIG. 5.

With each secondary lock engaged wing fold system 1100 may be considered "locked" in flight position flight position 510, and flight controls computer 1118 may command isolation valve isolation device 1114 to isolate control module 1112 from power system 1116. Control panel 1120 may then receive status from flight controls computer 1118 and provide indication that unfixed portion 1128 may be in flight position 510. Flight controls computer 1118 and each component of power drive unit 1110 may be programmed such that specific timing and/or timing range limits are established for each step, and for total time from flight controls computer 1118 receiving a command to extend unfixed portion 1128 to flight position 510 until unfixed portion 1128 may be locked in flight position 510 and control panel 1120 may indicate unfixed portion 1128 as locked in flight position flight position 510.

When a secondary lock and/or a secondary lock actuator may be included in wing fold system 1100, a secondary power system may power the secondary lock and/or secondary lock actuator. Without limitation, if lock actuator 1122 may be powered hydraulically, the secondary lock actuator may be powered electrically or pneumatically. Similarly, if and power drive unit 1110 may contain a hydraulic powered motor, a secondary power drive may be installed that may be powered without limitation electrically or pneumatically.

For moving unfixed portion 1128 to the on-ground position after landing, the method described above may be reversed. For landing, flight controls computer 1118 may receive a command to move unfixed portion 1128 from flight position 510 to the on-ground position once the airplane may be on the ground and aircraft speed may be at or below a design speed for wing fold system 1100 hardware. The design speed for wing fold system 1100 may be an indicated speed of the aircraft. Aircraft speed inputs to flight controls computer 1118 may inhibit any movement of unfixed portion 1128 above the design speed.

Similarly, unfixed portion 1128 should not move while the aircraft may be in flight. Hence, sensor inputs to unfixed portion 1128 that the aircraft may be on the ground may inhibit any movement of unfixed portion 1128.

Wing fold system 1100 may then proceed through steps listed below. Control panel 1120 may indicate that unfixed portion 1128 may be "in transit." Flight controls computer 1118 may command isolation device 1114 to open and restore connection of control module 1112 with power system 1116. The secondary lock actuator (not shown) may be controlled by control module 1112 to disengage the secondary lock (not shown). After each secondary lock may be disengaged, flight controls computer 1118 may command control module 1112 to drive lock actuator 1122 to move lock 1124 to disengaged position 544, and to move unfixed portion 1128 from flight position 510 to the on-ground position as shown in FIG. 5. Power drive unit 1110 may move the wingtip about fold axis 1130 from flight position 510 to the on-ground position as shown in FIG. 5. When unfixed portion 1128 reaches the on-ground position, the on-ground lock actuator (not shown) may engage the on-ground lock (not shown) to hold unfixed portion 1128 up in the on-ground position. Similar to lock actuator 1122 and lock 1124, a secondary on-ground lock may be activated to engage a secondary on-ground lock to provide a redundancy to hold unfixed portion 1128 up in the on-ground position. The secondary fold lock, and the fold lock each may be designed to hold unfixed portion 1128 in 514 even if system were to malfunction such that full power available from power drive unit 1110 tried to move wing away from 514 while the secondary lock, and/or lock 1124 may be in their respective engage position, such as without limitation engage position 540 as shown in FIG. 5.

After all secondary fold locks are engaged flight controls computer 1118 may command power system 1116 to isolate control module 1112 from power system 1116. Indication may be provided to control panel 1120 and/or elsewhere, that the wing tips are "Folded" in the on-ground position.

Each component shown in FIG. 11 for wing fold system 1100 may also be similarly present in each wing on the aircraft containing wing fold system wing fold system 1100 as shown in FIG. 11. Control panel 1120, flight controls computer 1118, and power system 1116 may provide identical control to each wing on the aircraft that may contain a power drive similar to power drive unit 1110 as described for the illustrative embodiment shown in accordance with FIG. 11.

The illustration of FIG. 11 is not meant to imply physical or architectural limitations to the manner in which different illustrative embodiments may be implemented. Other item in addition to, in place of, or both in addition to and in place of the ones illustrated may be used. Some components may be unnecessary in some illustrative embodiments. Also, the items are presented to illustrate some functional components. One or more of these blocks may be combined or divided into different blocks when implemented in different embodiments. For example without limitation, control module 1112 may be combined into flight controls computer 1118 or into power drive unit 1110.

Figure 12A:
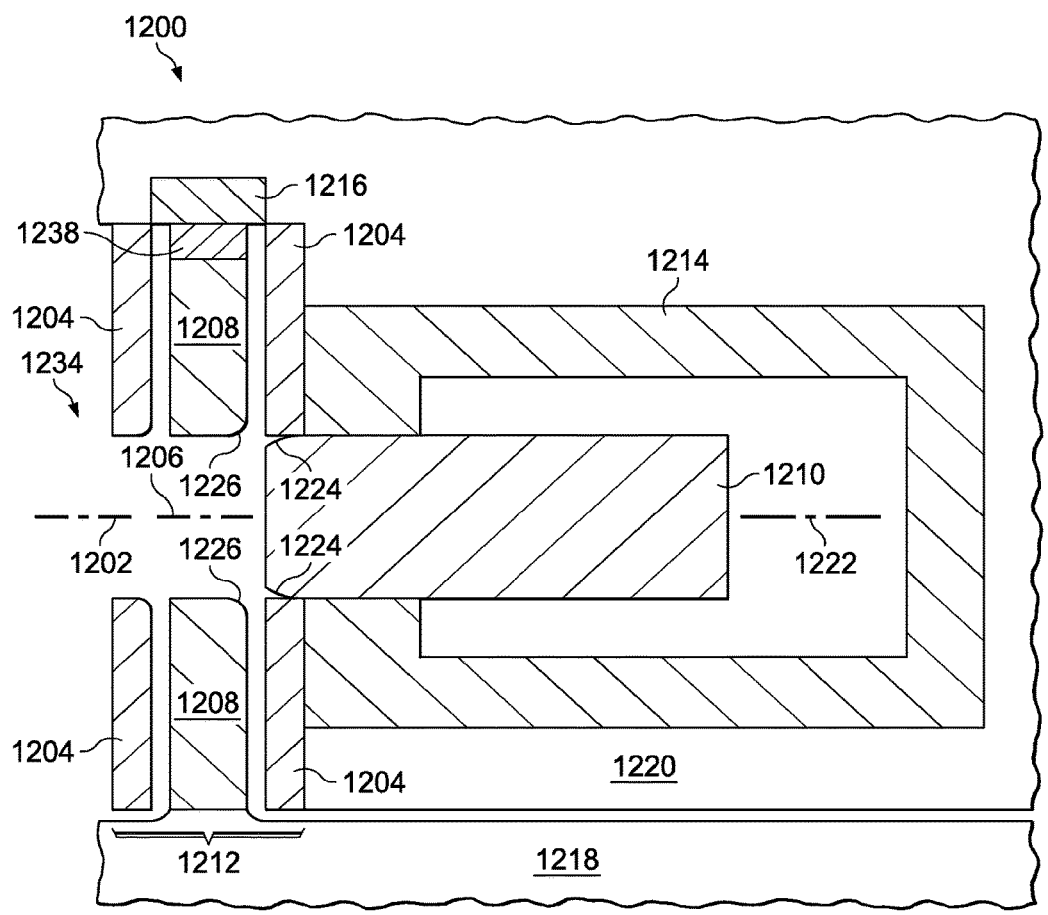
FIG. 12A, FIG. 12B, FIG. 12C, and FIG. 12D represent a cross-sectional plan view diagram of a lock for a latch of a wing fold system, in accordance with an illustrative embodiment.
Figure 12B:
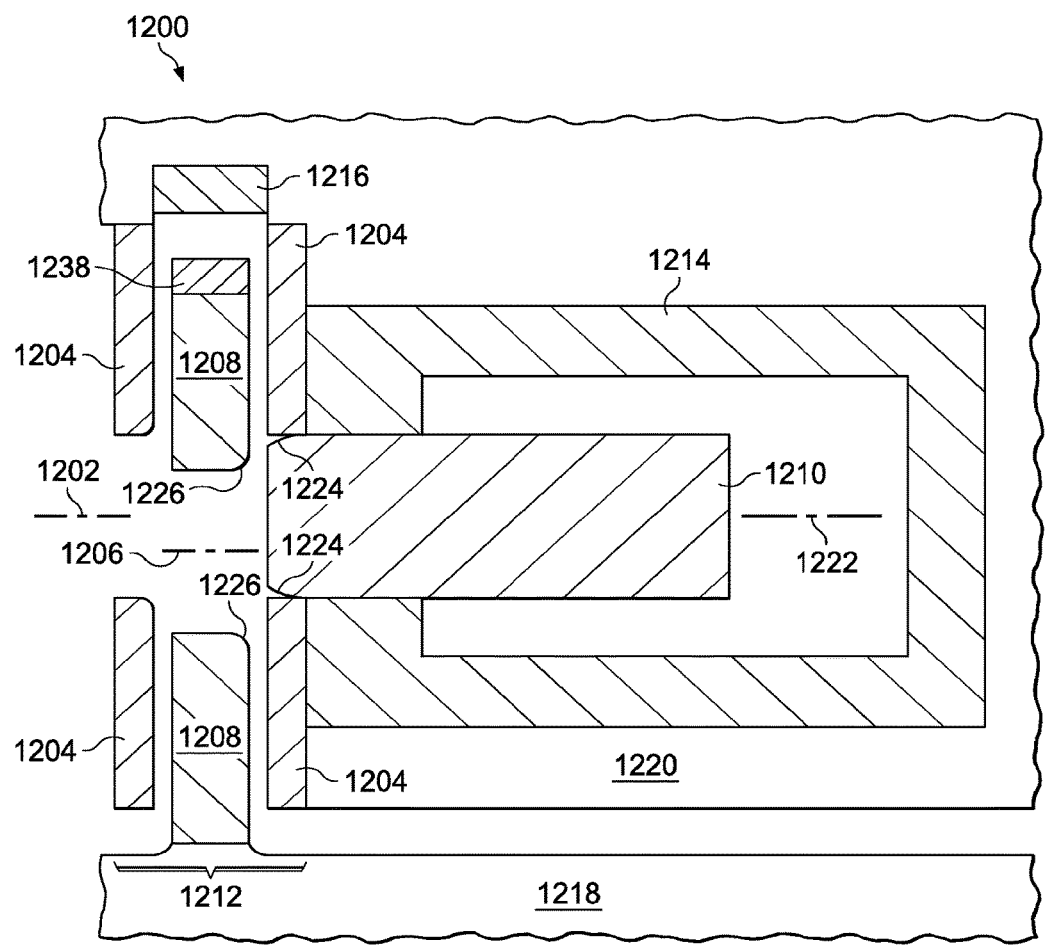
Figure 12C:
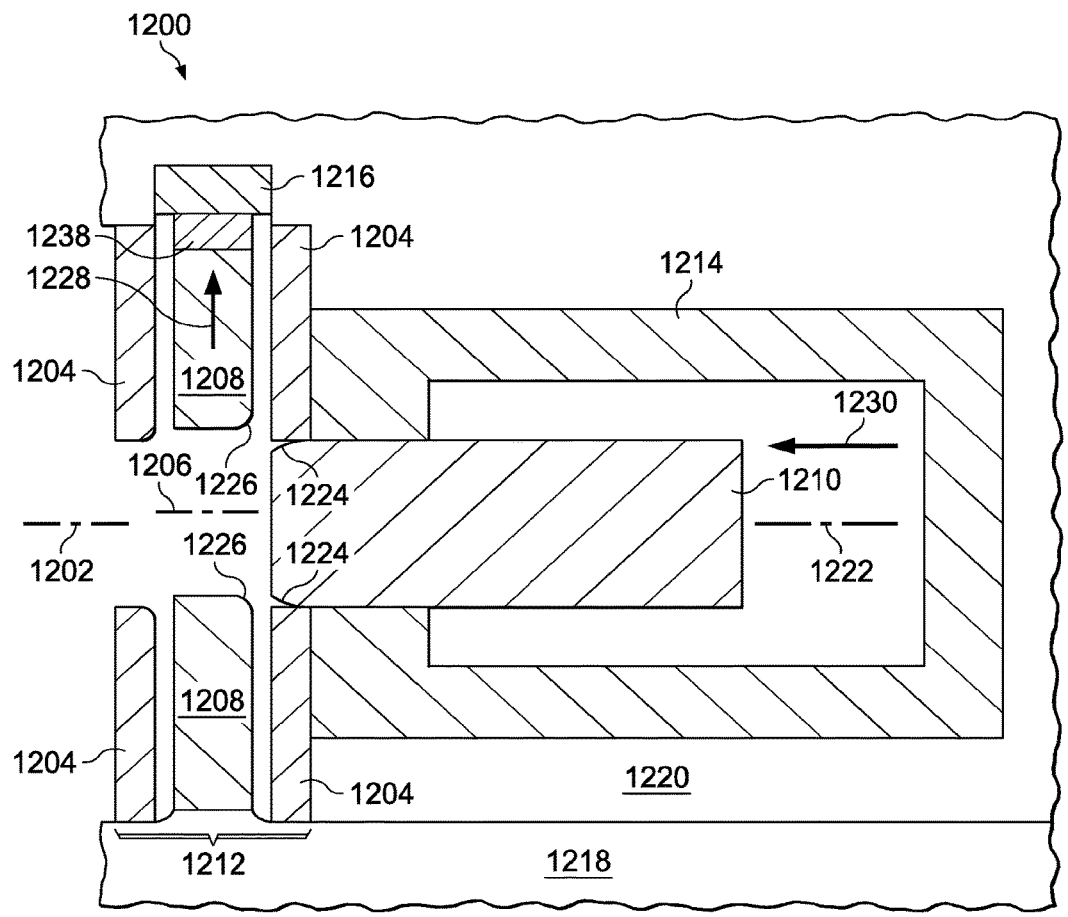
Figure 12D:
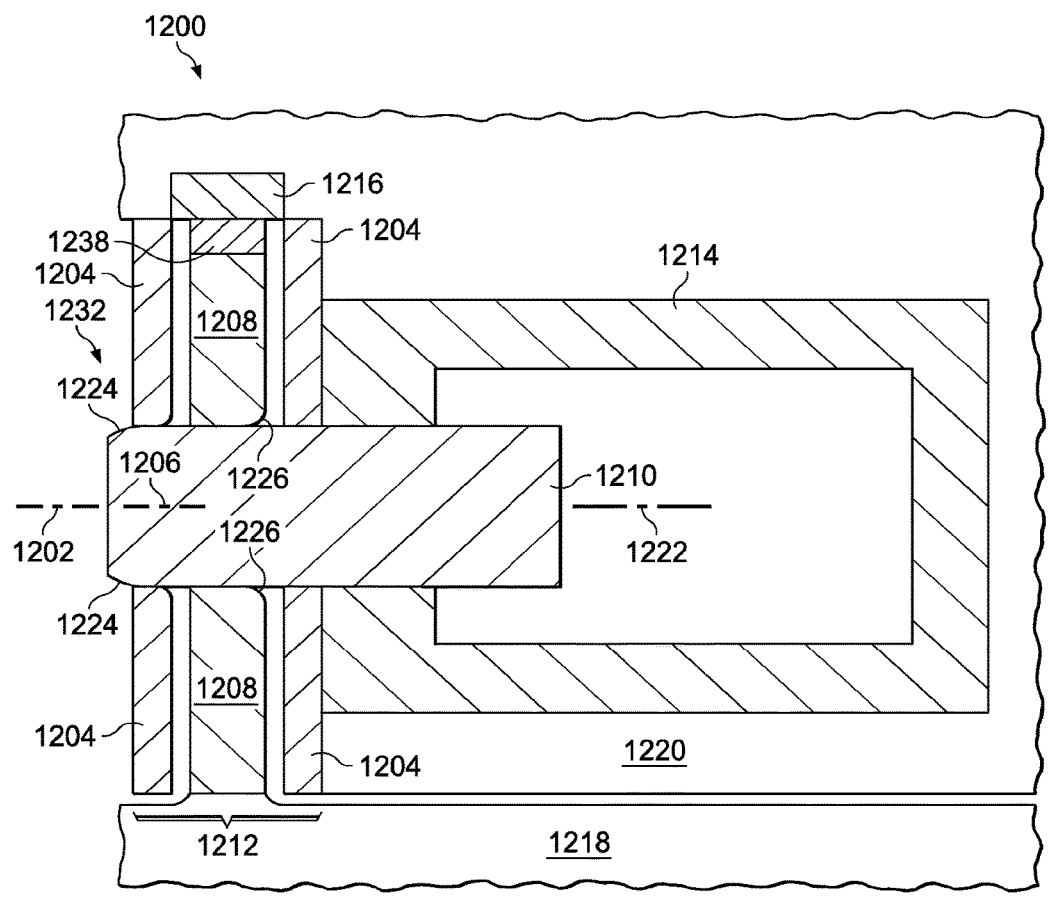

Referring now to FIGS. 12A-12D, FIGS. 12A-12D represent a cross-sectional plan view diagram of a lock for a latch of a wing fold system, in accordance with an illustrative embodiment. FIG. 12A is a cross-sectional plan view diagram of a latch in a closed position with a lock in a disengaged position and respective centerlines of fixed lugs, unfixed lug, and a lock, substantially aligned in accordance with an illustrative embodiment. FIG. 12B is a cross-sectional plan view diagram of a lock unable to engage with misaligned lugs of a latch in accordance with an illustrative embodiment. FIG. 12C is a cross-sectional plan view diagram of a lock in a disengaged position when a centerline axis of an unfixed lug may not align with a centerline axis of fixed lugs and a centerline axis of a lock in accordance with an illustrative embodiment. FIG. 12D is a cross-sectional plan view diagram of a lock in an engaged position in a closed latch in accordance with an illustrative embodiment.

More specifically, FIGS. 12A-12D depict a cross-sectional plan view of latch system 1200. Latch system 1200 may include fixed lugs 1204, unfixed lug 1208, lock 1210, lock actuator 1214, stop device 1216, and stop device 1238. Fixed lugs 1204 and unfixed lug 1208 may collectively form a portion of latch 1212. Fixed lugs 1204 may be lugs connected to fixed portion fixed portion 1220 of a wing. Unfixed lug 1208 may be a lug connected to unfixed portion 1218 of the wing. Without limitation, unfixed portion 1218 and fixed portion 1220 may be illustrative examples of unfixed portion 1128 and fixed portion 1126 as shown in FIG. 11, and unfixed portion 454 and fixed portion 448 for wing 442 as shown in FIG. 4.

Latch system 1200 may be an example in simplified plan form, of a portion of latches 572 and locks 574 in wing fold system 502, as shown in FIG. 5, or a portion of latches 612 and lock 614 as shown in FIG. 6. Latch 1212 may include more unfixed lugs 1204 than the two shown in FIG. 12A through FIG. 12D, and more than the one unfixed lug 1208 shown in FIG. 12A through FIG. 12D.

Referring now to FIG. 12A, FIG. 12A is a plan view diagram of a latch in a closed position with a lock in a disengaged position and respective centerlines of fixed lugs, unfixed lug, and a lock, substantially aligned in accordance with an illustrative embodiment.

More specifically, FIG. 12A shows a condition wherein latch 1212 may be in a closed position, such as shown without limitation by closed position 530 in FIG. 5, such that centerline axis 1202 of fixed lugs 1204 may be substantially aligned with centerline axis 1206 of unfixed lug 1208 and centerline axis 1222 of lock 1210. With latch 1212 closed as shown in FIG. 12A, FIG. 12A may be an illustrative embodiment of unfixed portion 1218 in flight position, such as without limitation flight position 510 as shown in FIG. 5.

A centerline axis for wing fold actuator 1102 may be fold axis 1130, as shown above in FIG. 11. Fold axis 1130 may not be collocated with lock 1210 or may not be in alignment with a centerline axis 1222 of lock 1210. As wing fold actuator 1102 rotates unfixed portion 1128 into flight position 12 510 as shown in FIG. 5, lock 1210 may be sized such that when centerline axis 1202 of fixed lugs 1204 may be substantially aligned with centerline axis 1206 of unfixed lug 1208 that lock 1210 may be actuated to engage through the center of fixed lugs 1204 and unfixed lug 1208 with a designated clearance between the interior edges of openings through fixed lugs 1204 and unfixed lug 1208, or of bushings thereof, and exterior sides of lock 1210.

The designated clearance between the interior edges of openings through fixed lugs 1204 and unfixed lug 1208 and may result in substantially no friction between lock 1210 and the interior edges of openings through fixed lugs 1204 and unfixed lug 1208, or of bushings thereof. Thus, if friction forces, between lock 1210 and any lugs of latch 1212, while inserting lock 1210 into latch 1212 to engaged position, or retracting lock 1210 from latch 1212 to disengaged position are substantially at a minimum level, a force required of lock actuator 1214 for insertion and retraction may be at a minimum level. Without limitation lock actuator 1214 may be an example of an embodiment of lock actuator 1122 as shown in FIG. 11, and may be one of the actuators 576 as shown in FIG. 5.

The designated clearance between the interior edges of openings through fixed lugs 1204 and unfixed lug 1208 and may result in a designated contact pressure and/or friction between exterior sides of lock 1210 and the interior edges of openings through fixed lugs 1204 and unfixed lug 1208, or of bushings thereof (bushings not shown to simplify diagram). Control of contact forces during insertion of lock 1210 into latch 1212 to a minimum level may reduce wear on lock 1210, fixed lugs 1204, unfixed lug 1208, any bushings associated with any lugs of latch 1212, as well as wear on lock actuator 1214. Thus, if contact forces while inserting lock 1210 into latch 1212 to engaged position, or retracting lock 1210 from latch 1212 to disengaged position are minimized, a force required of lock actuator 1214 may be minimized.

Accordingly, a size and a weight of lock actuator 1214 may be minimized, and/or a reliability and/or service life of lock actuator 1214 of a given power may be increased, relative to a condition where centerline axis 1202 of fixed lugs 1204 may not substantially aligned with centerline axis 1206 of unfixed lug 1208. Thereby, a wing containing wing fold system 1100 may be sized such that no component of wing fold system 1100 may require a fairing that expands a profile of the wing. As shown in FIG. 12A, lock 1210 may be in disengaged position 1234 such as disengaged position 544 is described for FIG. 5.

With lock 1210 engaged between all lugs of latch 1212 contact between exterior sides of lock 1210 and the interior edges of openings through fixed lugs 1204 and unfixed lug 1208 may be sufficient to substantially inhibit movement of unfixed portion 1218 of relative to fixed portion 1220.

Stop device 1216 may be positioned on fixed portion 1220 such that unfixed lug 1208 contacts stop device 1216 such that unfixed portion 1218 cannot move any further toward a flight position such as flight position 510 as shown in FIG. 5. Stop device 1216 may be positioned on fixed portion 1220 such that unfixed lug 1208 may contact stop device 1216 such that centerline axis 1206 of unfixed lug 1208 aligns substantially with centerline axis 1202 of fixed lugs 1204 and centerline axis 1222 of lock 1210. Without limitation, stop device 1216 may be a single component as shown in the illustrative embodiment, or may be a number of components that function together as a system generally located as shown for and performing the functions described for stop device 1216.

Unfixed lug 1208 may also include stop device 1238. Stop device 1238 may be positioned on unfixed lug 1208 such that stop device 1238 may contact stop device 1216 such that centerline axis 1206 of unfixed lug 1208 aligns substantially with centerline axis 1202 of fixed lugs 1204 and centerline axis 1222 of lock 1210. Without limitation, stop device 1238 may be a single component as shown in the illustrative embodiment, or may be a number of components that function together as a system generally located as shown for and performing the functions described for stop device 1238.

If unfixed lug 1208 is formed without stop device 1238, then unfixed lug 1208 will be sized to include the space indicated by stop device 1238 such that unfixed lug 1208 may contact stop device 1216 in the same manner as depicted in FIGS. 12A, 12C, and 12D for stop device 1238. Thereby, a wing containing wing fold system 1100 may be sized such that no component of wing fold system 1100 may require a fairing that expands a profile of the wing.

Similarly, if stop device 1238 is used, but stop device 1216 is not included on fixed portion fixed portion 1220, then fixed portion 1220 will occupy the space indicated by stop device 1216, and stop device 1238 may contact fixed portion 1220 in the same manner it is shown contacting stop device 1216 in FIGS. 12A, 12C, and 12D.

With unfixed portion 1218 in flight position 510, as shown in FIG. 5, if the only external force acting on unfixed portion 1218 was gravity, and wing fold actuator 1102 was not restricting movement of unfixed portion 1218 about centerline axis 1130 of wing fold actuator 1102, it may be possible that unfixed portion unfixed portion 1218, acting about centerline axis 1130 of wing fold actuator wing fold actuator 1102, may be weighted or configured such that unfixed portion 1218 pushes unfixed lug 1208 to rest against stop device 1216 as shown in FIG. 12A.

Alternatively, unfixed portion 1218 may be weighted such that if the only external force acting on unfixed portion 1218 was gravity, and wing fold actuator 1102 was not restricting movement of unfixed portion 1218 about centerline axis 1130 of wing fold actuator 1102, it may be possible that unfixed portion unfixed portion 1218, acting about centerline axis 1130 of wing fold actuator 1102, may have a resting point such that some angle exists between a span of unfixed portion 1128 and a span of fixed portion fixed portion 1126. Hence, for unfixed portion 1128 to push unfixed lug 1208 against fixed portion 1126, wing fold actuator 1102 must apply a force on unfixed portion 1128. Referring now to FIG. 12B. FIG. 12B is a plan view diagram of a lock unable to engage with misaligned latches in accordance with an illustrative embodiment.

More specifically, FIG. 12B shows a condition where unfixed lug 1208 may not be in contact with stop device 1216 and centerline axis 1206 of unfixed lug unfixed lug 1208 may not be aligned with centerline axis 1202 of fixed lugs 1204 and centerline axis 1222 of lock 1210.

The illustrative embodiments recognize and take into account that when an aircraft may be in motion there may be forces acting upon unfixed portion 1218 due to unfixed portion 1218 being connected to an aircraft and reacting to movement of the aircraft. Without limitation the forces acting upon unfixed portion 1218 may be caused by imperfections or bumps in the surface the aircraft may be moving over, or due to an operator technique during movement of the aircraft. Some of the forces on unfixed portion 1218 may move unfixed lug 1208 into stop device 1216, while some of the forces on unfixed portion 1218 may move unfixed lug unfixed lug 1208 away from stop device 1216. If wing fold actuator 1102 cannot restrict motion of unfixed portion 1218, unfixed lug 1208 may be able to move to the position shown in FIG. 12B.

Unfixed lug 1208 may be in the position shown by FIG. 12B during transition of unfixed portion 1218 between flight position 510 and the on-ground position, as shown without limitation by FIG. 5. Alternatively, for some configurations of unfixed portion 1218, a distribution of weight of components of unfixed portion 1218 may result in unfixed lug 1208 resting in the position shown by FIG. 12B if unfixed portion 1218 were free to rotate about fold axis 1130 without any restriction, and gravity being the only force acting on the mass of unfixed portion 1218.

When unfixed lug 1208 and fixed lugs 1204 are each positioned as shown in FIG. 12B, if lock actuator 1214 attempts to move lock 1210 through 1209 and fixed lugs 1204 of latch 1212 toward engaged position 1232 as shown in FIG. 12D, lock 1210 may be halted by contact with unfixed lug 1208. When lock actuator 1214 senses resistance to insertion that may be greater than expected, lock actuator 1214 flight controls computer may direct lock 1210 to attempt to retract from latch 1212 and return to disengaged position 1234 as shown in FIG. 12A. Thus, if centerline axis 1206 of unfixed lug 1208 and centerline axis 1202 of fixed lugs 1204 and centerline axis 1222 of lock 1210 may be misaligned, without limitation to a degree shown in FIG. 12B or greater, lock 1210 may not be able to extend through latch 1212 to reach engaged position 1232 as shown in FIG. 12D, or as shown in FIG. 5 as engaged position 540 for latch 1212 in closed position 530. Latch 1212 may be one of latches 572.

Further, the illustrative embodiments recognize and take into consideration that stop device 1216 and/or unfixed lug 1208 may become worn or misadjusted such that unfixed lug 1208 may not contact stop device 1216 such that centerline axis 1206 of unfixed lug 1208 and centerline axis 1202 of fixed lugs 1204 and centerline axis 1222 of lock 1210 may each be substantially aligned with each other. Accordingly, design adjustments may be desired that allow moving lock 1210 to closed position 530 when centerline axis 1206 of unfixed lug 1208 does not perfectly align with centerline axis 1202 of fixed lugs 1204 and centerline axis 1222 of lock 1210.

With reference now to FIG. 12C, FIG. 12C is a cross-sectional plan view diagram of a lock in a disengaged position when a centerline axis of an unfixed lug may not align with a centerline axis of fixed lugs and a centerline axis of a lock in accordance with an illustrative embodiment. More specifically, with latch 1212 closed as shown in FIG. 12C, FIG. 12C may be an illustrative embodiment of unfixed portion 1218 in a flight position, such as without limitation flight position 510 as shown in FIG. 5. More specifically, FIG. 12C shows centerline axis 1206 of unfixed lug 1208 misaligned from centerline axis 1202 of fixed lugs 1204 and centerline axis 1222 of lock 1210. As shown, the misalignment of the axis may not be too large to prevent lock actuator 1214 from inserting lock 1210 through latch 1212 into closed position 530 as shown in FIG. 5.

The illustrative embodiments take into account and recognize that unfixed lug 1208 and/or stop device 1216 may become worn. Thus, latch sensors not shown, which may be an example of latch sensors 566 as shown in FIG. 5, may sense the misalignment of centerline axis 1206 of unfixed lug 1208 away from being substantially aligned with centerline axis 1202 of fixed lugs 1204 and centerline axis 1222 of lock 1210. Sensors may send an alert and/or a request for adjustment. Alert and/or request for adjustment may be sent to a maintenance tracking system and/or to flight controls computer 1118 as shown in FIG. 11.

Thus, as can be seen comparing the condition shown in FIG. 12B of the illustrative embodiment to the condition shown in FIG. 12C, there is some amount of angular free play between the span line of unfixed portion 1128 and the span line of fixed portion 1126 that will allow lock 1210 to engage with latch 1212 when latch 1212 is close to, but not fully in, closed position 530 of FIG. 5, as shown in FIG. 12C.

Similarly, with lock 1210 in engaged position 1232, as shown in FIG. 12D, angular free play of the span line of unfixed portion 1128 relative to the span line of fixed portion fixed portion 1126 must be controlled to prevent moments from unfixed portion 1128 acting upon unfixed lug 1208 in a manner that applies such a force onto a side of lock 1210 that the power of lock actuator 1214 may not be great enough to retract lock 1210 from latch 1212.

Therefore, stop device 1216 may be adjustable. Stop device 1216 may be moved, manually or automatically, or via some combination thereof, so that when unfixed lug 1208 may be held against stop device 1216 by force 1228, that centerline axis 1206 of unfixed lug 1208 may be substantially aligned with centerline axis 1202 of fixed lugs 1204 and centerline axis 1222 of lock 1210.

Similarly stop device 1238 may be adjustable. Stop device 1238 may be moved, manually or automatically, or via some combination thereof, so that when stop device 1238 on unfixed lug 1208 may be held against stop device 1216 by force 1228, that centerline axis 1206 of unfixed lug 1208 may be substantially aligned with centerline axis 1202 of fixed lugs 1204 and centerline axis 1222 of lock 1210. An adjustment to stop device 1238 may be made in coordination with or in place of an adjustment to stop device 1216.

Force 1228 may be generated by wing fold actuator 1102 moving unfixed portion 1128, as shown in FIG. 11, toward flight position 510, as shown in FIG. 5, and moving stop device 1238 of unfixed lug 1208 against stop device 1216 on fixed portion 1220.

Lock 1210 may have corners 1224, on an end of lock 1210 that may contact unfixed lug 1208, which may be rounded, beveled, or slanted. An opening through unfixed lug 1208 may have rounded, beveled, or slanted corners 1226 on a side of unfixed lug 1208 that faces lock actuator 1214. Thus, if unfixed lug 1208 is in a position such that lock 1210 moving toward engaged position 1232, as shown in FIG. 5, contacts corners 1224 with corners 1226 of unfixed lug 1208, then an insertion force from lock actuator 1214 may cause lock 1210 to move unfixed lug 1208 such that centerline axis 1206 of unfixed lug 1208 substantially aligns with centerline axis 1202 of fixed lugs 1204 and centerline axis 1222 of lock 1210.

Accordingly, force 1228 holding unfixed lug 1208 against stop device 1216 may need to be of a low enough value that force 1230 on lock 1210, provided by lock actuator 1214, may be strong enough to overcome force 1228 and move unfixed lug 1208 away from stop device 1216 enough to allow lock 1210 to move through fixed lugs 1204 and unfixed lug 1208 to engaged position 1232 as shown in FIG. 12D.

With reference now to FIG. 12D, FIG. 12D is a cross-sectional plan view diagram of a lock in an engaged position in a closed latch in accordance with an illustrative embodiment. More specifically, engaged position 1232 for lock 1210 in latch 1212 may be an example of engaged position 1232 as shown in FIG. 5. Lock 1210 may be fully engaged when tangent points 1236 of corners 1224 to side of lock 1210 have passed beyond the far left side of left most fixed lugs 1204.

When lock 1210 may be in engaged position 1232, power system 1116 may be isolated from wing fold actuator 1102 such that force 1228 may be no longer applied to unfixed lug 1208 and lock 1210 carries any loads keeping latch 1212 in closed position 530 as shown in FIG. 5. Thus, the design provides for maintaining latch 1212 in closed position 530, as shown in FIG. 5, and unfixed portion in 1128 in flight position 510, as shown in FIG. 11 and FIG. 5, via lock 1210 even when no power may be supplied to wing fold actuator wing fold actuator 1102. Accordingly, before flight, power may be removed from lock actuator 1214 to prevent unintentional retraction of lock 1210 during flight. Similarly, power may be removed from wing fold actuator 1102 during flight to inhibit wing fold actuator 1102 from attempting to move unfixed portion 1128 away from flight position 510, as shown in FIG. 11 and FIG. 5.

The illustrative embodiments recognize and take into account that limiting a size and/or weight of each lock actuator 1214 located in a wing may improve performance and/or fuel efficiency of an aircraft. Thereby, a wing containing wing fold system 1100 may be sized such that no component of wing fold system 1100 may require a fairing that expands a profile of the wing. Accordingly, it may be desirable for lock actuator 1214 to have the smallest size and weight possible while still being able to produce force 1230 large enough to allow lock 1210 to move through fixed lugs 1204 and unfixed lug 1208 to engaged position 1232 as shown in FIG. 12D.

Figure 13:
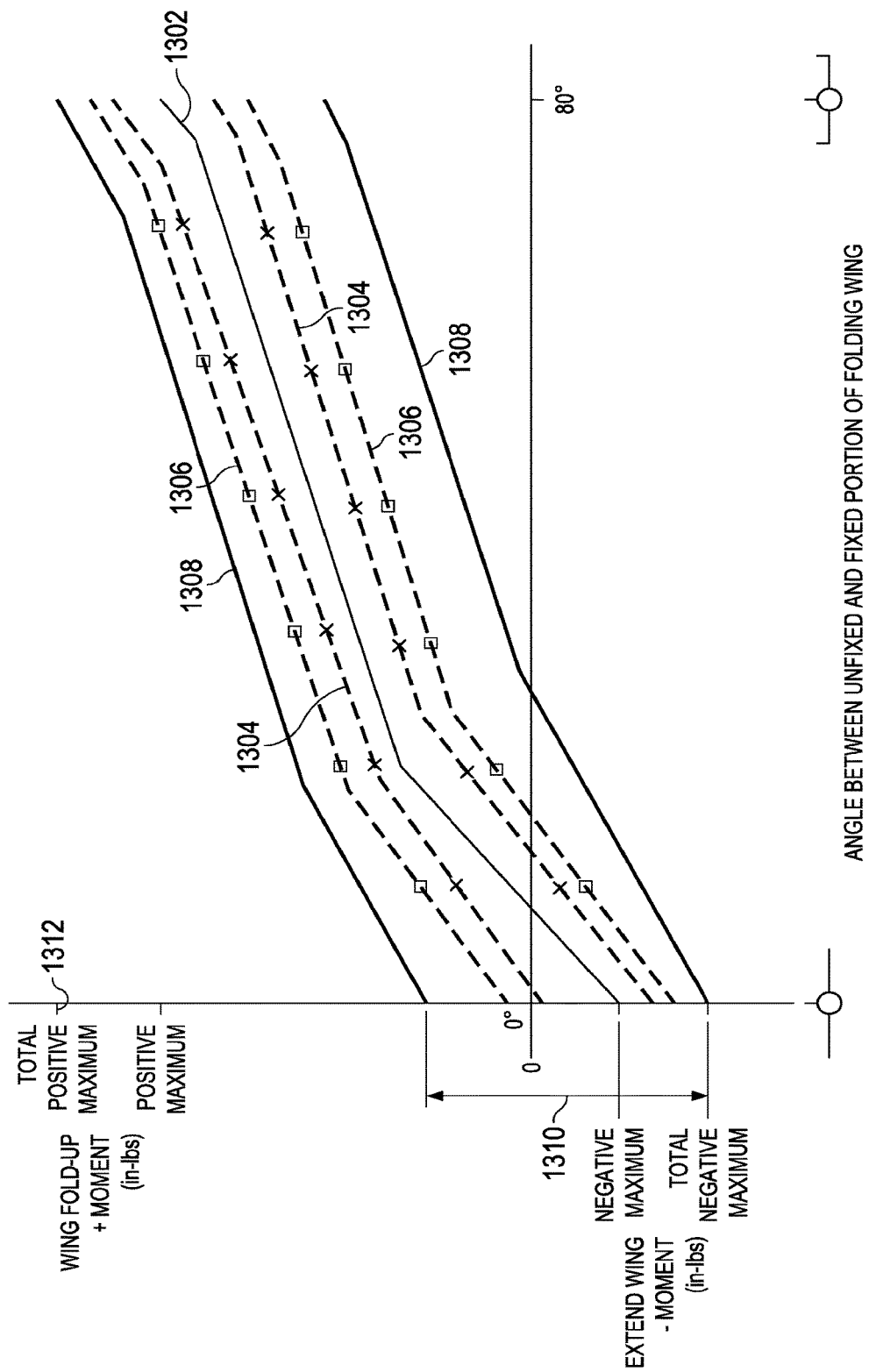
FIG. 13 is a chart indicating moments about a wing fold actuator hinge, in accordance with an illustrative embodiment.

With reference now to FIG. 13, FIG. 13 is a chart indicating moments about a wing fold actuator hinge, in accordance with an illustrative embodiment. More specifically, chart 1300 presents a relative moment about a centerline of wing fold actuator 1102, such as without limitation fold axis 1130 of unfixed portion 1128, as shown in FIG. 11. Fold axis 1130 may substantially align with a centerline axis of wing fold actuator 1102, as shown in FIG. 11.

Thus, moments about fold axis 1130 may represent moments that wing fold actuator 1102 may need to generate to hold unfixed portion 1128 at the angle indicated by the horizontal axis of chart 1300. In other words, a relative torque value on an output device of wing fold actuator 1102 may be shown for various angles between a span line of unfixed portion 1128 and a span line of fixed portion 1126 for a wing containing wing fold actuator 1102, measured from the span line of fixed portion 1126 rotating upward toward the aircraft body. The span line of unfixed portion 1128 may be represented by a line extending from unfixed portion 1128 toward fixed portion 1126 along a top surface of spar extending from unfixed portion 1128 that associates with a spar of fixed portion 1126. The span line of fixed portion fixed portion 1126 may be represented by a line extending from fixed portion 1126 toward unfixed portion 1128 along a top surface of a spar extending from fixed portion 1126 that associates with unfixed portion 1128.

The vertical axis of chart 1300 represents relative values for moments about fold axis 1130. A positive value may be assigned to a moment that acts in a direction that moves unfixed portion 1128 toward the on-ground position, as shown in FIG. 5. Similarly, torque at an output device from wing fold actuator 1102 may be positive if it moves unfixed portion 1128 toward the on-ground position. A negative value may be assigned to a moment that acts in a direction the moves unfixed portion 1128 toward flight position 510, as shown in FIG. 5. Similarly, torque at the output device from wing fold actuator 1102 may be negative if it moves unfixed portion 1128 toward flight position 510. At the horizontal axis, the moment about fold axis 1130 has a value of zero. Although specific magnitudes are not presented along the vertical axis, the scale may be considered as a linear one, such that a first point along the vertical axis that lies twice the distance from the horizontal axis as a second point may be considered to represent a moment of twice the magnitude as the second point.

The horizontal axis of chart 1300 represents a value for the angle between the span line of fixed portion 1126 and the span line of unfixed portion 1128. At the vertical axis a zero degree angle may exist between the span line of fixed portion 1126 and the span line of unfixed portion 1128 of the wing containing wing fold actuator 1102.

Line 1302 presents a relative indication of the torque required from an output device of wing fold actuator 1102 to position unfixed portion 1128 as it moves between the on-ground position and flight position 510, as shown in FIG. 5, when the only force acting on unfixed portion 1128 may be the weight of unfixed portion 1128. In other words, line 1302 presents a relative indication of the torque required from an output device of wing fold actuator 1102 to position unfixed portion 1128 as it moves between the on-ground position and flight position 510, as shown in FIG. 5, for a static aircraft without wind on a level surface. No influences of wind, ground slope, or movement of the aircraft are represented in line 1302.

Without limitation, the on-ground position for unfixed portion 1128 may be a position near the 80 degree mark on the horizontal axis of chart 1300. Without limitation, flight position 510 may be a position near the 0 degree mark, or vertical axis, on the horizontal axis of chart 1300. FIG. 13 is not intended to limit possible angles between the span line of fixed portion 1126 and the span line of unfixed portion unfixed portion 1128. In some embodiments, the on-ground position may extend beyond 90 degrees. In some embodiments, flight position 510 may be some negative angle less than zero.

As can be seen in FIG. 13, a zero moment may exist when the angle may be some value greater than zero. Thus, due to the weight of components of unfixed portion 1128, if unfixed portion 1128 were allowed to freely rotate about fold axis 1130, as shown in FIG. 11, then unfixed portion 1128 would rest displaced from flight position 510 some number of degrees toward the on-ground position, as shown in FIG. 5.

Thus for unfixed lug 1208 to be aligned with fixed lugs 1204 and latch 1212 to be in closed position 530 so that lock 1210 may extend to engaged position 1232, as shown in FIG. 5, then wing fold actuator 1102 must provide some negative moment so that angle between the span of unfixed portion 1128 and fixed portion 1126 will be held at an angle designated for flight position 510. The angle designated for flight position 510 may be zero, or may be some other angle that may be greater than or less than zero when an anhedral wing tip configuration may be desire.

The illustrative embodiments recognize and take into account that the weight of unfixed portion 1128 may not be the only force acting upon unfixed portion 1128 and wing fold actuator 1102. Wind may blow from any direction relative to 1128 and at various magnitudes. Without limitation, when unfixed portion 1128 on a left wing of an aircraft may be moving from the on-ground position toward flight position 510, a wind from the left side of the aircraft would act against a bottom surface of unfixed portion 1128 and push it towards the on-ground position, thus adding a positive moment component about fold axis 1130, and requiring wing fold actuator 1102 to produce a greater negative moment to overcome the positive moment added by the wind and keep unfixed portion 1128 moving toward the on-ground position. A wind from the right side of the aircraft would have the opposite effect. Higher magnitude winds or winds gusting to higher magnitudes may increase the value of the resulting moments. Thus, lines 1304 represent that, due to winds, some range of values may be added to or subtracted from the moment values for a static aircraft without wind represented by line 1302.

The illustrative embodiments recognize and take into account that forces other than wind may affect loads on unfixed portion 1128. Without limitation, aircraft movement on the ground may generate lift and drag forces as air passes across unfixed portion 1128. The lift and drag forces may depend upon the angle between a chord line of unfixed portion 1128 and a relative wind to unfixed portion 1128. The relative wind may be dependent upon environmental conditions, and upon an indicated speed of the aircraft containing unfixed portion 1128. Thus, the range represented by lines 1304 may be limited by some specified maximum indicated airspeed limit for allowing movement of unfixed portion unfixed portion unfixed portion 1128 to be commanded by wing fold system 1100. Hence, lines 1304 may represent a range limited by a design speed for wing fold system 1100 operation that may take into account and recognize some specified maximum indicated airspeed limit for allowing movement of unfixed portion unfixed portion unfixed portion 1128 to be commanded by wing fold system 1100.

Further, aircraft vibrations during movement, flex in components of unfixed portion 1128 and/or fixed portion 1126, and affects from uneven pavement and/or operator technique may cause variations in positive and negative moments about fold axis 1130 for unfixed portion 1128. Without limitation, a force generated during turning of the aircraft, and/or due to asymmetrical engine thrust or wheel break forces, and/or due to flight control deflections, and/or a slope or a bank of the ground the aircraft may be on may also affect a positive and/or a negative moment about fold axis 1130.

Thus, lines 1306 indicate that some relative increase or decrease in moments about fold axis 1130, and thus torque required from output device of wing fold actuator 1102 may result from forces other than only a weight of unfixed portion 1128 and wind acting on unfixed portion 1128. Lines 1306 recognize and take into account that vibration effects from other components in an aircraft containing wing fold system 1100 and/or forces resulting from bumps or unevenness in a surface the aircraft moves upon, and/or forces generated by possible impact of unfixed portion 1128 and/or the aircraft with objects above the surface the aircraft moves upon, may be affected by an indicated airspeed of the aircraft. Thus, the range represented by lines 1306 may be limited by some specified maximum indicated airspeed limit for allowing movement of unfixed portion unfixed portion unfixed portion 1128 to be commanded by wing fold system 1100. Hence, lines 1306 may represent a range limited by a design speed for wing fold system 1100 operation that may take into account and recognize some specified maximum indicated airspeed limit for allowing movement of unfixed portion unfixed portion unfixed portion 1128 to be commanded by wing fold system 1100.

Although in the example shown in chart 1300, the range of magnitude of variations for lines 1306 are greater than those for lines 1304, the opposite may be the case. Regardless, a sum of all forces acting upon unfixed portion 1128 may produce total moment about fold axis 1130 that may vary above and below a moment about fold axis 1130 due only to the weight of unfixed portion 1128 by some magnitude.

Thus, wing fold actuator 1102 may be required to have enough power to provide torque to an output device, which may rotate unfixed portion 1128, that may be at least equal to the total moment about fold axis 1130 due to a sum of all forces acting upon unfixed portion 1128. Hence, for the example of chart 1300, an output device of wing fold actuator 1102 may be required to provide positive torque equal to at least the total positive maximum moment shown on chart 1300, and torque equal to at least the total negative maximum moment shown on chart 1300.

Further, reliability requirements, or regulatory requirements may increase the required torque capability, by some multiple, for wing fold actuator 1102. Without limitation reliability may include accurately performing within specifications or be related to minimizing a failure rate. Additionally, wing fold actuator 1102 may be required to provide positive torque equal to at least the total positive maximum after the aircraft has experienced, without limitation, some specified acceleration load factor, and or be able to perform without degradation after some number of hours of operation at some vibration rate and/or range. Wing fold actuator 1102 may be required to provide positive torque equal to at least the total positive maximum after the aircraft has experienced, without limitation, some specified range or change in ambient temperature, and/or pressure, and/or humidity, and/or electrical current surge. Without limitation, such requirements may include Federal Aviation Administration aircraft certification requirements, such as without limitation 14 Code of Federal Regulations (CFR) Part 21, and/or airworthiness requirements, such as without limitation 14 CFR Part 25. Regulations may require capability to operate wing fold actuator 1102 and wing fold system 1100, as shown in FIG. 11, after an aircraft may experience acceleration loads that may be from minus 4 to plus 200 times the force of gravity.

Typically, a wing fold actuator may be manufactured to produce a same maximum value of negative torque to an output device as the maximum value of positive torque produced by the wing fold actuator to an output device. Hence, it can be seen that if wing fold actuator 1102 has sufficient power to meet the total positive maximum indicated in chart 1300, then it may be capable of providing an output device with more than twice the total negative maximum torque required.

The illustrative embodiments recognize and take into account that operating wing fold actuator 1102 at maximum output every time wing fold actuator 1102 may be operated may reduce a reliability and/or a mean time to replacement for wing fold actuator 1102. Regulating wing fold actuator 1102 output, to a level only required to overcome the actual moments acting upon unfixed portion 1128 about fold axis 1130 may reduce stress and/or wear on wing fold actuator 1102, and/or components associated with wing fold actuator 1102. Regulating wing fold actuator 1102 output, to a level only required to overcome the actual moments acting upon unfixed portion 1128 about fold axis 1130 may increase the reliability and/or mean time to replacement for wing fold actuator 1102.

As discussed above for FIG. 12A through FIG. 12D, lock 1210 may be extended by lock actuator 1214 through latch 1212 into engaged position 1232 as shown in FIG. 12D, and may be retracted from latch 1212 to disengaged position 1234 when latch 1212 may be in closed position 530, as shown in FIG. 5 and above in FIGS. 12A, 12C, and 12D. Latch 1212 may be in closed position 530 when unfixed portion 1128 may be in flight position 510, as shown in FIG. 5 and above in FIGS. 12A, 12C, and 12D. As shown for the illustrative embodiment of FIG. 13, unfixed portion 1128 may be extended to flight position 510 when an angle between a span of unfixed portion 1128 and a span of fixed portion 1126 may be at or near zero degrees. A span of fixed portion 1126 may be known as a wing reference plane. The wing reference plane may be some number of degrees separate from a line formed along the surface of the ground beneath wing fold system 1100.

Chart 1300 shows that when lock 1210 may need to extend into or retract from latch 1212, and the angle between the span of unfixed portion 1128 and the span of fixed portion 1126 may be at or near zero degrees, that the torque needed from wing fold actuator 1102 to hold unfixed portion 1128 in the proper position may need to be equal only to the values in lock range 1310. As shown by chart 1300, the moments within lock range 1310 are significantly less than maximum value 1312. Maximum value 1312 represents the total positive maximum moment needed to hold unfixed portion 1218 in the on-ground position, as shown in FIG. 5 or in FIG. 2.

In the illustrative embodiment represented by chart 1300, the on-ground position for unfixed portion 1128 may be represented by an angle between the span of unfixed portion 1128 and the span of fixed portion 1126 that may be greater than 80 degrees. In potential operating conditions for wing fold system 1100, maximum value 1312 may be at least 7 times greater than the value of negative maximum indicated for line 1302.

Thus, flight controls computer 1118 may direct control module 1112 to regulate an output device of wing fold actuator 1102 to push stop device 1238 of unfixed lug 1208 into stop device 1216 of fixed portion 1220 and hold both stop devices in a position shown by FIG. 12A, using a force that may be no larger than required to generate a moment having a value at the greater limit of lock range 1310 represented by lines 1308, instead of some greater value outside of lock range 1310. Hence, in operation, as compared to a common wing fold actuator that outputs a force to produce a moment having a value that may be at least as great as maximum value 1312, the force output required from wing fold actuator 1102 may be regulated down to a value within lock range 1310. Thus, by reducing an output required from wing fold actuator 1102 during operations extending lock 1210 into engaged position 1232, shown in FIG. 12D, and retracting lock 1210 into disengaged position 1234, shown in FIG. 12A, at least one of a reliability, and a mean time to replacement for wing fold actuator 1102, may be increased, and/or a size and weight of wing fold actuator 1102 may be reduced, as compared to a common wing fold actuator that outputs a force to produce a moment having a value that may be at least as great as maximum value 1312. Thereby, a wing containing wing fold system 1100 may be sized such that no component of wing fold system 1100 may require a fairing that expands a profile of the wing.

Further, by wing fold actuator 1102 holding centerline axis 1206 of unfixed lug 1208 in the alignment with centerline axis 1202 and centerline axis 1222 as shown in FIG. 12A, forces required of lock actuator 1214 for transitioning lock 1210 in or out of latch 1212 may be held to a minimum value. Thus, by reducing an output required from lock actuator 1214 to a minimum during operations extending lock 1210 into engaged position 1232, shown in FIG. 12D, and retracting lock 1210 into disengaged position 1234, shown in FIG. 12A, at least one of a reliability, and a mean time to replacement for lock actuator 1214 may be increased, and/or a size and weight of lock actuator 1214 may be reduced, as compared to a common lock actuator 1214 that may not operate with wing fold actuator 1102 holding centerline axis 1206 of unfixed lug 1208 in the alignment with centerline axis 1202 and centerline axis 1222 as shown in FIG. 12A. Thereby, a wing containing wing fold system 1100 may be sized such that no component of wing fold system 1100 may require a fairing that expands a profile of the wing.

Accordingly, it may be desirable to have a method and apparatus that may allow wing fold actuator 1102 to limit force supplied by an output device of wing fold actuator 1102 to only values that are within the range indicated by lock range 1310. Wing fold actuator 1102 may be a geared rotary actuator. Force supplied by wing fold actuator 1102 may generate torque on an output device. Thus, when moving lock 1210 between disengaged position disengaged position 1234 to engaged position engaged position 1232, as shown in FIGS. 12A and 12D respectively, torque required from an output device of wing fold actuator 1102 may be reduced by a factor of 7 times or more More advantageously, it may be desirable to have a method and apparatus that may allow wing fold actuator 1102 to limit torque supplied by an output device of wing fold actuator 1102 to only a value that equals the actual moment about fold axis 1130 in real time as wing fold actuator 1102 may be at any given angle represented in FIG. 13. In other words, output force and work produced by wing fold actuator 1102 may be minimized when force supplied by wing fold actuator 1102 may be regulated by flight controls computer 1118 and control module 1112 to the actual moment acting about fold axis 1130 on wing fold actuator 1102 in real-time at any given angle for wing fold actuator 1102 throughout the range from the on-ground position to flight position 510, as shown in FIG. 5.

When moving lock 1210 between disengaged position disengaged position 1234 to engaged position engaged position 1232, as shown in FIGS. 12A and 12D respectively, an output device of wing fold actuator 1102 that may produce a force able to control moments with a value within lock range 1310 be reduced by a factor of 7 times or more as compared to a common wing fold actuator that produces a force to control moments at maximum value 1312.

Thus, referring now back to FIG. 11, flight controls computer 1118 may receive inputs from sensors, which may include without limitation sensors 564, that allow flight controls computer 1118 to compute the actual moment about fold axis 1130 and regulate torque provided by an output device of wing fold actuator wing fold actuator 1102 to move unfixed portion 1128 at a desired rate, or to hold unfixed portion 1128 in a desired position. Sensors, which may include without limitation sensors 564, may provide indications for a position and a status of each component of wing fold system 1100, and of an environment condition affecting the aircraft containing wing fold system 1100, such that flight control computers may compute in real-time the actual moment about fold axis 1130 due to all factors, including without limitation wind, aircraft movement, weight and balance of wing fold actuator 1102 about fold axis 1130, and lift and/or drag on unfixed portion 1128 and/or fixed portion fixed portion 1126.

Status 402 and/or warning system 426 and/or status 504, and/or aircraft system status 590 and/or sensors 564 may also include wing fold system 502 recognizing a sensor status. The sensor status may be a status for each sensor such that a fault and/or failure in each sensor may be recognized by flight controls computer 1118 and an indication of a sensor status may be provided to control panel control panel 1120 and/or other associated systems.

Further, status 402 and/or warning system 426 and/or status 504, and/or aircraft system status 590 and/or sensors 564 may include sensors recognizing a status of flight controls computer 1118 and/or components thereof. Thus, an input data failure and/or a fault and/or a failure of a hardware component and/or software function of flight controls computer 1118 may be recognized and an indication for a flight controls computer 1118 status may be provided to control panel 1120 and/or other associated systems.

Further still, status and/or a fault and/or a failure in a component of control panel 1120 may also be recognized and may be provided to control panel 1120 and/or other associated systems. Thus, a position and/or status of a wing tip control device and any fault or failure of the device may be recognized and/or may be indicated at control panel 1120 and/or other associated systems.

For any given operation transitioning unfixed portion 1128 between flight position 510 and the on-ground position, the actual moments acting about fold axis 1130 will be represented by a single continuous line whose points fall between the ranges represented by lines 1308. A minimum output required of wing fold actuator 1102 may occur when output forces from wing fold actuator 1102 moving unfixed portion 1128 are sufficient to generate moments equal to move unfixed portion 1128 through the angles represented by the single continuous line at a desire rate.

Flight controls computer 1118 may thus direct control module 1112 to regulate power supplied to wing fold actuator 1102, to produce a force based upon the actual moment acting on fold axis 1130, that may move unfixed portion 1128 at a desired rate in a desired direction, or hold unfixed portion 1128 in a desired position. Thus, as compared to a control module that provides power based on some assumed potential range of required values, as may be represented without limitation by lines 1308 in FIG. 13, control module 1112, directed by flight controls computer 1118, may allow wing fold actuator 1102 to move unfixed portion 1128 with significantly less torque. Thus, control module 1112, directed by flight controls computer 1118 may continuously decrease the work load of wing fold actuator 1102, as compared to a control module that provides power based on some assumed potential range of required values.

Hence, the method as described for FIG. 7A above may also include step 710 modified to include the transition of the wing tip to be based upon dynamic load control of the actuator of the wing fold system. Thereby, flight controls computer 1118 may limit output of power drive unit 1110 such that only the force required to move wing fold actuator 1102 to a specified position at a rate specified will be dynamically provided in real time based upon actual loads acting on components of wing fold system 1100.

Thus, in an illustrative example if a moment a acting about fold axis 1130 for 1130 unfixed portion 1128 during lock engagement may be a value indicated by the point where line 1302 intersects the vertical axis, and control module 1112 regulates the power to wing fold actuator 1102 to provide an output that matches that value, then the output produced by wing fold actuator 1102 may be reduced by a factor of 7 times or more as compared to a common wing fold actuator that constantly produces a force to match the value of moments at maximum value 1312. Without limitation, if the flight controls computer 1118 computes a moment value, based on inputs from without limitation sensors 564, that may be outside a range of predicted values, control module 1112 may limit torque provided by power drive unit 1110 to a limit within the predicted range. This limiting produced torque to a value below a computed would also cause an annunciation to maintenance personnel to possibly perform an inspection or further maintenance.

Further, flight controls computer may track and record without limitation all data related to the computed moments about fold axis 1130, and of all power levels supplied to wing fold actuator 1102. Hence, plots of single continuous lines for actual transition of unfixed portion 1128 between flight position 510 and the on-ground position may be created. Thus, an operating history may be created from the data that provides information without limitation about loads and stresses on each component of wing fold system 1100. Without limitation, cumulative data and/or trends from the recorded information from sensors and/or computed moments about fold axis 1130 may be used to improve maintenance diagnostics and or direct appropriate mean time between replacement of wing fold actuator 1102 and/or other components of wing fold system 1100.

Figure 14A:
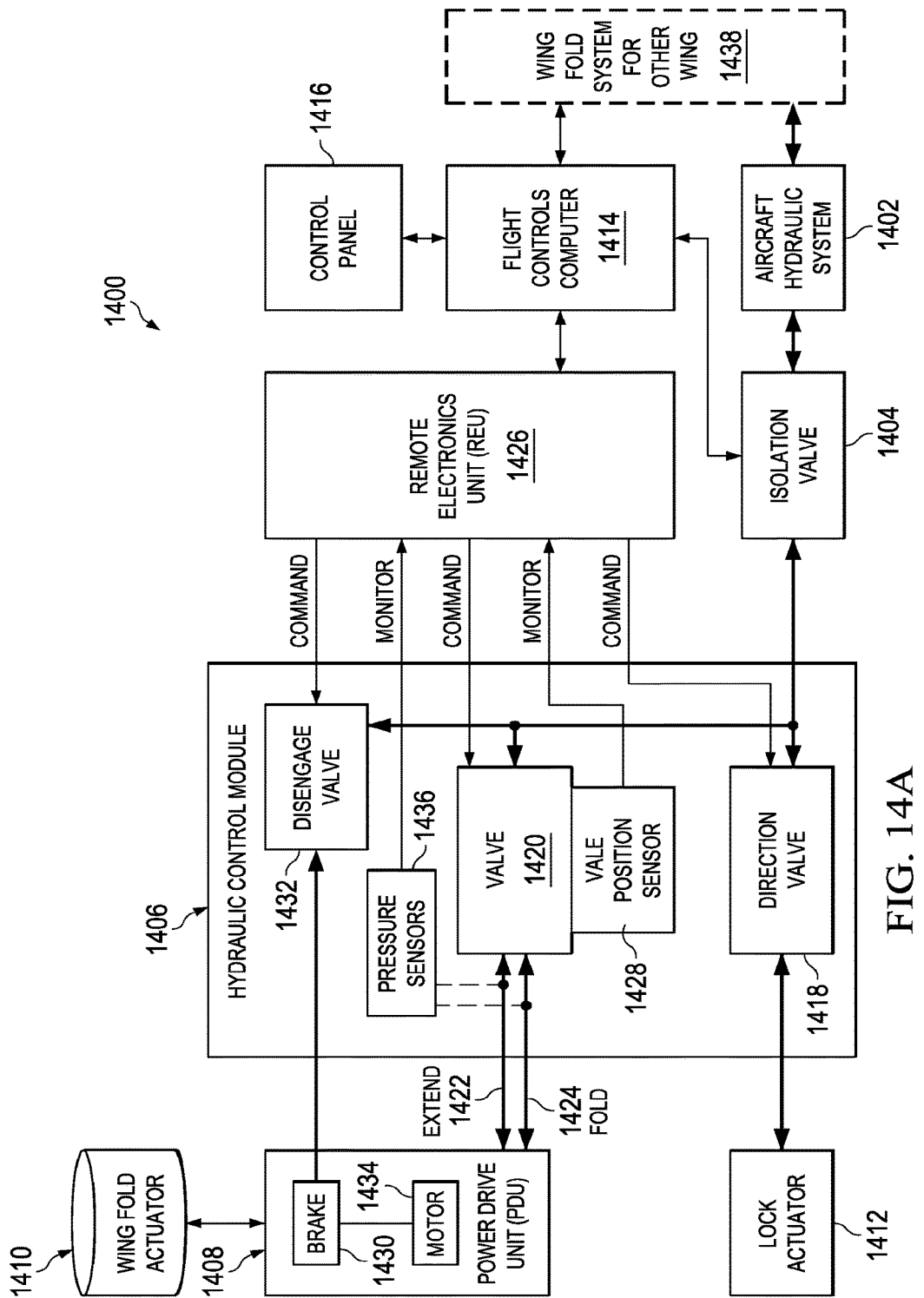
FIG. 14A, and FIG. 14B represent diagrams of components for a hydraulic control system for a wing fold system that includes FIG. 14A and FIG. 14B, in accordance with an illustrative embodiment.
Figure 14B:
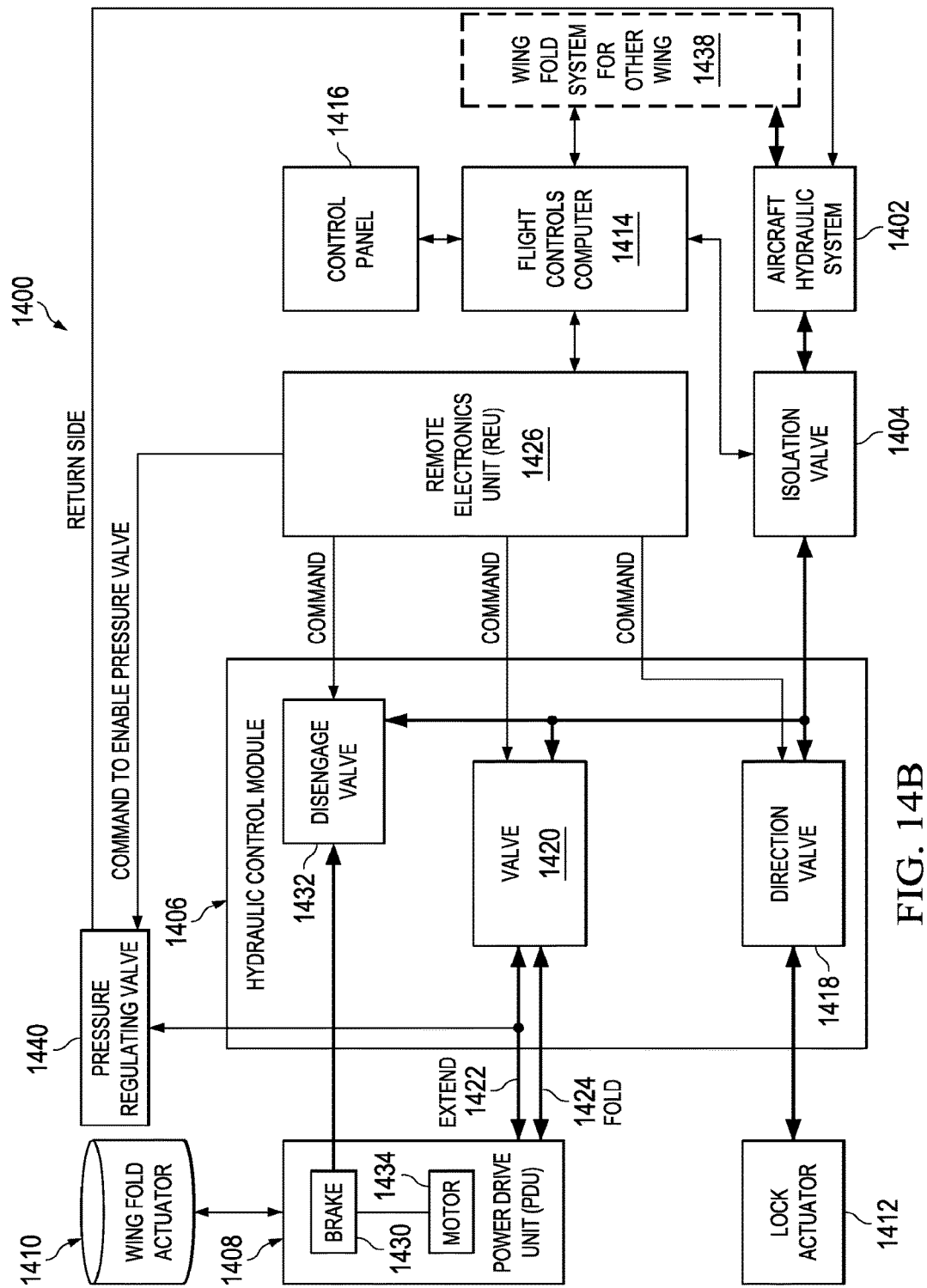

Referring now to FIG. 14A and FIG. 14B: FIG. 14A is a diagram for a hydraulic control system for a wing fold system with a motor driven by variable differential hydraulic power, in accordance with an illustrative embodiment; FIG. 14B is a diagram for a hydraulic control system for a wing fold system with a motor driven by fixed differential hydraulic power, in accordance with an illustrative embodiment. As mentioned above for FIG. 11, power system 1116 may be without limitation an electric, a pneumatic, or a hydraulic system. FIG. 14A and FIG. 14B may depict examples of hydraulic power system 1400 for wing fold system 1100, in accordance with an illustrative embodiment.

Hydraulic power system 1400 may include aircraft hydraulic system 1402, isolation valve 1404, hydraulic control module 1406, power drive unit 1408, wing fold actuator 1410, lock actuator 1412, flight controls computer 1414, and control panel 1416.

Aircraft hydraulic system 1402, isolation valve 1404, hydraulic control module 1406, power drive unit 1408, wing fold actuator 1410, lock actuator 1412, flight controls computer 1414, and control panel 1416 may be without limitation examples of power system 1116, isolation device 1114, control module 1112, power drive unit 1110, wing fold actuator 1102, lock actuator 1122, flight controls computer 1118, and control panel 1120, respectively as presented in FIG. 11, in accordance with an illustrative embodiment. Although FIG. 14A and FIG. 14B shows only one wing, aircraft hydraulic power system 1402 and flight controls computer 1414 may be connected to and control a wing fold system in another wing, as indicated by block 1438. The other wing may contain all the features shown in and discussed for hydraulic pressure system 1400 of FIG. 14A and FIG. 14B.

In an illustrative embodiment, hydraulic power system 1400 may power and control wing fold system 1100. Referring now to FIG. 14A, hydraulic fluid and pressurization from aircraft hydraulic power system 1402 may be connected to provide hydraulic fluid and pressure to hydraulic power system 1400. Aircraft hydraulic power system 1402 may be an example of power system 1116 as shown in FIG. 11, in accordance with an illustrative embodiment.

Isolation valve 1404 may isolate all hydraulic fluid and pressure from hydraulic power system 1400. Isolation valve 1404 may be an example of isolation device 1114 as shown in FIG. 11, in accordance with an illustrative embodiment. Isolation of all hydraulic fluid and pressure from hydraulic power system 1400 may prevent inadvertent movement of lock 1412. Lock 1412 may be an example of lock 1124 as shown in FIG. 11 or lock 1210 as in FIG. 12A through FIG. 12D. Thus, redundancy may be provided that may prevent undesired disengagement of lock 1412 from latch 1212 when unfixed portion unfixed portion 1128, as shown in FIG. 11, is desired to be flight position 510, as shown in FIG. 5 and FIG. 1.

Redundancy may also be provided by isolation of all hydraulic fluid and pressure from hydraulic power system 1400 that may prevent activation of wing fold actuator 1410 when movement of unfixed portion 1128 may be undesired. When isolation valve 1404 may be open, hydraulic fluid and pressure from aircraft hydraulic power system 1402 flow into hydraulic control module 1406.

Hydraulic control module 1406 may be an example of control module 1112 as shown in FIG. 11, in accordance with an illustrative embodiment. Hydraulic control module 1406 may have direction valve 1418 that may control hydraulic fluid and pressure from hydraulic control module 1406 to lock actuator 1412 to activate a lock, such as lock 1210 as shown in FIG. 12A through FIG. 12D, in an extend or a retract direction. Lock actuator 1412 may be an example of lock actuator 1214 in accordance with an illustrative embodiment.

Hydraulic control module 1406 may have valve 1420 to regulate hydraulic fluid and pressure sent to power drive unit 1408. Power drive unit 1408 may be an example of power drive unit 1110 as shown in FIG. 11, in accordance with an illustrative embodiment. Power drive unit 1408 may convert hydraulic power to a force that drives wing fold actuator 1410. Wing fold actuator 1410 may be an example of wing fold actuator 1102 as shown in FIG. 11, in accordance with an illustrative embodiment.

Power drive unit 1408 may include brake 1430 and motor 1434. Brake 1430 may be a device that prevents motor 1434 from moving. Brake 1430 may be designed such that when aircraft hydraulic power system 1402 may be removed from hydraulic control module 1406, that brake 1430 will act to prevent any movement of motor 1434 and thus prevent any movement of wing fold actuator 1410 and/or fixed portion unfixed portion 1218. Brake 1430 may be preloaded to hold motor 1434 motionless. Without limitation, a preload on brake 1430 to hold motor 1434 motionless may be provided by a spring configuration. When hydraulic pressure may be present in hydraulic control module 1406, disengage valve disengage valve 1432 may open to allow hydraulic pressure to overcome spring pressure preventing motor 1434 from moving.

Thus, if aircraft hydraulic power system 1402 will to lose all pressure, then brake 1430 would be applied to motor 1434. Without limitation, brake 1430 could be a clamp type configuration, or a lock pin type configuration, or any configuration that may be set to stop movement of motor 1434 and wing fold actuator 1410 when aircraft hydraulic power system 1402 fails to provide hydraulic pressure to hydraulic control module 1406.

A brake in power drive unit 1110 may function analogously to brake 1430 when power system 1116 may be other than hydraulically powered. Without limitation, if power system 1116 may be electric, an electrical charge may flow through control module 1112 to disengage a brake in power drive unit 1110 from engaging a motor in power drive unit 1110. If electrical power from power system 1116 were to fail, then the charge being removed from the brake in power drive unit 1110 would result in a preloaded force on the brake applying the brake to prevent any motion of the motor in power drive unit 1110.

When unfixed portion 1128 moves in a rotational manner, wing fold actuator 1410 may be a geared rotary actuator. When wing fold actuator 1410 may be a geared rotary actuator, the force produced by power drive unit 1408 may be a torque. Torque may be transferred from power drive unit 1408 to wing fold actuator 1410 via a linkage such as without limitation torque tube 1108, angle gearbox 1106, and torque tube 1104 being connected to wing fold actuator wing fold actuator 1102 as shown without limitation in FIG. 11, in accordance with an illustrative embodiment.

Without limitation, valve 1420 may be an electrohydraulic servo valve. When valve 1420 may be an electrohydraulic servo valve, a hydraulic line 1422 may connect to and drive motor 1434 in power drive unit 1408 in a direction that will move unfixed portion 1128 toward flight position flight position 510, as shown in FIG. 5, and a hydraulic line 1424 may connect to and drive motor 1434 in power drive unit 1408 in an direction that will move unfixed portion 1128 toward on-ground position. Pressure sensors 1436 may detect a pressure in each respective line and report each respective pressure to flight controls computer 1414 via remote electronics unit 1426.

Flight controls computer 1414 may monitor pressures in hydraulic line 1422 and hydraulic line 1424 and calculate a pressure differential between hydraulic line 1422 and hydraulic line 1424. Valve 1420 may also have a sensor that informs flight controls computer 1414 of a position of valve 1420. Thus, combined with feedback from sensors providing, without limitation a position and a status of wing fold actuator 1410 and unfixed portion 1128 as well as other components of wing fold system 1100, flight controls computer 1414 may direct hydraulic control module 1406 to position valve 1420 to produce a specified output from power drive unit 1408 that will provide a desired force from wing fold actuator 1410 to generate the desired moment about fold axis 1130, as shown in FIG. 11, needed to move unfixed portion 1128 to a specified position at a specified rate.

Valve 1420 may have an associated valve position sensor 1428. Valve position sensor 1428 may send position of valve 1420 back to flight controls computer 1414. Valve position sensor 1428 may send position of valve 1420 back to flight controls computer 1414 via remote electronics unit 1426. Remote electronics unit 1426 may be an example of analog-digital converter unit 1132, as shown in FIG. 11.

In operation, hydraulic control module 1406 controlling a pressure differential between hydraulic line 1422 and hydraulic line 1424 may control a direction of motion and torque at an output device for or power drive unit 1408 that drives wing fold actuator 1410 and moves unfixed portion 1128. Hence, inputs to flight controls computer 1414 of, without limitation status 402 and/or status 504 and/or from sensors 564, as shown in FIG. 4 and/or FIG. 5, as well as sensors providing input to flight controls computer 1414 for acceleration forces due to gravity on unfixed portion 1128 and/or fixed portion 1126, and/or components thereof, may be used by flight controls computer 1414 to compute, in real time, the actual moments acting about fold axis 1130 due to all forces acting upon unfixed portion 1128 and fixed portion 1126. Acceleration forces due to gravity on unfixed portion 1128 and/or fixed portion 1126, and/or components thereof may change without limitation as the aircraft containing wing fold system 1100 may roll over a bump on a surface at an airport.

Flight controls computer 1414 may send a command to hydraulic control module 1406 to adjust valve 1420 such that power drive unit 1408 will supply the least torque required to drive wing fold actuator 1410 and unfixed portion 1128 at a rate and to a position specified. The specified position may be determined in flight controls computer 1414 by a command received in flight controls computer 1414 from control panel 1416.

In some embodiments, motor 1434 may be a variable displacement motor. When motor 1434 may be a variable displacement motor, only one of hydraulic line 1422 or hydraulic line 1424 may be needed to regulate pressure and hydraulic fluid flow direction delivered to motor 1434 in power drive unit 1408 from hydraulic control module 1406. When motor 1434 may be a variable displacement motor, valve 1420 may be a directional control valve. Flight controls computer 1414 may control valve 1420 in hydraulic control module 1406 such that a variable displacement motor as motor 1434 in power drive unit 1408 may receive hydraulic fluid and pressure from a single hydraulic line and vary the torque and speed of movement of wing fold actuator 1410.

When power system 1116 may be electrical instead of hydraulic, valve 1420 may be replaced by an electrical component that may vary an electrical current delivered to power drive unit 1110. The electrical component may be without limitation a potentiometer and/or a variable resistor. When power system 1116 may be electrical instead of hydraulic, power system 1116 may include an electrically driven motor.

Remote electronics unit 1426 may convert analog signals to digital signals and/or digital signals to analog signals. Remote electronics unit 1426 may without limitation allow transmission of signals and/or information between hydraulic control module 1406, and components communicating therewith, and flight controls computer 1414 via wireless transmissions and/or transmission via some number of wires, wherein the number may be one.

Thus, by reducing a number of wire bundles needed to transmit information and commands between flight controls computer 1414 and hydraulic control module 1406 and/or components communicating with hydraulic control module 1406, as compared to a system not using 1426, a weight of and/or a space occupied by the number of wire bundles may be eliminated. Eliminating the weight of and/or the space occupied by a component of hydraulic power system 1400 may allow a reduction in a profile of a size of a wing containing hydraulic power system 1400 and/or reduce a total weight of the wing. A reduction in a profile of a size of a wing containing hydraulic power system 1400 and/or reduce a weight of the wing may result in improved performance and/or fuel efficiency for an aircraft containing hydraulic power system hydraulic power system 1400. Thereby, a wing containing wing fold system 1100 may be sized such that no component of wing fold system 1100 may require a fairing that expands a profile of the wing.

Further, hydraulic power system 1400 may have manual reversion capability, such that lock 1412 may be retracted manually, and an external power drive, which may be without limitation a hand tool connecting to power drive unit 1408 and/or wing fold actuator 1410 and/or some linkage connected thereto.

Referring now to FIG. 14B, FIG. 14B is a diagram for a hydraulic control system for a wing fold system with a motor driven by fixed differential hydraulic power, in accordance with an illustrative embodiment. The illustrative embodiment of FIG. 14B takes into account and recognizes that latches, such as without limitation latch 1212 may be held in closed position, as shown in FIG. 12A so that lock 1210 may be moved into and out of engaged position 1232 as shown in FIG. 12D with a minimum of stress and wear on latch 1212 and lock 1210 and lock actuator 1214 components when unfixed lug 1208 may be held by force 1228 against fixed portion 1220. The illustrative embodiment of FIG. 14B takes into account and recognizes that a reliability and mean time to replacement for motor 1434 may be increased if the output from and/or work done by motor 1434 may be kept to a reduced level compared to motor 1434 always providing an output that supplies force to wing fold actuator 1410 such that wing fold actuator 1410 may always supply enough force to generate maximum value 1312 moment about fold axis 1130, as shown in FIG. 11 and FIG. 13.

Hence, when motor 1434 drives wing fold actuator 1410 in a direction to move unfixed portion 1128 toward flight position flight position 510, without limitation as also shown in FIG. 12D, the force to generate maximum value 1312 moment about fold axis fold axis 1130 may not be needed. A lower force will suffice, so long as it may be great enough to overcome the moments in lock range 1310 as shown in FIG. 13.

Thus, even when valve 1420 may not be an electrohydraulic servo valve, or motor 1434 may not be a variable displacement motor, or flight controls computer 1414 may not compute an actual moment for unfixed portion 1128 about fold axis 1130 in real time and dynamically regulate output from power drive unit 1408 to adjust for the actual moment such that unfixed portion 1128 may be moved at a specified rate to a specified position, it may be still possible to provide the advantages of operating motor 1434 to move unfixed portion 1128 to flight position 510 without powering motor 1434 to produce a force required to match a moment about fold axis 1130 equal to maximum value 1312.

As shown by FIG. 14B, pressure regulating valve pressure regulating valve 1440 may be connected to hydraulic line 1422 that powers motor 1434 in power drive unit 1408 in the direction to move unfixed portion 1128 toward flight position 510. Hence, a pressure differential may be provided between hydraulic line 1422 and hydraulic line 1424 by reducing pressure in hydraulic line 1422 via pressure regulating valve 1440. A value for a pressure remaining in hydraulic line 1422 as a result of opening pressure regulating valve 1440 may be a value that may be sufficient to provide enough force to wing fold actuator 1410 to equal maximum moments predicted for lock range 1310. Maximum moments predicted for lock range 1310 may depend upon the design speed of the aircraft while operating hydraulic pressure system 1400 and other design factors such as without limitation maximum winds that may be present while operating hydraulic power system 1400. Without limitation, if aircraft hydraulic power system 1402 supplied hydraulic fluid pressurized at 3000 pounds per square inch to hydraulic control module 1406, while a pressure in hydraulic line 1424 may be at 3000 pounds per square inch, pressure regulating valve 1440 may reduce a pressure in hydraulic line 1422 down to 1000 pounds per square inch. Opening of pressure regulating valve 1440 to reduce the pressure in hydraulic line 1422 may be commanded from flight controls computer 1414 based upon a sensed position of unfixed portion 1128. Without limitation, when unfixed portion 1128 may be within a specified distance and/or angle from flight position 510, then pressure regulating valve 1440 may open to reduce the pressure in hydraulic line 1422.

Reducing the pressure in hydraulic line 1422 may reduce the output of motor 1434. Hence, the force applied to wing fold actuator 1410 from motor 1434 may be reduced as compared to before pressure regulating valve 1440 opens. Hence, forces applied to hold unfixed portion 1128 against fixed portion 1126 such that latch 1212 will be aligned as shown in FIG. 12A when lock 1210 moves between engaged position 1232 and disengaged position 1234.

As a result of the reduced pressure to motor 1434 during engagement and disengagement of lock 1210 in latch 1212, reliability of and/or mean time to replacement for motor 1434 and/or associated components may be increased as compared to motor 1434 being powered at a full pressure available from aircraft hydraulic power system 1402. As a result of the force produced by motor 1434 being sufficient to force unfixed portion 1218 against fixed portion 1220 so that respective centerlines for unfixed lug 1208, fixed lugs 1204, and lock 1210 are all aligned with each other, reliability of and/or mean time to replacement for latch 1212, lock 1210, lock actuator 1214, and/or associated components may be increased as compared to a locking system that does not provide a force sufficient to hold respective centerlines for unfixed lug 1208, fixed lugs 1204, and lock 1210 are all aligned with each other.

The illustrations of FIG. 14A and FIG. 14B are not meant to imply physical or architectural limitations to the manner in which different illustrative embodiments may be implemented. Other items in addition to, in place of, or both in addition to and in place of the ones illustrated may be used. Some components may be unnecessary in some illustrative embodiments. Also, the items are presented to illustrate some functional components. One or more of these blocks may be combined or divided into different blocks when implemented in different embodiments.

For example without limitation, hydraulic control module 1406 may be combined into flight controls computer 1414 or into power drive unit 1408. Likewise, where as hydraulic pressure system 1400 illustrates wing fold system 1100 as applied to a hydraulic powered configuration, analogous components may be used for a pneumatic powered configuration, or an electric powered configuration. Although FIG. 11 for wing fold system 1100 and FIG. 14A and FIG. 14B for hydraulic pressure system 1400 only show one type of powered system being used, a wing may have a primary wing fold system 1100 or components thereof configured with one type of power supply, and a secondary system, such as without limitation wing fold system 1100 or selected secondary components thereof, with a second type of power supply.

Figure 15:
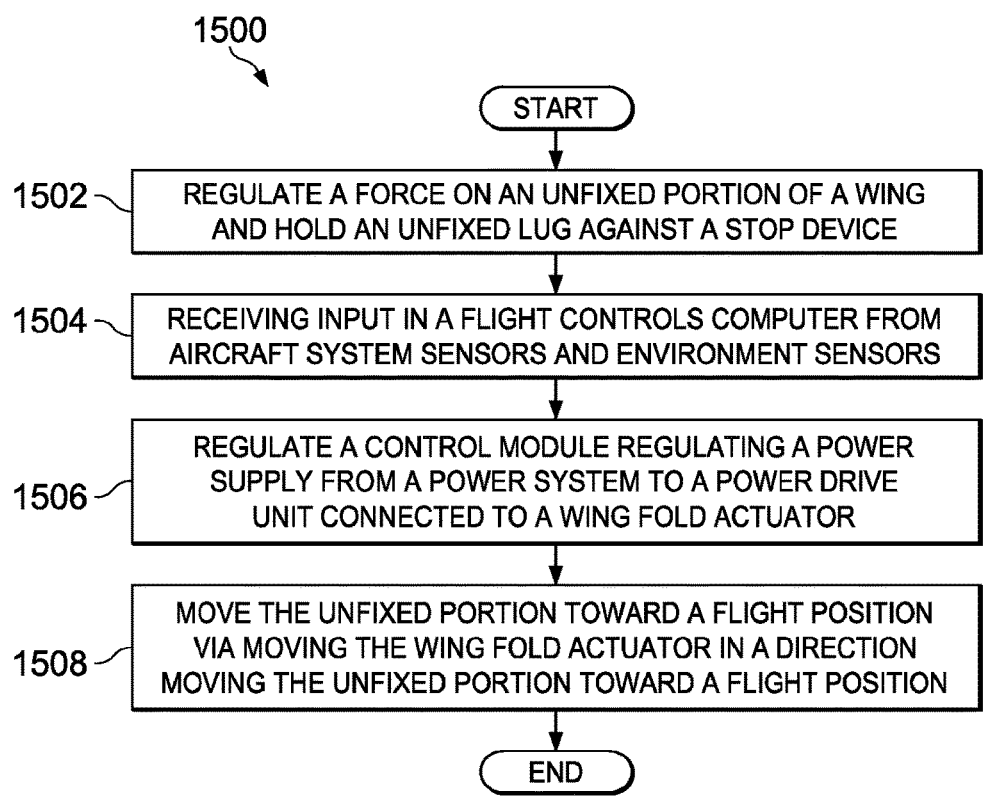
FIG. 15 is a flowchart of a method for controlling an angular free play of an unfixed portion of a wing relative to a fixed portion of the wing while transitioning a lock in a latch, in accordance with an illustrative embodiment.

Thus, a method may exist for controlling an angular free play of an unfixed portion of a wing relative to a fixed portion of the wing while transitioning a lock in a latch. Referring now to FIG. 15, FIG. 15 is a flowchart of a method for controlling an angular free play of an unfixed portion of a wing relative to a fixed portion of the wing while transitioning a lock in a latch, in accordance with an illustrative embodiment. Method 1500 for controlling an angular free play of an unfixed portion of a wing relative to a fixed portion of the wing while transitioning a lock in a latch may include steps 1502 through 1508.

The method may include regulating a force on an unfixed portion of a wing and holding an unfixed lug against a stop device (Operation 1502). The stop device may be connected to the a fixed portion of the wing. The unfixed lug may be included a part of a latch for the unfixed portion of the wing.

The method may include receiving input in a flight controls computer from aircraft system sensors and environment sensors (Operation 1504). The input may be received into an algorithm in a processor in the flight controls computer.

The method may include regulating a control module regulating a power supply from a power system to the power drive unit connected to a wing fold actuator (Operation 1506). Regulating the power supply to the power drive unit may be via a differential between a first power supplied to a first line and a second power supplied to a second line, each line connecting the control module to the power drive unit. A first power supplied to the first line by the control module may move the unfixed portion toward a flight position. A second power supplied to the second line by the control module may move the unfixed portion toward an on-ground position.

The power supply may be at least one of: hydraulic, electric, and pneumatic. When the power supply may be hydraulic, regulating a power differential to the power drive unit may be via a valve in the control module, which may be a hydraulic control module.

The method may include moving the unfixed portion toward the flight position via moving the wing fold actuator in a direction moving the unfixed portion toward the flight position (Operation 1508).

Further, a method may exist for decreasing a load on a wing fold actuator of a wing, and increasing a mean time between replacement of the wing fold actuator, relative to the wing foregoing using the process.

Figure 16:
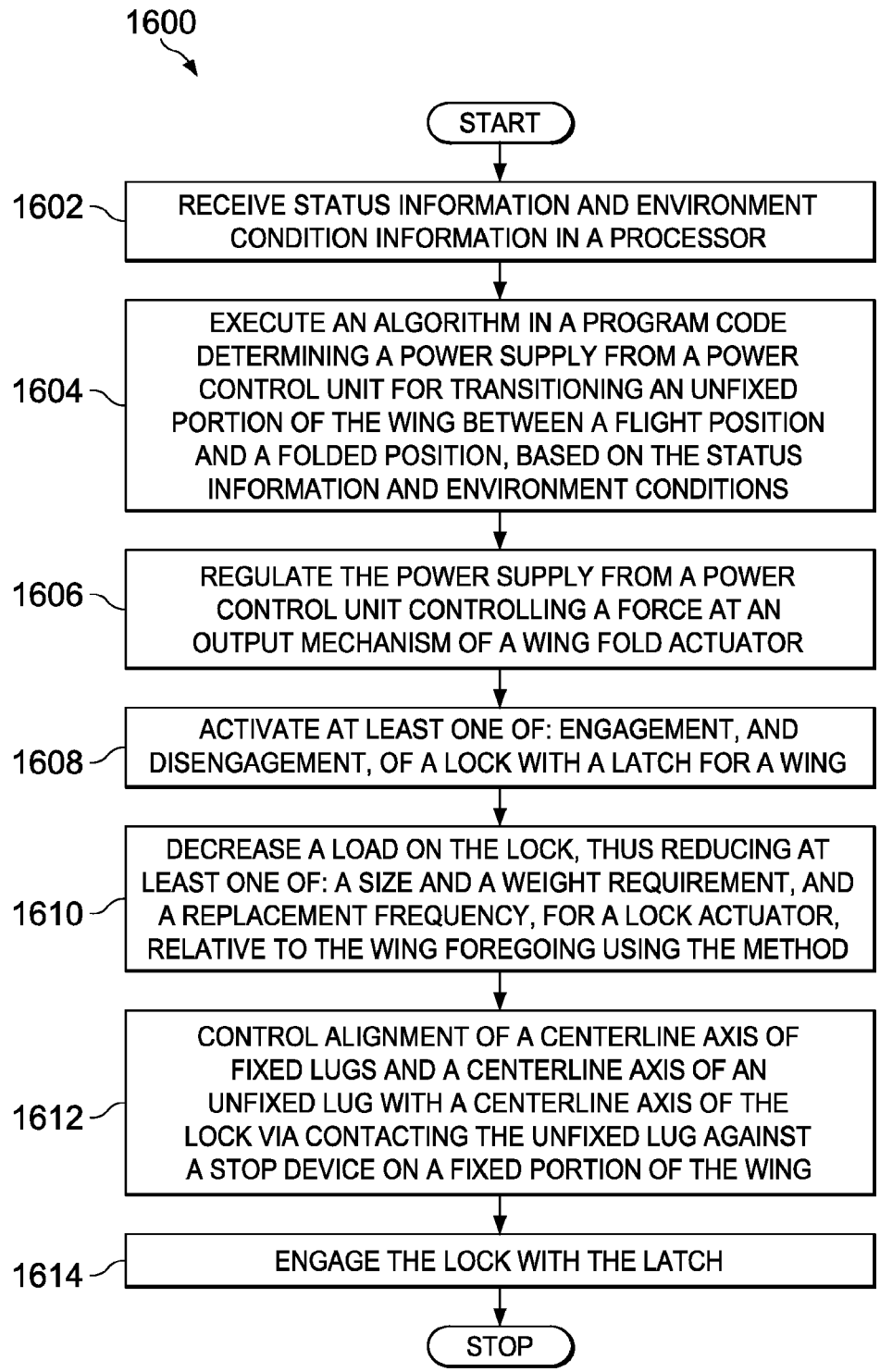
FIG. 16 is a flowchart of a method for decreasing a load on a wing fold actuator of a wing, and increasing a mean time between replacement of the wing fold actuator, relative to the wing foregoing using the process, in accordance with an illustrative embodiment.

Referring now to FIG. 16, FIG. 16 is a flowchart of a method for decreasing a load on a wing fold actuator of a wing, and increasing a mean time between replacement of the wing fold actuator, relative to the wing foregoing using the process, in accordance with an illustrative embodiment. Method 1600 for decreasing a load on a wing fold actuator of a wing, and increasing a mean time between replacement of the wing fold actuator, relative to the wing foregoing using the method may include steps 1602 through 1614.

Method 1600 may begin by receiving status information and environment condition information in a processor (Operation 1602). Method 1600 may include executing an algorithm in a program code in the processor determining a power supply from a power control unit for transitioning an unfixed portion of the wing between a flight position and a folded position, based on the status information and environment conditions (Operation 1604).

Method 1600 may include regulating the power supply from the power control unit controlling a force at an output device of a wing fold actuator (Operation 1606). Method 1600 may include activating at least one of: engagement, and disengagement, of a lock with a latch for the wing (Operation 1608). Method 1600 may include decreasing a load on the lock, thus reducing at least one of: a size and a weight requirement, and a replacement frequency, for a lock actuator, relative to the wing foregoing using the method (Operation 1610).

Method 1600 may further include controlling alignment of a centerline axis of fixed lugs and a centerline axis of an unfixed lug with a centerline axis of the lock via contacting the unfixed lug against a stop device on a fixed portion of the wing (Operation 1612)

Method 1600 may include engaging the lock with the latch (Operation 1614). The lock may include a beveled corner and the unfixed lug may include a beveled opening.

The flowcharts and block diagrams in the different depicted illustrative embodiments may illustrate the structure, architecture, functionality, and/or operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description, and may be not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of controlling an angular free play of an unfixed portion of a wing relative to a fixed portion of the wing while transitioning a lock in a latch, the method comprising:
determining in real time an actual moment, caused by actual loads on the unfixed portion, about a centerline axis of a wing fold actuator; and
regulating a power supply from a control module controlling a force from an output device of the wing fold actuator, such that based upon the real time determination of the actual moment about the centerline axis of the wing fold actuator, a flight controls computer commands the control module to reduce, from a maximum power available from a power system, the power supplied to the wing fold actuator to a level required to move, at a specified rate, the unfixed portion of the wing, and holding an unfixed lug against a stop device, the unfixed portion comprising the unfixed lug.

2. The method of claim 1, further comprising the latch comprising the unfixed lug.

3. The method of claim 1, further comprising holding the unfixed lug against the stop device via a control module regulating a power supply to a power drive unit connected to the wing fold actuator.

4. The method of claim 3, further comprising regulating the power supply to the power drive unit via a differential between a first power supplied to a first line and a second power supplied to a second line, each line connecting the control module to the power drive unit.

5. The method of claim 4, further comprising the first power supplied to the first line moving the unfixed portion toward a flight position, and the second power supplied to the second line moving the unfixed portion toward an on-ground position.

6. The method of claim 3, further comprising the power supply being at least one of: electric, and pneumatic.

7. The method of claim 3, further comprising the power supply being hydraulic, and regulating a power differential to the power drive unit via a valve in a hydraulic control module.

8. The method of claim 1, wherein holding further comprises a power drive unit applying a force moving the wing fold actuator in a direction moving the unfixed portion toward a flight position.

9. The method of claim 8, further comprising the force moving the wing fold actuator in the direction moving the unfixed portion toward the flight position being less than approximately one-seventh of a maximum design output of a power drive unit for rotating the wing fold actuator in an opposite direction rotating the unfixed portion toward an on-ground position.

10. The method of claim 8, further comprising the force moving the wing fold actuator being regulated by an algorithm in a processor in a flight controls computer, the algorithm receiving input from aircraft system sensors and environment sensors.

11. The method of claim 10, further comprising the environment sensors comprising sensors that detect conditions present at least one of around and approaching an aircraft.

12. The method of claim 10, further comprising the environment sensors comprising sensors configured to detect one of: weather, a building, an airport structure, or an obstacle or a vehicle around or approaching an aircraft.

13. The method of claim 10, further comprising the environment sensors comprising one of: radar, a Global Positioning System receiver, or an Automatic Dependent Surveillance-Broadcast (ADS-B) receiver.

14. The method of claim 1, such that regulating the force on the unfixed portion further comprises a power drive unit comprising a variable displacement motor.

15. The method of claim 1, further comprising a flight controls computer comprising a processor comprising an algorithm using an actual load on the unfixed portion for controlling, across a range of values, an output of a power drive unit powering the wing fold actuator.

16. The method of claim 15, further comprising the flight controls computer using a signal from an aircraft system sensor for determining the actual load on the unfixed portion of the wing and a required output of the power drive unit.

17. The method of claim 1, further comprising the latch comprising a fixed lug and the unfixed lug, and aligning a centerline axis of the lock such that the lock transitions between an engaged position and a disengaged position such that no more than 6,000 pounds of force is needed for inserting the lock through the fixed lug and the unfixed lug into the engaged position.

18. The method of claim 17, further comprising overcoming a force, from the wing fold actuator moving the unfixed portion toward a flight position, by applying an opposing force, acting in an opposite direction of the force from the wing fold actuator, against the unfixed portion, via a lock actuator moving a corner of the lock through the latch and into the engaged position, the corner of the lock being beveled.

19. A method of limiting a force required from a wing fold actuator output, the method comprising:
connecting a wing fold actuator to an unfixed portion of a wing;
connecting a power drive unit to the wing fold actuator;
controlling, via a control module, a power supplied to the power drive unit;
controlling an angular free play of the unfixed portion of the wing relative to a fixed portion of the wing while transitioning a lock in a latch;
using a signal from an aircraft system sensor and a signal from an environment sensor and determining, in a flight controls computer in real time:
an actual moment about a centerline axis of the wing fold actuator, caused by an actual load on the unfixed portion; and
a limit to a power supplied to the wing fold actuator based on the determined actual moment; and
regulating the power supplied via the control module to the power drive unit based on the determined power limit.

20. The method of claim 19, further comprising controlling, via the control module, a power supplied to a lock actuator that locks the latch that secures the unfixed portion of the wing to the fixed portion of the wing.

21. The method of claim 19, further comprising the flight controls computer comprising a processor comprising an algorithm using the actual load on the unfixed portion and varying an output of the power drive unit across a range of values.

22. The method of claim 19, further comprising the flight controls computer using the signal from the aircraft system sensor for determining the actual load on the unfixed portion of the wing and a determination of a required output of the power drive unit.

23. The method of claim 22, further comprising the flight controls computer using the determination and limiting, to approximately one-seventh of a maximum force available from the wing fold actuator to move the unfixed portion toward an on-ground position, a force from the power drive unit.

24. The method of claim 19, further comprising the latch comprising a fixed lug and an unfixed lug, and aligning a centerline axis of the lock such that the lock transitions between an engaged position and a disengaged position such that no more than 6,000 pounds of force is needed for inserting the lock through the fixed lug and the unfixed lug into the engaged position.

25. The method of claim 24, further comprising overcoming a force, from the wing fold actuator moving the unfixed portion toward a flight position, by applying an opposing force, acting in an opposite direction of the force from the wing fold actuator, against the unfixed portion, via a lock actuator moving a corner of the lock through the latch and into the engaged position, the corner of the lock being beveled.

26. A method of controlling an angular free play of an unfixed portion of a wing relative to a fixed portion of the wing while transitioning a lock in a latch and limiting a force at a wing fold actuator output and thereby increasing a mean time between replacement of a wing fold actuator, the method comprising executing a specially programmed code in a processor and thereby:
  receiving status information and environment condition information;
  executing an algorithm in the specially programmed code determining a power supply from a control module for transitioning the unfixed portion of the wing between a flight position and an on-ground position, based on the status information and environment conditions;
  regulating the power supply from the control module controlling a force at an output device of the wing fold actuator, such that based upon a real time determination of an actual moment about a central axis of the wing fold actuator, a flight controls computer commands the control module to reduce, from a maximum power available from a power system, a power supplied to the wing fold actuator to a level required to move, at a specified rate, the unfixed portion of the wing; and
  activating at least one of: engagement, and disengagement, of the lock with the latch for a folding wing.

27. The method of claim 26, further comprising decreasing a load on the lock, thus reducing at least one of: a size and weight requirement, and a replacement frequency, for a lock actuator, relative to the wing fold actuator foregoing using the method, via:
  controlling alignment of a centerline axis of fixed lugs and a centerline axis of an unfixed lug with a centerline axis of the lock via contacting the unfixed lug against a stop device on the fixed portion of the wing; and
  engaging the lock with the latch, the lock comprising a beveled corner and the unfixed lug comprising a beveled opening.

* * * * *